US012449241B1

(12) United States Patent
Opperman et al.

(10) Patent No.: US 12,449,241 B1
(45) Date of Patent: Oct. 21, 2025

(54) WEAPONIZED UNMANNED VEHICLES, WEAPONS RELEASE SYSTEMS, AND LOW-COST MUNITIONS FOR REMOTELY ENGAGING ONE OR MORE TARGETS

(71) Applicant: Orbital Research Inc., Cleveland, OH (US)

(72) Inventors: Anthony Opperman, Wickliffe, OH (US); Douglas E Russell, Canal Fulton, OH (US); Frederick J Lisy, Euclid, OH (US); Scott Suren, Lakewood, OH (US); Emanuel Surunis, Lakewood, OH (US); Nevo Ziv, Boca Raton, FL (US); Michael Thompson, Cleveland, OH (US); Edward J. Rapp, Cleveland Heights, OH (US)

(73) Assignee: Orbital Research Inc., Cleveland, OH (US)

( * ) Notice: Subject to any disclaimer, the term of this patent is extended or adjusted under 35 U.S.C. 154(b) by 128 days.

(21) Appl. No.: 18/224,763

(22) Filed: Jul. 21, 2023

Related U.S. Application Data

(60) Provisional application No. 63/457,443, filed on Apr. 6, 2023, provisional application No. 63/393,526, filed on Jul. 29, 2022.

(51) Int. Cl.
*F42B 10/64* (2006.01)
*B64D 1/04* (2006.01)
(Continued)

(52) U.S. Cl.
CPC ................ *F42B 10/64* (2013.01); *B64D 1/04* (2013.01); *B64U 10/13* (2023.01); *F41G 9/02* (2013.01);
(Continued)

(58) Field of Classification Search
CPC .......... F42B 10/64; F41G 9/02; G05D 1/245; G05D 1/683; G05D 2105/35; B64U 10/13;
(Continued)

(56) References Cited

U.S. PATENT DOCUMENTS 6,073,880 A * 6/2000 Voigt ...................... F42B 10/14
244/3.28
6,502,785 B1 * 1/2003 Teter ...................... F42B 10/64
244/3.28

(Continued)

*Primary Examiner* — Michelle Clement
(74) *Attorney, Agent, or Firm* — Brian Kolkowski

(57) ABSTRACT

Unmanned systems, and primarily vehicles, and in most embodiments unmanned aerial systems (UAS), as well as novel guided and unguided munitions are presented herein. to the two combine to present unmanned weaponized systems that not only carry weapons functionality, but allow for advanced observation and reconnaissance. These unmanned systems are largely directed toward military applications where the weaponized unmanned system may be forward deployed to allow human warfighters to remain at long range distances from the potential targets, and to provide surveillance, target identification and tracking, general reconnaissance information, and the like, while also providing weaponized attack capabilities. The unmanned systems may, in some embodiments, include advanced command and control capabilities for communication between the system and the remote, rear-positioned warfighter, and between separate elements of the unmanned system. Many embodiments also include weapons systems, munitions, or rounds with guidance and real-time maneuverability capabilities as well.

20 Claims, 13 Drawing Sheets

Figure 1:
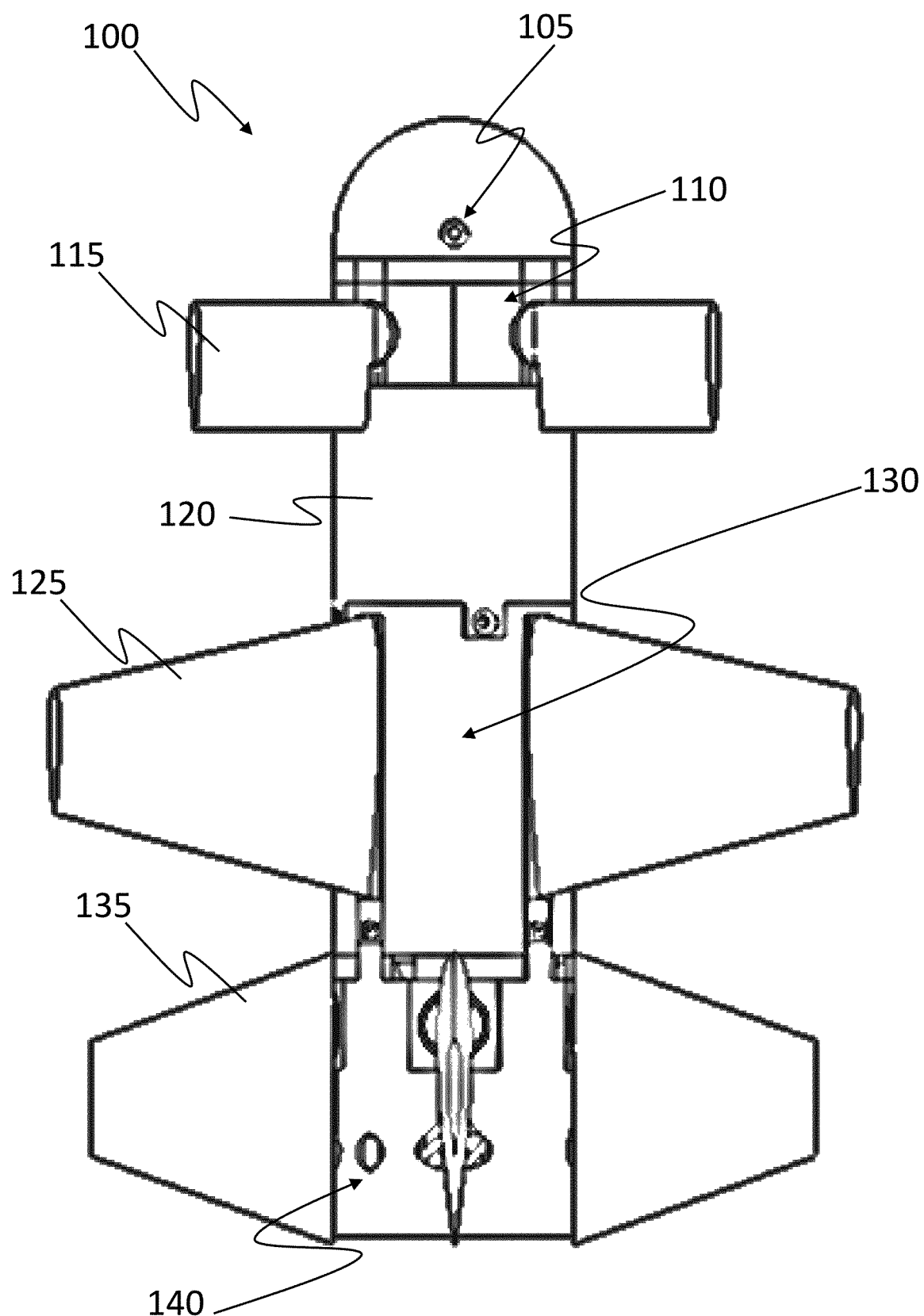

(51) Int. Cl.
*B64U 10/13* (2023.01)
*F41G 9/02* (2006.01)
*G05D 1/245* (2024.01)
*G05D 1/683* (2024.01)
*G05D 105/35* (2024.01)
*B64U 101/18* (2023.01)
*B64U 101/31* (2023.01)

(52) U.S. Cl.
CPC ............. *G05D 1/245* (2024.01); *G05D 1/683* (2024.01); *B64U 2101/18* (2023.01); *B64U 2101/31* (2023.01); *G05D 2105/35* (2024.01)

(58) Field of Classification Search
CPC ... B64U 2101/31; B64U 2101/18; B64D 1/04
See application file for complete search history.

(56) References Cited

U.S. PATENT DOCUMENTS

| | | | | |
|---|---|---|---|---|
| 6,666,402 B2* | 12/2003 | Rupert | ............... | F42B 10/54 244/3.1 |
| 6,685,143 B1* | 2/2004 | Prince | ............... | F42B 10/64 244/203 |
| 7,718,937 B1* | 5/2010 | Dunn | ............... | F41G 7/266 244/3.13 |
| 7,800,032 B1* | 9/2010 | Facciano | ............... | F42B 10/64 244/3.25 |
| 8,097,838 B2* | 1/2012 | Ronn | ............... | F42B 10/64 102/490 |
| 8,319,164 B2* | 11/2012 | Martinez | ............... | F42B 10/14 244/3.21 |
| 8,648,285 B2* | 2/2014 | Rastegar | ............... | F42B 15/01 102/501 |
| 10,735,654 B1* | 8/2020 | Jankowski | ............... | F42B 15/08 |
| 10,979,643 B1* | 4/2021 | Jankowski | ............... | F42B 10/02 |
| 10,996,032 B2* | 5/2021 | Buttolph | ............... | F42B 10/14 |
| 11,509,828 B1* | 11/2022 | Jankowski | ............... | F42B 10/64 |
| 11,624,594 B1* | 4/2023 | Neal, III | ............... | F42B 10/64 244/3.27 |
| 11,649,051 B2* | 5/2023 | Arlton | ............... | B64U 30/21 244/17.23 |
| 11,650,033 B2* | 5/2023 | Batchelder | ............... | F42B 10/64 244/3.27 |
| 11,889,190 B1* | 1/2024 | Jankowski | ............... | F42B 10/06 |
| 12,054,252 B2* | 8/2024 | Warner, IV | ............... | B64C 27/39 |
| 12,054,256 B2* | 8/2024 | Blake | ............... | B64C 1/20 |
| 12,326,323 B2* | 6/2025 | Ashman | ............... | F16H 55/18 |
| 2024/0077291 A1* | 3/2024 | Ashman | ............... | F16H 55/18 |

* cited by examiner

WEAPONIZED UNMANNED VEHICLES, WEAPONS RELEASE SYSTEMS, AND LOW-COST MUNITIONS FOR REMOTELY ENGAGING ONE OR MORE TARGETS

CROSS-REFERENCE TO RELATED APPLICATIONS

This application is a non-provisional application that claims benefit to the following two prior-filed U.S. Provisional Patent Applications: 1) Provisional U.S. Application No. 63/393,526 which was filed on Jul. 29, 2022, and 2) Provisional U.S. Application 63/457,443 which was filed on Apr. 6, 2023. The specifications and drawings of each of the above applications are hereby incorporated by reference in their entirety.

BACKGROUND OF THE INVENTION

1. Field of the Invention

The present invention is directed to unmanned systems, and primarily vehicles, and in most embodiments unmanned aerial systems (UAS). Such invention is further directed to unmanned weaponized systems that not only carry weapons functionality, but allow for advance observation and reconnaissance as well. These unmanned systems are largely directed toward military applications where the weaponized unmanned system may be forward deployed to allow human warfighters to remain at long range distances from the potential targets, and to provide surveillance, target identification and tracking, general reconnaissance information, and the like, while also providing weaponized attack capabilities. The unmanned systems may, in some embodiments, include advanced command and control capabilities for communication between the system and the remote, rear-positioned warfighter, and between separate elements of the unmanned system. Many embodiments also include weapons systems, munitions, or rounds with and/or without guidance and real-time maneuverability capabilities as well.

2. Technical Background

Safety and effectiveness of the warfighter are paramount concerns for all branches of the military and a great deal of investment and research and development efforts have been made into areas to improve the accuracy, lethality, and overall effectiveness Long Range Precision Fired (LRPF) weapons. The appeal of LRPF weapons comes from the ability to perform precision strikes with much cheaper munitions while also allowing warfighters to maintain a safe distance from enemies. Many LRPF systems, however, utilize forward observers to identify and communicate enemy target location and movement. Currently, this requires humans to approach enemies in order to relay the information. Such forward observer positions are extremely high risk for they are naturally vulnerable to enemy location and attack, and generally result in higher casualty rates than many other positions. However, with the rise of technologies such as unmanned vehicles of any modality, but in particular Unmanned Aerial Vehicles (UAV), as well as Artificial Intelligence (AI), and improved radio communication methods, the practice of sending humans and expensive vehicles into dangerous enemy environments is no longer strictly necessary to provide accurate information back to the warfighter located in a safer distance away, or to provide effective attack methods on targets. Any weapons system would greatly benefit from improved accuracy, lethality, and overall effectiveness, but there is possibly the greatest need for improving all facets of long range weapons that further improve the safety of the warfighter. Squads lack timely fire support and situational awareness when placed into dynamic conflicts in complex expeditionary and/or urban environments which prevents the warfighter from quickly understanding the environment and delivering fires on critical threats. Additionally, when considering the use of weapons systems assets, particularly unmanned weapons system vehicles and munitions, the systems and elements of those systems themselves, both those located near or with the warfighter and those forward deployed in and near the arena of reconnaissance and/or battle, the risks of losing any of a system's assets must be carefully considered. This is, for example, particularly true for weapons systems utilizing unmanned systems, such as, for example, unmanned aircraft systems (UAS), where the forward deployed aircraft take the place of a forward deployed observer, but in turn become susceptible to enemy attack, capture, or to being lost. Tactics and approaches that can conserve these precious resources while still allowing the operator to project power and strike critical targets are of utmost importance. In the context of weaponized unmanned systems, these aircraft or other vehicles or platforms become equipped with the necessary weapons to complete their missions and to provide deterrence as adversaries measure up their own capabilities against those demonstrated by the operator, warfighter, or entity in control of the forward deployed unmanned system. Therefore, in arenas and systems where multiple forward deployed elements or vehicles are utilized, it may be desirable to draw attention away from high value elements or assets to lower value elements or assets in order to allow those of higher value to complete their critical missions given that the adversary must divide their focus and resources to address the challenges presented by the multiple assets being deployed against them at one time.

Longer range precision fired (LRPF) weapon systems are currently sought after and under development in order to maintain effectiveness while also increasing safety for the warfighter by keeping them further from enemy lines. Currently developing LRPFs are hoped to be more accurate over these longer distances, however, there are significant guidance, navigation, and control (GNC) challenges in keeping the munitions on the correct path toward the intended targets, and there are added difficulties in assigning targets upon firing and maintaining those targets through means of a seeker, especially since the time of flight of the LRPF systems is higher than the shorter distance counterparts. This increases the importance and value of a forward observer—a system, currently manned, that is close enough to the targets to identify, select, and track the targets until the munition seeker system is in range to take over or laser-guiding the round to the correct target. The forward observer then, by nature of the task, is closer to the enemy and in greater danger than is preferable. With the rise of autonomous systems such as Unmanned Aerial Vehicles (UAV) and driverless cars, as well as the improvements in Artificial Intelligence and computing components, the possibility has risen, and the present invention enables, replacing the human forward observer with an autonomous system that can identify, track, and communicate target data both to warfighters at a distance safe from the enemy, and to the munition that is sent to engage the enemy. The utility of such systems is even further enhanced by the present invention by the systems being weaponized and therefore useful for reconnaissance and information gathering as well as for carrying out attacks on identified targets.

Current LRPF systems utilized by the military are extremely expensive, as can be highlighted by considering the cost of the weapons themselves. The most economical tools are the Joint Direct Attack Munition (JDAM) family of weapons, with which, for a cost about $25,000 k, the warfighter can deliver 500, 1,000, or 2,000 lb. bombs on targets with great accuracy. The main drawback to such weapons is that they require putting a valuable, manned aircraft very close to the target area exposing both the vehicle and the human asset/warfighter to risk of loss from enemy combat air patrols and anti-aircraft missiles. In scenarios where the airspace is contested, increased stand-off/distance is desired. Presently, the United States Air Force (USAF) has several options in its arsenal to reach targets at 100 km, but the price increases to almost $200 k for a 250 lb. payload, and almost $500 k for a 1,000 lb. payload—for a single round. Further still the Joint Air-to-Surface Standoff Missile) JASSM can strike at extended ranges sufficient to completely protect the delivery aircraft but comes at a steep price tag of $1.2 M for getting 1,000 lbs. on target at ranges up to 1,900 km. Seeing these costs of utilization of ground strike weapons, a strategy that would enable the military to get aircraft close to a target and utilize lower cost munitions is a key economic benefit that allows the military to strike more targets, have deeper reserves, and spend much less effort than the adversary on this tactic. Additionally, the ability to deploy low-cost weapons systems closer to the target allows for smaller payload explosives to be used to provide precision attacks with smaller radii of effect and with significantly less collateral damage.

It is therefore one object of the present invention to provide an unmanned vehicle forward observer kit (FO Kit) that provides a low-cost system for advanced observation in arenas of operations that allows the warfighter/operator to remain located remote from the arenas and still obtain real-time information from the arena of operations. It is another object of the present invention that such FO Kits be platform agnostic and adaptable to virtually any vehicle or system platform with only minor engineering adaptations required for the FO Kit to be integrated with the vehicle or system. All branches of the military can benefit from this technology to increase the effectiveness of long range and standoff fires. By including a small module in a JDAM kit, for example, bombers could release large numbers of JDAMs from a very high altitude to remain safe from interceptors and enemy air defenses; as the munitions fell into the target area, a UAV FO system, for example, FO Kit could then update the target positions for each munition, even to direct them to hit moving targets. This capability would even allow the JDAMs to be fully effective if GPS jammers were activated in the target area. In a littoral or island scenario shipboard fires could be directed by FO Kit systems to clear key areas for amphibious, rotary wing, or parachute ingress. This would extend the capabilities of munitions currently reliant on laser designators and/or GPS so that they could be employed in a wide variety of threat environments and concepts of operations (CONOPs). In a defensive posture, lines of these FO Kit enabled UAVs could help maintain borders against incursion by enemy forces, directing low cost fires with incredible accuracy and rate of arrival. Even low cost mortars could be used to strike tanks and anti-aircraft systems. The FO Kit can be applied to a wide range of multirotor, hybrid (i.e., like an airplane with fixed wings but also comprising propellers, rotors, or other systems than enable vertical takeoff and landing (VTOL), or fixed wing (i.e., those like an airplane with fixed wings) UAVs, and again is designed to be substantially platform agnostic. It is another object of the present invention to provide individual rounds, projectiles, or munitions that are significantly lighter weight than currently available weapons, thus allowing for more weapons to be carried by an individual warfighter. It is still another object of the present invention to provide individual rounds and entire systems that are significantly less expensive than currently utilized systems, and thus increase the availability in terms of the number of rounds as well as decreasing concerns about utilizing resources due to replacement costs. An example of one embodiment of a weaponized UAV system of the present invention includes a UAV and several individual rounds to be attached to the UAV, where the individual rounds each weigh in at ~10 lbs. and the entire system including UAV and rounds costs $50,000 or less depending on cameras and radios included in the configuration—significantly less than existing weapons systems. The core of the invention lies in the algorithms and methods that can be interfaced to different radio links and sensor arrays for each customer's dynamics and risk tolerance.

However, the systems of the present invention are not useful solely in military applications. Commercial interest will be realized beyond the military market as well because the FO Kit is also applicable to commercial UAVs for applications like unmanned delivery methods being developed by companies such as Amazon, of course without the weaponization features. The deployment systems need only be modified to carry packages rather than weapon rounds. The need for autonomous flight with the ability to communicate for human intervention is a growing market and the present invention includes and provides many essential capabilities for such applications.

Based on early analysis and planning of such unmanned systems, some anticipatory system requirements have been identified that may be considered essential for such a system to effectively operate and be adopted, all of which are objectives for the present invention to provide. First, the forward observer must be able to sense, geolocate, and relay target data to the munition as well as to the warfighter and fire control and battle management systems, as well as providing these people/systems with updated munition data throughout flight. Being that the observer is closer to or in enemy territory, the system must be able to operate in a GPS-denied or degraded environment by maintaining geolocation information of itself and the targets in order to guide the munition to the target. The observer must be able to identify and handle GPS jamming and spoofing. Some specific engagement scenarios must be within the operating capabilities of such a system as well. For example, target information should be able to be modified based on reprioritization of targets. Further, the system should be able to delay target information identification and/or transmission either because the precise target location is initially unavailable, because the target is moving, or because the munition's destination is to be concealed from enemy forces. Additionally, the system should be able to guide the munition in real time to the target through an operator or an autonomous system. Again, each of this is an objective to be provided by the present invention. It is still further an objective of the present invention to provide the long range weapons capability and maintain the safety of the warfighter, and to do so at a significantly lower cost per round than currently existing and utilized weapons systems.

SUMMARY OF THE INVENTION

The present invention utilizes weaponized unmanned systems, such as unmanned vehicles, to deliver and deploy munitions to a target area, or specific target, while allowing the warfighter to remain distant at a safe location and out of range of the target or enemy. The unmanned systems, or unmanned vehicles, of the present invention may be of any type known in the art or later developed, including unmanned ground systems or vehicles, unmanned underwater systems or vehicles or craft, or unmanned aerial systems or vehicles or craft. Though not intended to be limiting, the description of the present invention will be largely presented in the context of aerial systems or vehicles (UAS or UAV), though such references are merely intended to be non-limiting examples, and are representative of and encompass any and all types of unmanned systems as listed above.

The present invention includes an affordable Weapons Release System (WRS) capable of gathering Intelligence Surveillance and Reconnaissance (ISR) and releasing Drop-Glide munitions. When attached to an affordable man-portable, Group 2 UAS (under 55 lbs), any squad level warfighter will be able to perform ISR to find threats/targets and then be able to immediately react to the observed threats/targets. To further increase the value of this weaponized UAS to the warfighter, the present invention utilizes disruptively low-cost Guided and Unguided Drop-Glide Munitions. The key benefit of the Guided Drop-Glide Munition is the ability to strike moving and stationary targets while the lower-cost Unguided Drop-Glides are able to precisely strike targets even under adverse weather conditions. These two types of Drop-Glides utilize Commercial-Off-The-Shelf (COTS) components and additive manufacturing (3D printing) to produce these affordable and reliable munitions with minimal, if any, supply chain issues. One envisioned use of tactical Drop-Glides with fragmentation warheads will be munitions with a similar capability of defeating mortar target sets. Drop-Glides with a shape charge warhead will be able to address armored or fortified targets. This Weaponized UAS with Drop-Glide Munitions have the potential to offer the military disruptively low-cost, precision strike capability that can render multiple target sets such as opposition force personnel, vehicles, light armor, amphibious assault, structures and armored vehicles combat ineffective or a hard kill. One object of the present invention is to produce Weapons Release Systems integrated onto COTS UAVs capable of transporting and releasing innovative, low-cost Drop-Glide Munitions. These systems are envisioned to be used by squad level warfighters to quickly defeat high value targets or render combat ineffective critical threats as commanded by the warfighter or his command leadership.

The Weapons Release System (WRS) and Drop-Glide Munitions of the present invention include key innovations which provide the following benefits and capabilities:
 Ensures the warfighter is in the decision making and targeting command chain,
 Defeats threats in defilade and beyond-line-of-sight
 Able to safely return with unused weapons on board
 Track and defeat moving targets
 Reduce system costs by integrating ISR and some guidance features into the WRS (does not "blow up" expensive targeting & communication hardware typically located within a guided munition)
 Able to defeat multiple threats
 Perform battle damage assessment—and program next strike
 Reduce warfighter data processing burden
 Support distributed advanced base operations with man-portable organic fire capability along with ISR.

As compared to current kamikaze style UAVs and/or Lethal Miniature Aerial Missile System such as Hero and Switchblade, which are very expensive platforms that, if do not find a target, they must self-destruct instead of returning home.

The WRS uses on-board sensors to ensure safe return of the UAV with unused weapons on board. Safety features and arming strategies both within the WRS and the Drop-Glide Munition provide irrefutable information so that the warheads will only detonate after receiving the intent to launch signal and all arming environments are reliably met.

In addition to providing a Weaponized UAV with ISR and lethal effects that addresses the needs of the warfighter, the present invention is aimed at providing a disruptively low-cost system. To this end, various embodiments of the present invention preferably include and utilize various combinations of a) a guided airframe that simplifies the maneuvering components, b) a robust but low-cost production strategy for the Drop-Glide munitions and c) a simplified and cheaper electronics solution employed in the WRS as opposed to the munition itself. First, the present invention's innovative guided airframe for munitions for release from UAVs. The Guided Drop-Glides achieve high-level performance while still being low-cost by eliminating blended control requirements common on other competing guided munitions. Blended control (typically used on most guided projectiles) is when the hardware used to maneuver the projectile (control surfaces such as canards) perform multiple functions such as roll control, pitch control and yaw control simultaneously. The positional accuracy of blended control requirements for maneuvering are much tighter which increases the cost and complexity of 1) the mechanisms and 2) the acceptance tests to verify the control surface performance. In at least one embodiment of the present invention, the innovative airframe design eliminates the blended control complexity and costs by dedicating the Drop-Glide tail fins to roll control, dedicating 2 coupled canards for pitch control and dedicating another 2 coupled canards to yaw control (effectively creating a roll-stabilized decoupled pitch and yaw control strategy). In such embodiment, each channel is paired with an inertial sensor set to provide in flight closed loop control. Further, the control actuation system as a whole may preferably be condensed into a smaller form factor than traditionally used, and in order to achieve this goal, the present invention shifts the coupled pitch and coupled yaw actuation mechanisms forward of the canard hinge line by nesting the lever arms among the actuators which helped to optimize the center of gravity (and thus aerodynamic performance) flexibility by allowing for more internal volume to be made available for warhead/payload. Given that the warhead/payload is the mass dominant component (in light of the lightweight construction and minimization of materials of the airframe and electronics and sensors), and therefore the warhead/payload most significantly effects and determines the center of gravity of the fully assembled round. At least one of the actuation systems of the pitch and yaw canards may preferably be offset from the center line in order to enable the actuation systems to be located in the same plane while avoiding interference between the actuation systems, and also allowing the maximized payload volume, and which also provides greater torque output and angular resolution at the cost of reduced speed/slew rate. The tradeoff is worth the cost as it actually decreases actuator torque requirements and provides more volume allocation for the actuation. The nested lever arms of the actuation systems reduce volumetric impact while leveraging the torque/resolution benefit and greatly reduces the volume of the entire control mechanism system, thus allowing more flexibility in the placement or location of the munition and components within. This simplified maneuvering strategy lowers the mechanism costs while delivering superior performance. Next, the development process of the present invention sought to further reduce the manufacturing costs of both the Guided and Unguided Drop-Glide airframes exploiting capabilities of additive manufacturing. Additive manufacturing enables manipulation of the mass properties of the projectile and achievement of high payload density. Additive manufacturing allows for the creation of very lightweight and rigid structures that can handle the aerodynamic loads experienced by the Drop-Glides. By reducing the weight of the airframe, more weight can be allotted to the warhead which is desired by all warfighters given the weight limit of, for example, Group 2 designated UAS systems (Take-off weight of less than 55 lbs). Further, additive manufacturing allows for combining parts in places to reduce assembly time and increase repeatability and reliability of part geometry, shape, and weight. It is another benefit of the present invention that these benefits will be amplified by rapidly including improvements or performance adjustments as requested by the customer. As compared to traditional manufacturing which would require new tooling for these changes, the same manufacturing equipment is already prepared to make the new variants of the airframe (e.g., 3D printers verses custom tooling). Using the systems and methods of the present invention, the Drop-Glide manufacturing process can be pre-staged all over the world because all that is needed are 3D printers and filament to produce the airframes. Finally, to ensure a low-cost Weaponized UAV with Drop-Glide Munitions, expensive imaging systems communication hardware and guidance technologies from the consumable munitions may preferably be moved to the reusable Weapons Release System. In doing so, these valuable and expensive hardware components will be safely returned and reused during follow-on missions. However, not all navigation technologies can be removed from a guided projectile, specifically the vehicle state and inertial navigation sensors must remain on the projectile to accurately maneuver the projectile to the target. Many embodiments of the present invention address this on-board sensing need by leveraging the miniaturization, ruggedization, and cost reduction advancements accomplished by cell phone and automotive manufacturers. By innovatively assembling and intelligently placing these commercial inertial measurement unit (IMU) chips relative to each other, a very low-cost guidance package was realized. The resultant sensor referred to as a multiple IMU or MIMU reduces the inherent drift which enhances the performance of this sensor array beyond the benefit of averaging several IMUs. In many embodiments, such MIMU may be the central system for generating on board navigation data for the navigation functions to track the munition's position relative to the selected target. The MIMU is also used for closed loop control of the system in using angular rates and body accelerations. These guidance packages are preferably included in the Guided Drop-Glides.

Many embodiments of the present invention also utilize on vehicle sensor arrays to measure texture of the ground for correction of flight planning of each unguided or guided round. For example stereo vision, lidar, and mm wave radar in various combinations can provide detailed flight planning data to increase effectiveness. The weapons release system can then generate commands to the vehicle autopilot to follow or "hold in sights" a selected target or targets to allow for an effective release or launch whenever the user is ready. This approach uses other on vehicle sensor data to compensate for the orientation, velocity, of the vehicle and target along with wind effects. The system may also incorporate and comprise sensor arrays specifically designed to perceive airborne targets such that the UAV or one or more other UAVs may follow such targets, and also may include (either in addition or alternatively) sensor arrays specifically designed to provide targeting data for air to air kinetic or non-kinetic effects.

In summary, the present invention is designed to provide a very affordable and robust Weapons Release Systems mounted to the underside of a COTS UAV capable of releasing both guided and Unguided Drop-Glide Munitions. These systems are capable of providing squads with ISR and organic precision strike without upper echelon support at increased standoff distances which will increase warfighter safety. These low-cost/lightweight weaponized UAS with Drop-Glides will provide the US warfighter technological and firepower overmatch and will disrupt adversary tactics.

In one exemplary embodiment, the system comprises one or more multi-rotor UAVs that drop munitions, which may be guided or unguided, from overhead of targets. Many embodiments may involve transmitting information, substantially in real time (i.e., substantially instantaneously along with the information being obtained and recorded by sensors comprised on the UAV, preferably ranging from less than 10 seconds to, more preferably, millisecond or nanosecond ranges) between the UAV and the munitions, the UAV and the remote warfighter, the munition and the remote warfighter, between one or more UAVs, and/or between any combination of each. Such information may include video data allowing the warfighter to see various points of interest such as the area in which the unmanned system is operating, potential and/or identified targets, landmarks and identifying features of the terrain or arena, enemy craft, weapons, and threats, as well as the travel path of the unmanned system and/or munitions. Such information transmission also allows the unmanned system to receive engagement commands from the warfighter allowing the warfighter to direct paths of travel, select targets identified using UAV mounted camera systems, and provide other such direction or control to the vehicle. Some embodiments of the UAV/UAS may also comprise one or more cameras that are mounted to face downward (toward the ground) from the UAV when in flight to provide a live feed to the Ground Control Station enabling the user to see the terrain, obstacles, targets, and anything else within the view of the camera on the UAV/UAS. The system identifies and tracks targets while awaiting selection from the warfighter. The unmanned system FO Kit is directed to operate in GPS-denied environments using Guidance, Navigation, and Control (GNC) systems for operation in such GPS denied or degraded environments, The present invention's FO Kit preferably comprises an on-board GNC module that serves to replace the forward observing human with an autonomous system that will communicate with personnel at safe distances from the enemy. The FO Kit identifies, tracks, and records enemy targets and movements and transmits the video to a warfighter who selects the target and action to take on the target. The selection and desired target data is then relayed to the UAV and one or more rounds/munitions mounted thereon so that the UAV may release or otherwise deploy the round/munition at the appropriate time to engage the selected target, and so that the round/munition may adjust course in flight to engage the desired target. In this way, it also may act as a seeker for incoming munitions, allowing for less expensive seeker systems to be implemented within the munition itself. Finally, in parallel to the targeting functionality, the sensors and cameras used to observe the target will aid in navigation of the UAV in GPS-denied or degraded environments using optical image processing methods. The FO Kit with On-Board GNC Module acts as a forward observer, transmitting video of enemy target environments to the warfighter who selects targets. The FO Kit tracks the desired targets and communicates the target information to incoming munitions via radio. The munitions then engage the desired target. The FO Kit can communicate to multiple munitions and decides the optimal target for each munition based on prioritization provided by the warfighter. The FO Kit also utilizes its own sensors and cameras to get velocity and rotation measurements from optical flow to aid UAV navigation in GPS-denied environments. The FO Kit acts as an autonomous forward observer in order to provide target information while personnel maintains a safer distance from enemies to utilize LRPF weapons currently utilized and being developed. Ultimately, the FO Kit will enable better direction and prioritization of single and salvo fires without putting the warfighter near the target area where the warfighter can select targets based on the multispectral imagery data, prioritize them, and conduct instant battle damage assessment.

Some embodiments of the present invention comprise a multi-rotor UAV with visual cameras for targeting, a storage/release mechanism for holding and dropping munitions or other attachments, and radio communication to the warfighter over short ranges (<10 km). The system may also include what is being called "Safety Supervisor" capabilities to avoid dropping munitions on friendly areas using location zoning and scene recognition to activate and deactivate munitions. Examples of such Safety Supervisor systems are described in U.S. patent application Ser. No. 17/975,743, which was filed on Oct. 28, 2022, and which is hereby incorporated by reference for its disclosure of navigation, fuzing, and guidance systems and methods. The FO Kit is preferably a modular design able to be mounted to virtually any unmanned vehicle system with varying levels of modification required based on the design of the particular unmanned vehicle, and preferably includes hardware and/or electronic components for communication with the munitions in flight. This FO Kit will enable the warfighter to deploy inexpensive autonomous aerial systems to observe, record, and transmit enemy target information to warfighters remaining a safe distance away from enemies, and transmit target guidance information to the munition during flight to enhance accuracy and lethality of Long-Range Precision Fired weapons. The user(s) need only to load and initiate the system and provide a command for such autonomous systems to begin operation, and the system then carries out its preprogrammed functions according to the protocols provided to the system without user input.

Preferably, the FO Kit can be mounted to different types and sizes of unmanned vehicles to act as a forward observer for warfighters in the field. In one non-limiting exemplary embodiment utilizing UAVs, in order to perform the duties of a forward observer, the FO Kit is physically mounted to the underside of a UAV that flies toward enemy targets and is electronically connected in order to communicate with the UAV. The UAV itself provides position, velocity, and orientation information to the Kit. The FO Kit is outfitted with different types of cameras in order to examine and record enemy activity in different weather and lighting conditions including visual cameras, IR cameras, and other types deemed necessary through analysis of requirements. The cameras along with inertial sensors within the Kit will aid the UAV in autonomous flight in GPS-denied and degraded environments through techniques/algorithms such as optical flow and scene recognition in addition to more traditional Kalman Filtering techniques. The Kit is also outfitted with communication technology in order to transmit information about the targets to both the warfighter/fire-control system and the munition incoming toward the target for up-to-date target positioning, movement, and prioritization or reselection.

The FO Kit may preferably include on-board GNC which results in a flexible module that can be fitted to different UAV platforms and is capable of improving the accuracy and effectiveness of precision-strike munitions while allowing warfighters to maintain safer distances from enemy lines. This FO Kit can increase the capabilities of a typical forward observer by actively communicating with the munition in flight and guiding it to the desired target, rather than assessing the impact and reporting back just the result. It may also allow the warfighter to see the result in real time by streaming video of the target area. Also, by allowing for tracking of the target and guiding the munition toward it, the need for expensive, high performance seekers within munitions is decreased. The FO Kit provides target information that can aid or possibly replace the seeker module altogether.

Other features and advancements of the present invention include improved guidance, navigation, and control (GNC) in GPS denied and degraded environments, and being resistant or immune to GPS jamming, spoofing, or other GPS-hindering issues. The various systems, sensors and elements of the invention can be used to communicate securely and to provide consistent, secure information related to global (absolute) as well as relative position. The guidance and navigation aspects of the present invention involve combinations of one or more sensors capable of operating in GPS denied or degraded environments, and include one or more of infrared sensors, visual imaging sensors, radar, sonar, gyroscopes, accelerometers, magnetometers, and/or more preferably, one or more inertial measurement units (IMUs) comprising one or more of the above sensors. In many embodiments, combinations of multiple low-accuracy or low-resolution IMUs are utilized to provide high-accuracy or high-resolution location and guidance results while minimizing cost without sacrificing resolution or accuracy, sometimes referred to as multiple inertial measurement unit (MIMU) systems. Examples of MIMU systems, including numerous system designs, operation methods, processing methods and algorithms, and detailed descriptions, that are preferably used in the present invention are described in U.S. Pat. No. 10,527,425 (issued on Jan. 7, 2020), U.S. Pat. No. 10,527,427 (issued on Jan. 7, 2020), U.S. Pat. No. 10,969,226 (issued on Apr. 6, 2021), U.S. Pat. No. 11,118,909 (issued on Sep. 14, 2021), U.S. Pat. No. 11,585,660 (issued on Feb. 21, 2023), and U.S. Pat. No. 11,692,828 (issued on Jul. 4, 2023), as well as the following pending U.S. patent applications: application Ser. No. 17/182,362 (filed on Feb. 23, 2021), and application Ser. No. 18/081,822 (filed on Dec. 15, 2022), all of which are hereby incorporated by reference for the above-mentioned disclosures. Multiple UAV systems may be utilized and enabled to provide data and information between each other allowing for redundant, secure data information useful for GNC.

Another beneficial aspect, and an object of the of the present invention is the ability to provide low cost weapons systems that are easily and readily deployable without significant fear or concern over the loss of such systems—in other words, to provide an affordable mass of weapons systems that balance the range, size, speed, survivability, and capacity of the weapons as well as the cost. The relatively low cost UAV and weapons systems of the present invention enable and seek to optimize exactly that balance. This balance enables another object of the present invention being providing a large number of the systems described thus far, deployed together and in concert with each other, to create a swarm of weaponized vehicles. In some embodiments the present invention enables the delivery and/or deployment of at least a ten to one advantage cost imposing strategy over adversaries that allows the warfighter/military unit to overwhelm the battle arena (e.g., airspace) with a significant number of threats that cannot be ignored. The present invention allows for such capability with its low cost systems that can be deployed in clusters or swarms to provide significantly increased numbers of UAVs, each potentially with numerous rounds/munitions, and where the loss or destruction of a single UAV will provide no relief to the enemy. The weaponized UAV swarm provides a disproportionate impact on the adversary due to the fact that: 1) it costs the military very little in comparison to many other approaches, 2) it is difficult to detect when making a high speed NOE ingress, 3) it is difficult to defeat with low cost weapons, 4) its resilience requires the adversary to devote significant resources and time to denying the swarms their objectives, and 5) the swarm is capable of destroying dozens of vehicles, air defenses, and infrastructure to disintegrate and confuse the enemy. For example, a single cluster may comprise one or more command and control (C&C) that operate far out of the range of the enemy (e.g., at extremely high altitudes), and to coordinate the operation of one or more (preferable numerous) munitions delivery UAVs that can engage the enemy directly but are more susceptible to loss. Even more preferably, numerous such clusters may be deployed. As such, there may be a large mass of UAV and munitions available and swarming over the enemy, making it vastly difficult for the enemy to engage and disable an effective number of UAVs to avoid or neutralize the threat—where such mass also means that the loss of any one element or asset is not crippling or significantly damaging to the warfighters' effort. This further allows for the attention of the enemy to be confused and/or diverted from high-value targets and directed to the numerous UAVs, which preserves and maintains the safety of the warfighters' higher value assets.

Another aspect and object of the present invention is the development of a modular open system approach (MOSA) that enables various subsystems to interact, coordinate, prioritize, and optimize their relative functions for a given CONOP, mission, or activity during a mission. For example, a navigation subsystem may be preferably prioritized during flight of a UAV embodiment from the launch point toward the potential arena where the camera and sensor data is allocated more processing resources to provide data for navigation and control of the UAV, and then when the UAV approaches the potential arena for operations, target identification subsystems may be prioritized to provide extra resources for increases speed and accuracy of target identification, then shifted again to target tracking and perhaps communication to transmit and receive confirmation from a warfighter, then once again shifted to providing target information to one or more of the attached munitions, then fuzing may be prioritized to ensure all safety protocols are satisfied prior to releasing the munition, and ultimately shifting resources again to guidance of the munition(s) to engage the target. This is merely one high-level example. Many subsystems may be defined, and may be different for different embodiments and configurations.

A tool developed as part of the present invention that significantly contributes to the MOSA architecture is that of a universal software translator that enables a truly modular structure where disparate components and elements may be integrated into a single architecture and to coordinate and communicate with each other despite operating according to different operating systems, programming languages, or software/firmware/hardware architecture. The present invention is effectively a truly plug-and-play system that integrates the various subsystems easily and without need for lengthy and costly development, and allows for rapid, even in-the-field, upgrades of the system to meet needs and challenges encountered.

Various embodiments of the flow control system of the present invention involve different elements including sensors, active flow control devices or activatable flow effectors, and logic devices with hierarchical, and either open-loop, semi-closed-loop, or preferably closed loop control architecture. The sensors of these various embodiments are used to estimate or determine numerous variables and conditions that effect the flight/travel of the unmanned vehicle as well as the munitions or other releasable or deployable elements. The active flow control devices or activatable flow effectors of the unmanned vehicles and/or munitions or other deployed elements can create on-demand flow disturbances to affect the flow of fluid or air in a desired manner at different points along the various surfaces for enhanced aerodynamic control, maneuverability and/or stabilization effect. The logic devices are embedded with a hierarchical control structure to allow rapid, real-time control of fluid flow at the surface. The hierarchical structure may involve multiple vehicles or systems, where, for example, a command and control vehicle is in control of the coordination of multiple other vehicles. The hierarchy may refer to internal hierarchy within a single vehicle where the various subsystems of the individual vehicle are controlled according to a particular mission, need, or conditions. The hierarchical structure may be a multi-layered hierarchy comprised of both internal hierarchy within a single unmanned vehicle as well as swarm or group level hierarchy where the individual vehicle receives signals and commands from a separate command and control vehicle.

With respect to the hierarchical control of the flight/travel of a vehicle, munition, or other deployable/releasable element, the logic device(s) with the hierarchical control structure are preferably composed of at least two levels of hierarchy or structure. The lower level in various embodiments is composed of multiple local or minor-loop feedback controllers that modulate the discrete sections of the aerodynamic surfaces or aerodynamically-coupled surfaces and track flight/travel trajectories supplied by the global control system. The logic/control laws for the local controllers may be resident within local control modules. The higher level global control system, which in various embodiments takes as input the flight/travel path and supplies as output the control surface directional commands to activate or position the aerodynamic surfaces as necessary to achieve the desired flight/travel path. The global control system may be either centralized or distributed, and therefore, its logic, may also be fully or partially resident within one or more logic devices, and/or one or more separate vehicles.

One embodiment of the present invention includes a guided round or munition comprising: an airframe comprising a forebody, a midbody, and an aftbody; a sensor suite adapted to measure vehicle state data of the round or munition in flight; at least two pairs of mechanically and electrically coupled control surfaces located on the forebody of the airframe and disposed equidistant from each other around the circumference of the airframe, at least one of the at least two pairs dedicated to controlling pitch of the round or munition in flight, and at least one of the at least two pairs dedicated to controlling yaw of the round or munition in flight, each pair comprising an actuator adapted to activate or adjust its pair of control surfaces; at least two midbody wings; at least four aftbody tailfins dedicated to controlling roll of the airframe in flight; at least one radio adapted to provide two-way communication between the round or munition and a host vehicle and/or between the round or munition and a remote user, the radio adapted to receive at least in part target information from the host vehicle or from the remote user; a warhead or payload; and a flight controller adapted to: 1) receive the measured vehicle state data and the target information, 2) either: a) receive a flight path from the host vehicle or the remote user, or b) determine a flight path to intercept a target based on the vehicle state data and the target information, and 3) determine adjustments for at least one of the at least two pairs of mechanically and electrically coupled control surfaces and/or at least one of the at least four tailfins, the adjustments adapted to keep the round or munition on the flight path in order to engage the target. Another embodiment of the present invention includes a guided round or munition comprising: an airframe comprising a forebody, a midbody, and an aftbody; a sensor suite adapted to measure vehicle state data of the round or munition in flight; at least two pairs of mechanically and electrically coupled control surfaces located on the forebody of the airframe and disposed equidistant from each other around the circumference of the airframe, at least one of the at least two pairs dedicated to controlling pitch of the round or munition in flight, and at least one of the at least two pairs dedicated to controlling yaw of the round or munition in flight, each pair comprising an actuator adapted to activate or adjust its pair of control surfaces; at least two midbody wings; at least four aftbody tailfins dedicated to controlling roll of the airframe in flight; at least one radio adapted to provide two-way communication between the round or munition and a host vehicle and/or between the round or munition and a remote user, the radio adapted to receive at least in part target information from the host vehicle or from the remote user; a warhead or payload; and a flight controller adapted to receive data and commands from the host vehicle or from the remote user and to adjust the flow effectors based on the received data and commands, wherein the round or munition exhibits a ratio of warhead/payload mass to inert component mass of at least 3:1.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention. They are not, however, intended to be limiting or to illustrate all envisioned embodiments.

BRIEF DESCRIPTIONS OF THE DRAWINGS

FIG. 1. Side view of one embodiment of a releasable munition with guidance capability configured to be released from an unmanned aerial vehicle and to be guided to a target.

Figure 2A:
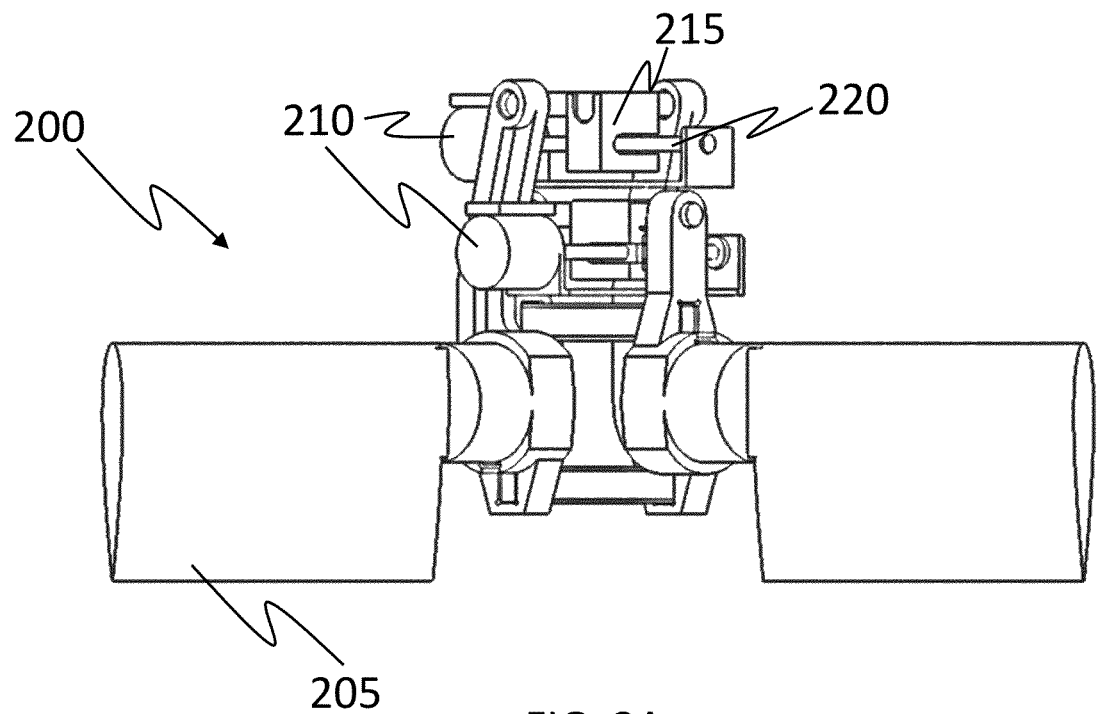
Figure 2B:
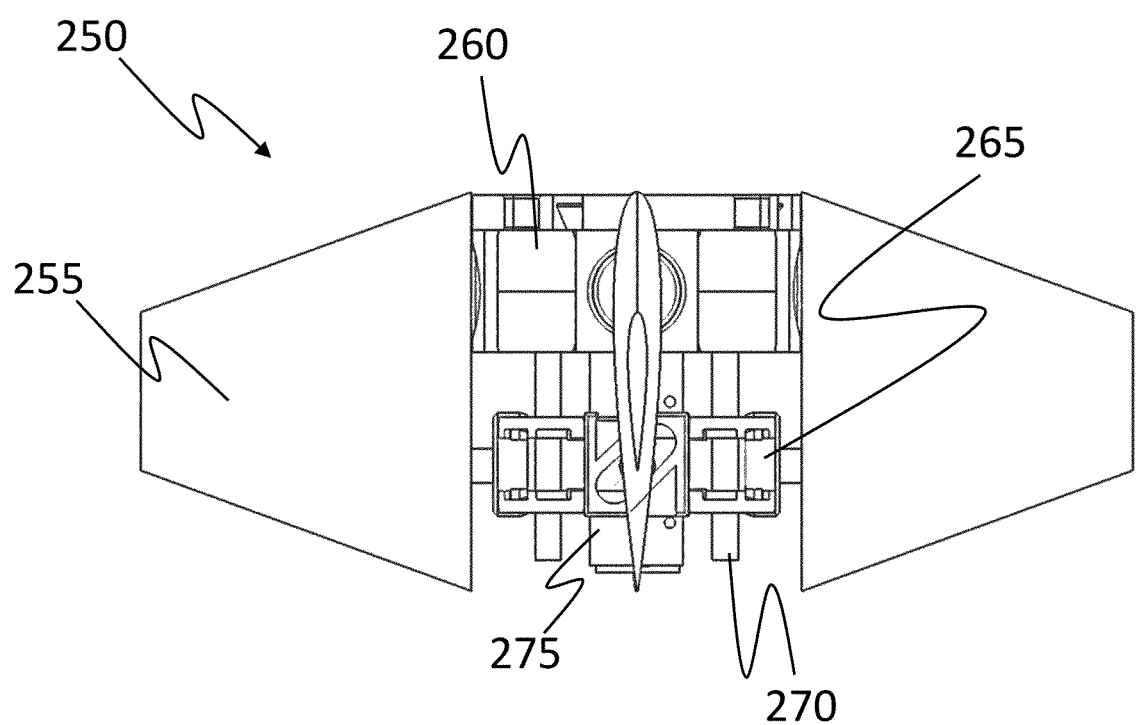

FIGS. 2A-B. Modular control actuation systems (CAS) configured to be assembled into a releasable munition and to activate their respective flow effectors to provide maneuvering and/or stability and to guide the munition toward a target, the separate modules included (A) canard system configured to affect pitch and yaw of the munition, and (B) fin system configured to affect roll of the munition.

FIGS. 3A-D. Multiple views of one embodiment of the weapons release system/mechanism configured to keep the releasable/deployable elements attached securely to the unmanned vehicle until commanded to be released, and then to release said elements causing minimal roll, pitch, and or yaw to the element upon release, the several views including: (A) isometric view of the release system including three releasable munitions; (B) side view of the release system including three releasable munitions; (C) front view of the release system including one releasable munition and one empty releasable element position; and (D) opposite view of the release system including one releasable munition and one empty releasable element position FIG. 4. Image depicting one embodiment of a Guided round/munition/Drop Glide with cutaways to show internal components.

Figure 5:
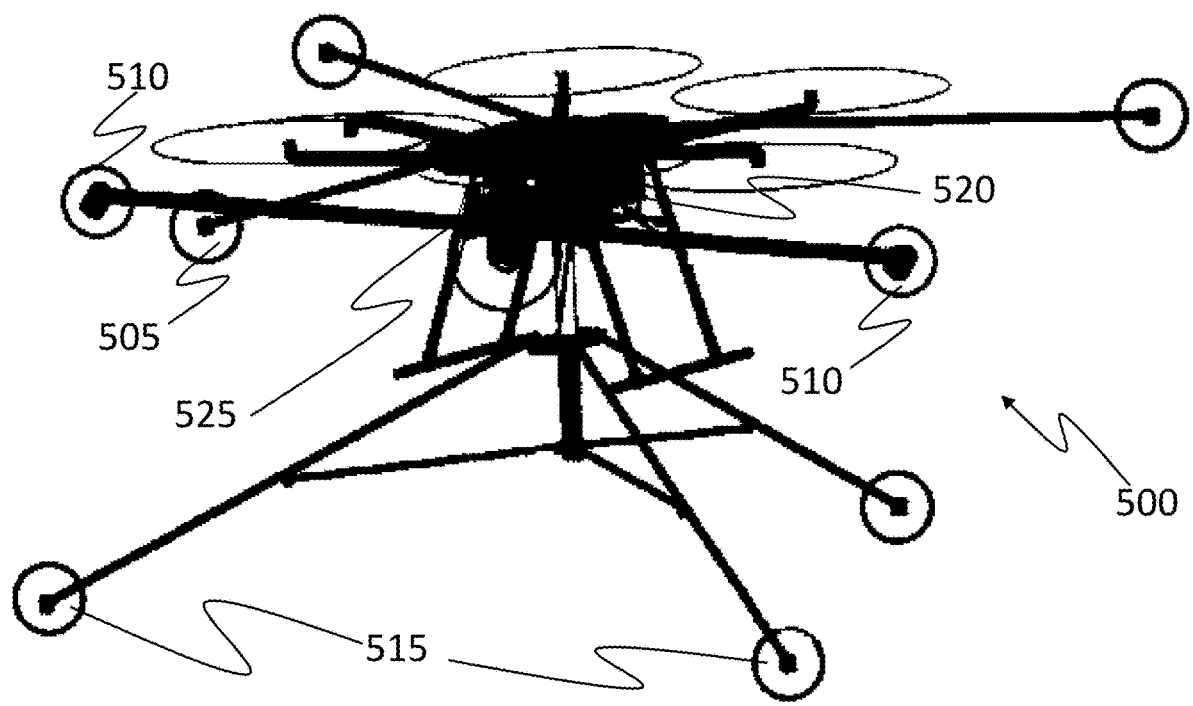

FIG. 5. Drawing depicting one embodiment of an unmanned vehicle usable with the present invention including various sensor systems/suites.

Figure 6:
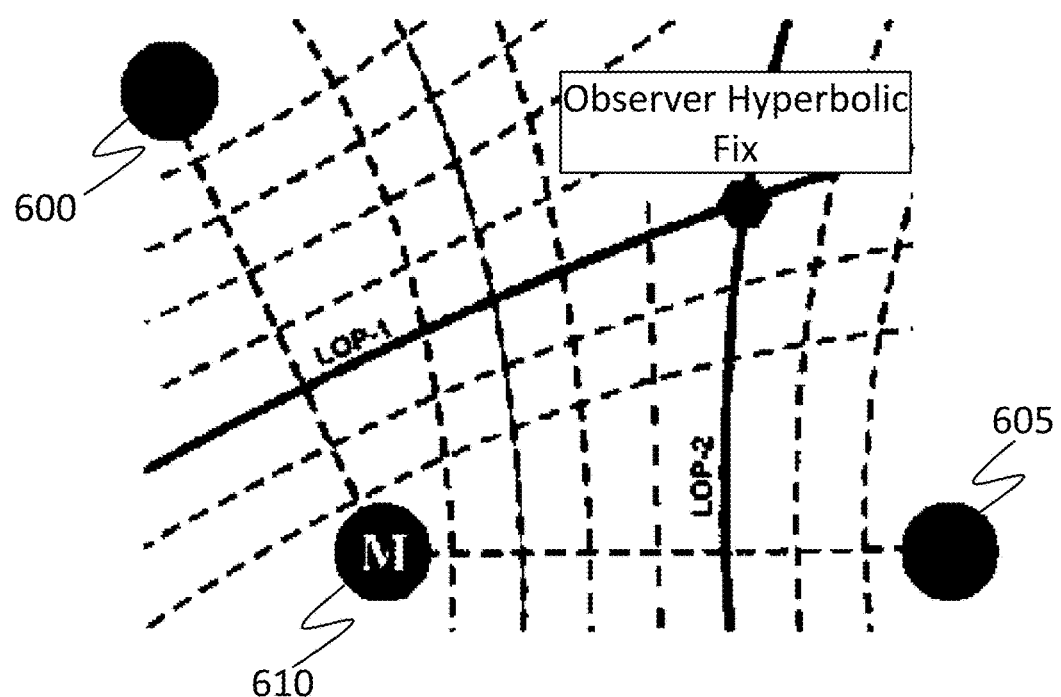

FIG. 6. Graphical depiction of a multilateration algorithm operation for determining a stationary or moving object's position based on measurement of the times of arrival (TOAs) from its transmitter.

Figure 7:
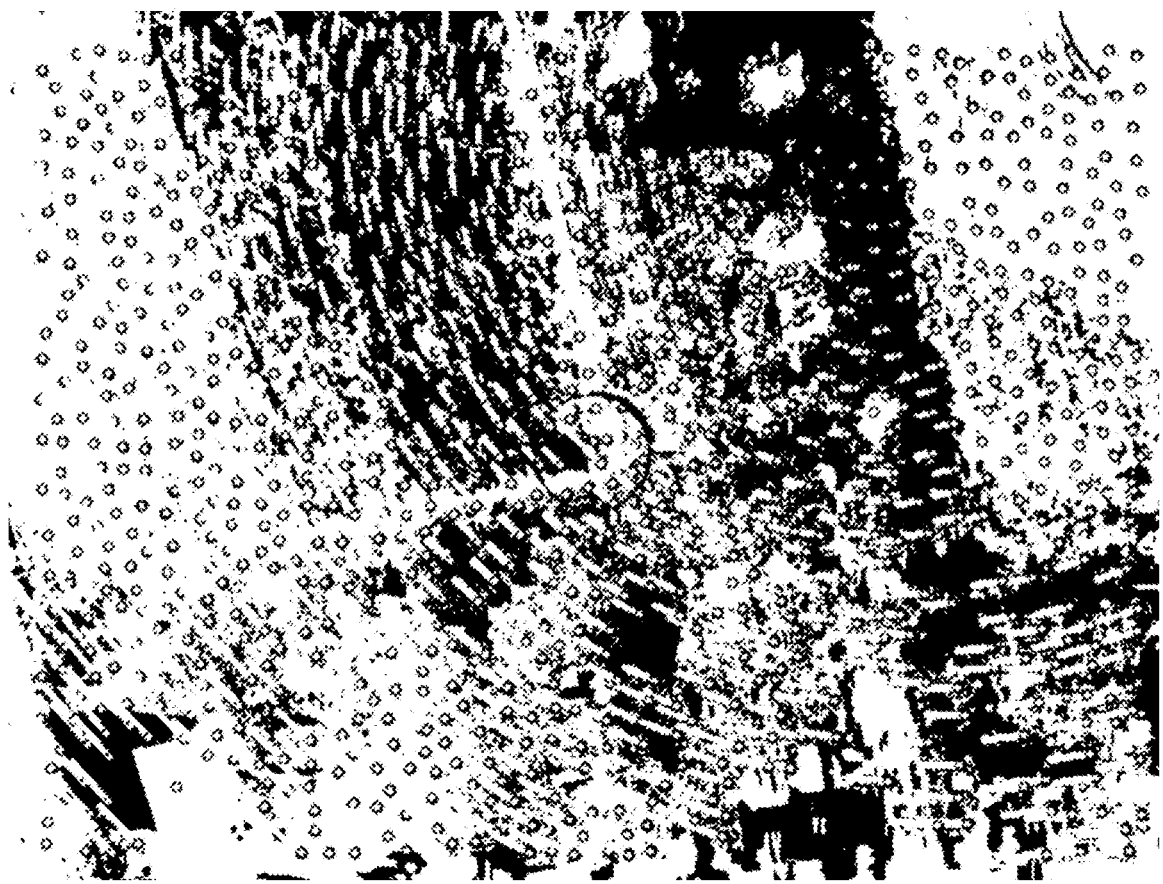

FIG. 7. Visual depiction of optical flow data, which is a computer vision method that uses the change in sequential images to determine motion (velocity and rotation) of the camera by tracking features extracted from the image.

Figure 8:
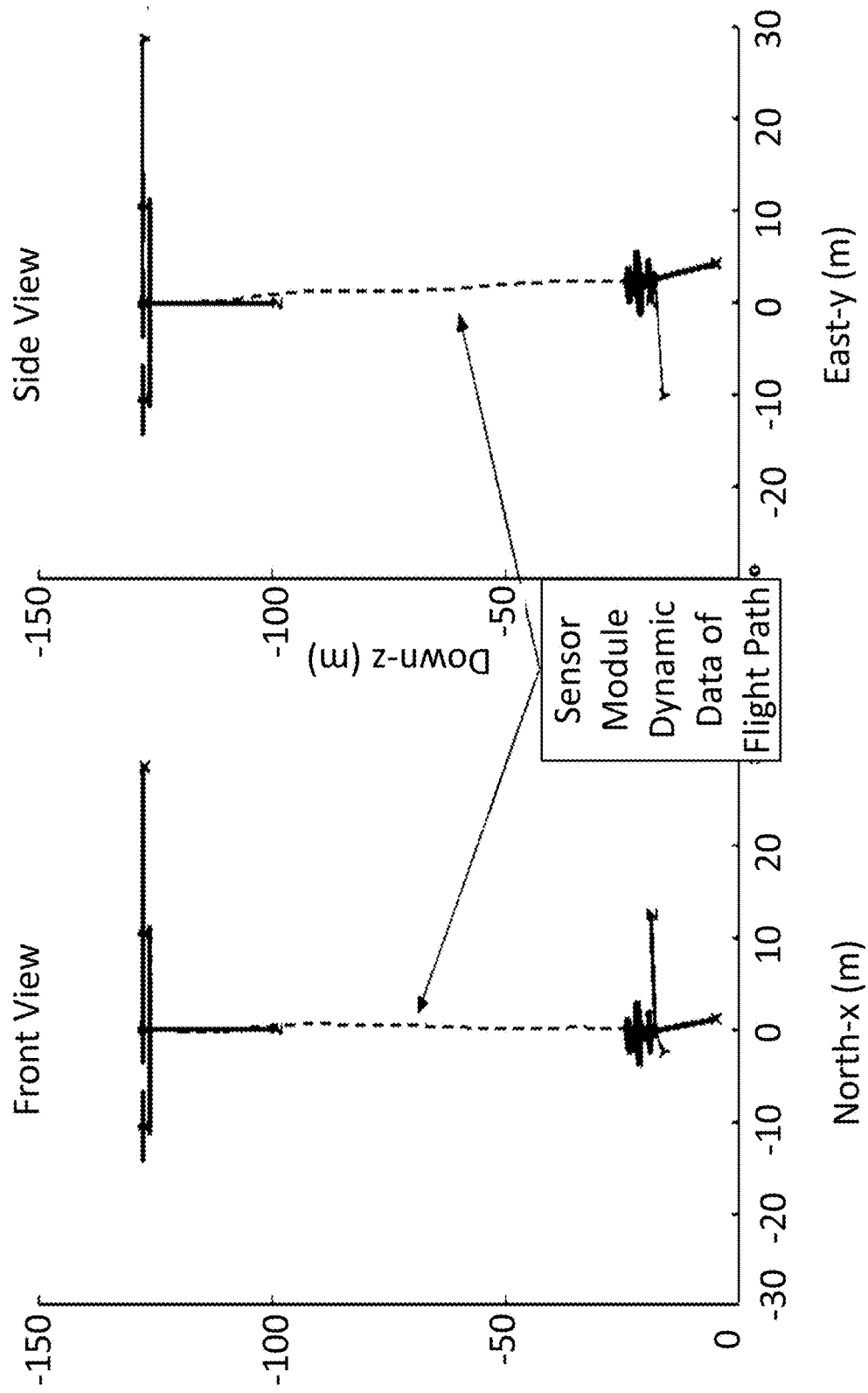

FIG. 8. Example depicting optical flow data processing of sensor data acquired during flight of a released munition with real-time guidance along a flight path determined based on the sensor recordings.

Figure 9:
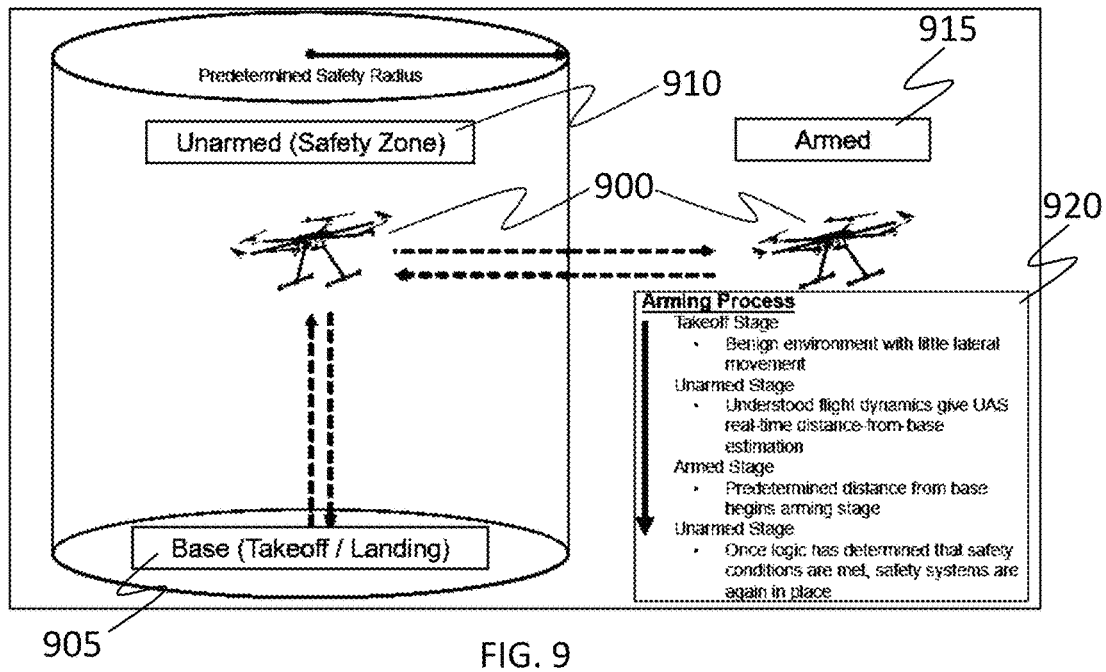

FIG. 9. Graphical depiction of the Safety Supervisor module and operation of the present invention depicting the various stages of flight of a UAV according to Safety Supervisor protocols.

Figure 10:
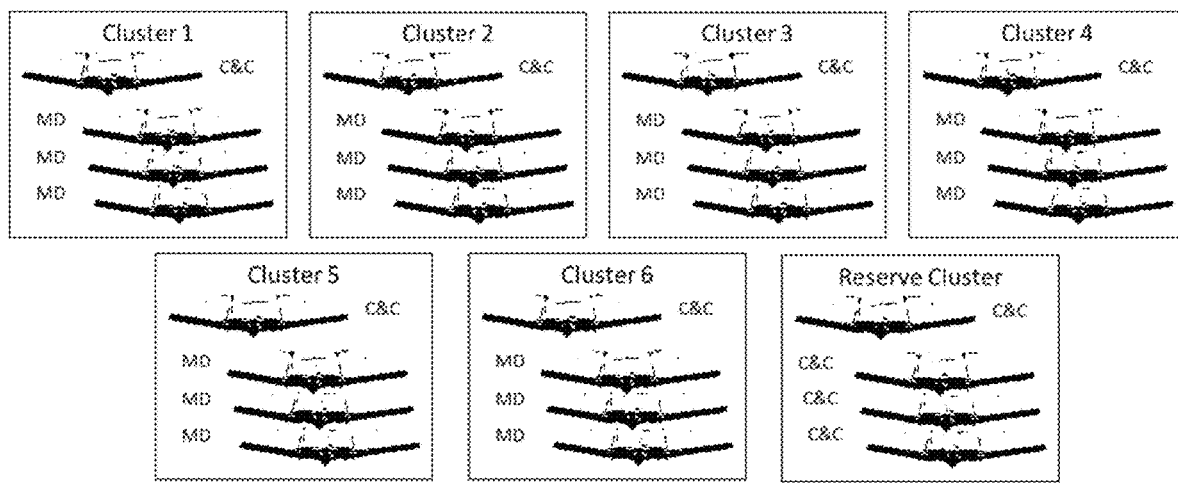

FIG. 10. Representation of unmanned vehicle swarming clusters comprising numerous groups of UAVs where each group comprises one command and control UAV and several delivery UAVs.

Figure 11:
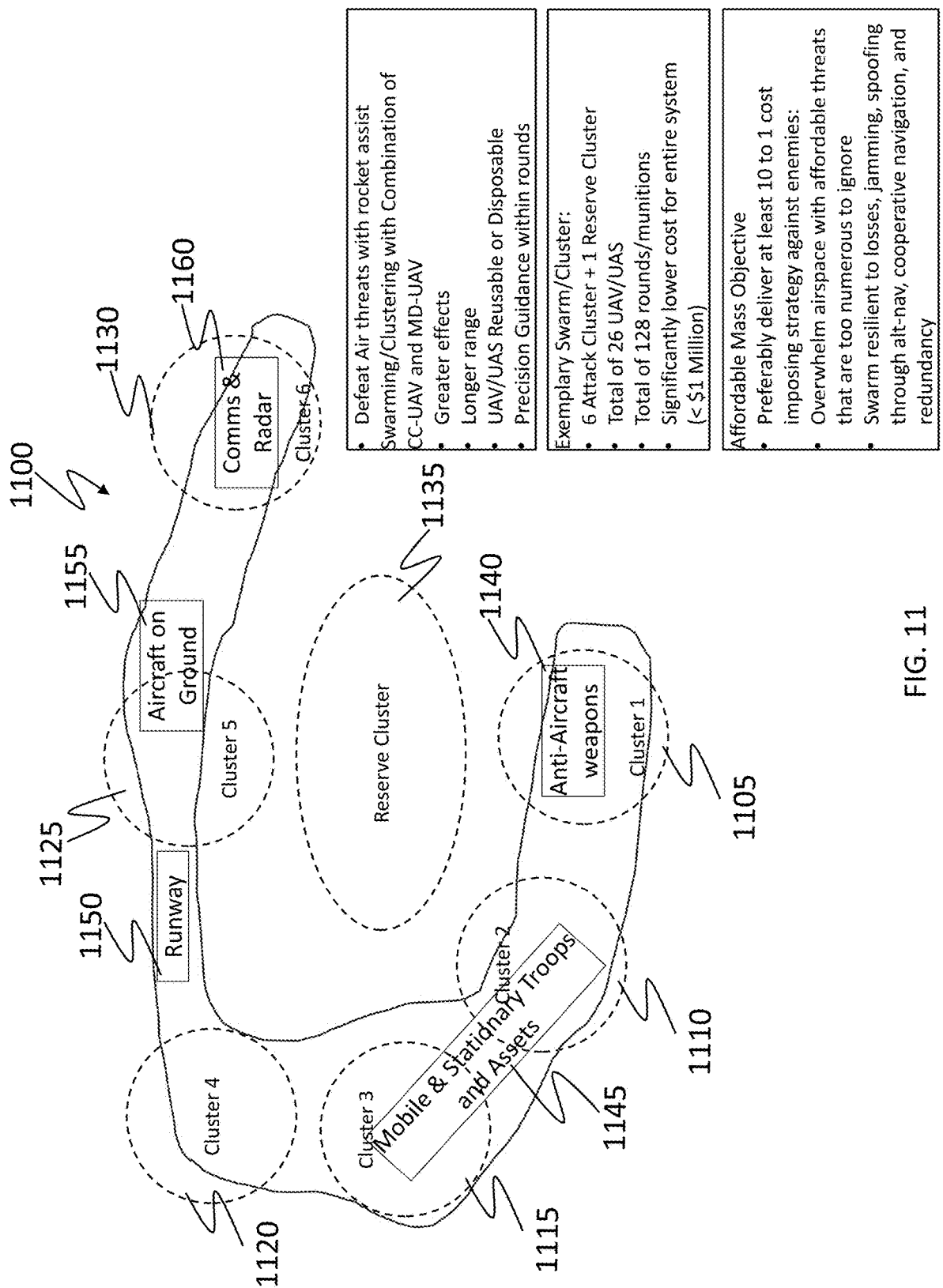

FIG. 11. Picture depicting an operational example of unmanned vehicle swarming embodiments.

Figure 12:
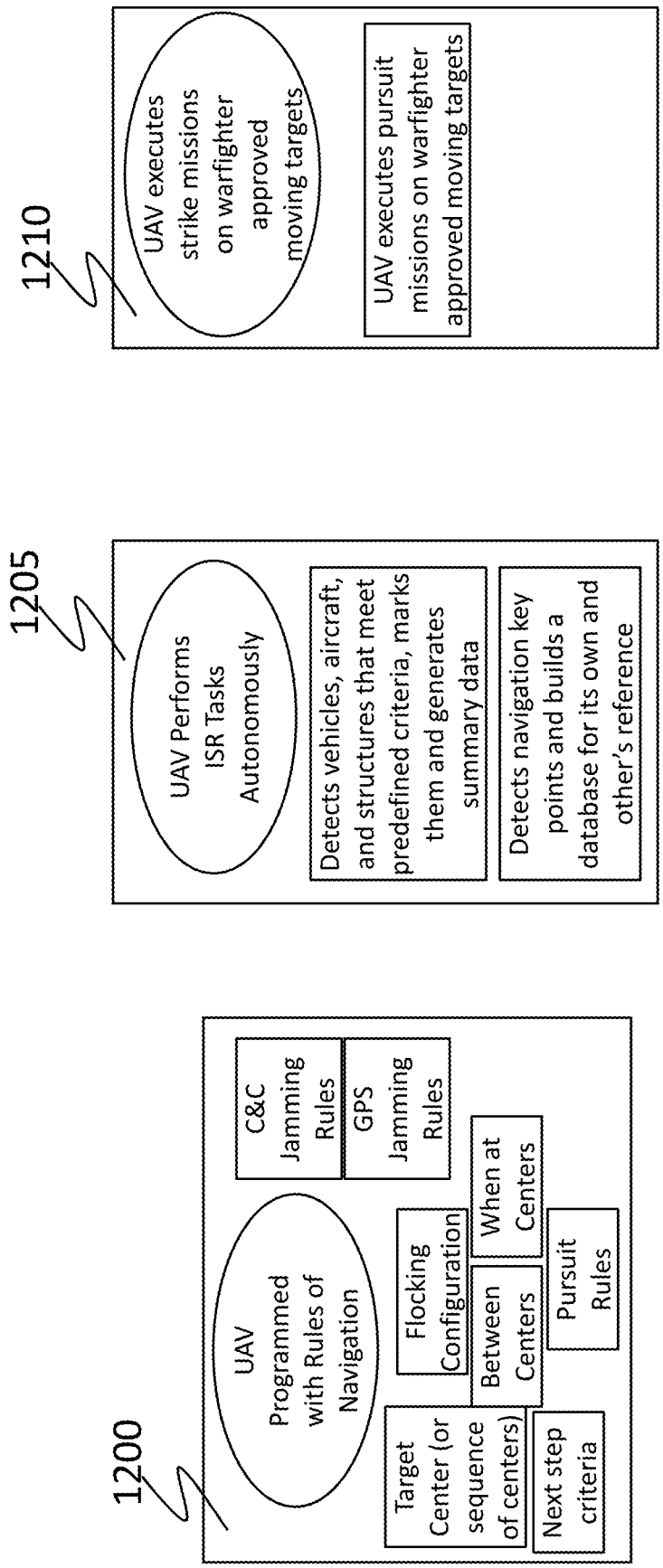

FIG. 12. Organizational chart depicting programmed UAV behavior for delivering swarming capability and functionality.

Figure 13A:
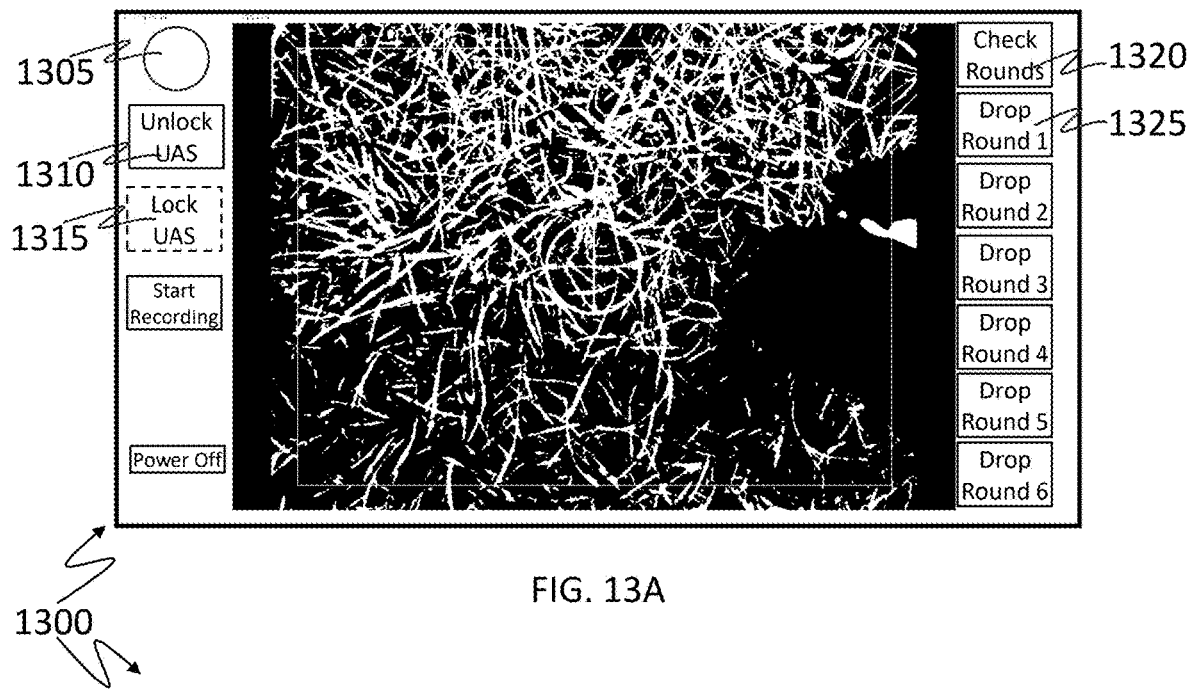
Figure 13B:
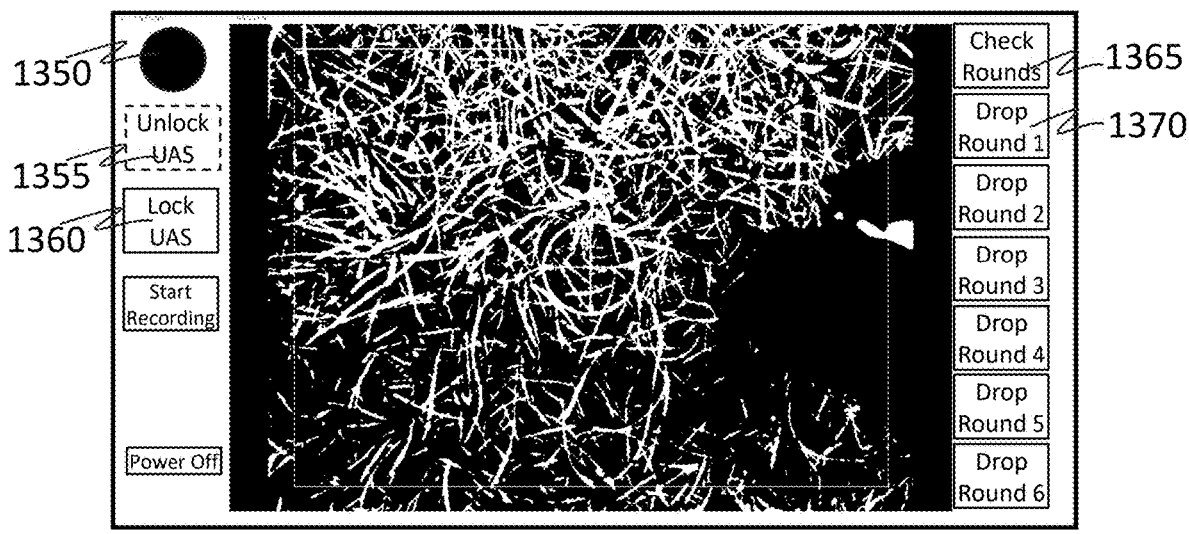

FIGS. 13A-B. Screenshot depictions of the Fire Control Station (FCS) interface with Safety Supervisor controls and round/munition controls enabled or disabled based on the Lock/Unlock status of the FCS commands sent to UAS.

Figure 14:
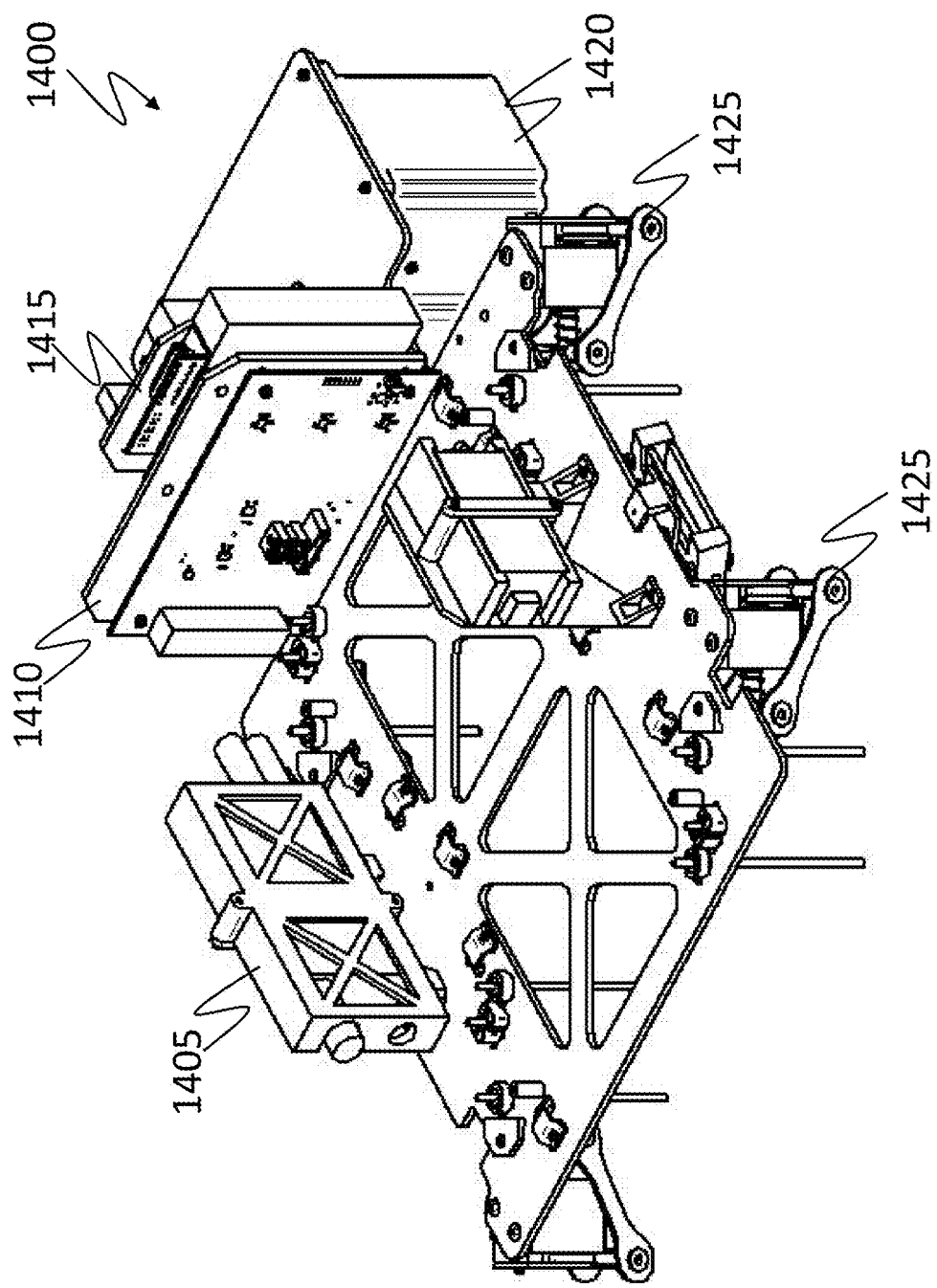

FIG. 14. Image depicting one embodiment of the Weapons Release System.

DETAILED DESCRIPTION OF THE INVENTION AND DRAWINGS

The present invention is directed to unmanned systems, and primarily vehicles, and in most embodiments unmanned aerial systems (UAS). Such invention is further directed to unmanned weaponized systems that not only carry weapons functionality, but allow for advance observation and reconnaissance as well. These unmanned systems are largely directed toward military applications where the weaponized unmanned system may be forward deployed to allow human warfighters to remain at long range distances from the potential targets, and to provide surveillance, target identification and tracking, general reconnaissance information, and the like, while also providing weaponized attack capabilities. The unmanned systems may, in some embodiments, include advanced command and control capabilities for communication between the system and the remote, rear-positioned warfighter, and between separate elements of the unmanned system. Many embodiments also include weapons systems, munitions, or rounds with and/or without guidance and real-time maneuverability capabilities as well.

The FO Kit was primarily designed based on the immediate need for such capability in UAVs, though, as mentioned, the system is intended to be platform-agnostic and able to be retrofitted or otherwise modularly able to be utilized with virtually any UAS and/or modified for use in conjunction with virtually any type of unmanned system or vehicle. In the exemplary embodiment of a UAV (multi-rotor or fixed wing), the UAV is preferably outfitted with multiple visual cameras for navigation and targeting, and storage/release mechanism that holds and drops multiple munitions of different types, communication radios, and an onboard processing system. The present invention's FO Kit, as attached or otherwise integrated with the UAV, operates such that targets are identified and tracked by the UAV, while video is transmitted to the warfighter who selects the target and gives the release command. The UAV then approaches (manually controlled by a warfighter, semi-autonomously with periodic or as-needed intervention by a warfighter, or autonomously without any input from a user after initiation of the system) the desired target and positions itself based on the environment and target motion to release the munition in order to hit the target.

UAV/UAS

With respect to UAVs in particular, the present invention is designed to be able to be mounted and/or integrated with virtually any such vehicle, and again, to be platform agnostic such that little engineering work is required for such mounting/integration. Many embodiments of the present invention are directed to military applications, and as such, it is useful to note the military UAS groups for categorizing UAS according to size and capability. The military UAS classifications, along with examples of UAS that fit into each group and which are applicable to the present invention, are as follows in Table 1:

TABLE 1

| Military UAS Group Categorization | | | | |
|---|---|---|---|---|
| UAS Group | Maximum Weight (lb.) (MGTOW) | Normal Operating Altitude (ft) | Speed (knots) | Representative UAS |
| Group 1 | 0-20 | <1,200 AGL | 100 | RQ-11Raven, WASP, Puma |
| Group 2 | 21-55 | <3,500 AGL | <250 | ScanEagle, Flexrotor, SIC5, Theiss Validus Hex, Anduril Ghost |
| Group 3 | <1,320 | <FL 18,000 | | V-BAT, RQ-7B Shadow, RQ-21 Blackjack, NavmarRQ-23 Tigershark, Arcturus-UAV Jump 20, Arcturus T-20, SIC25, Resolute ISR Resolute Eagle, Vanilla |
| Group 4 | >1,320 | | Any speed | MQ-8B Fire Scout, MQ1A/B predator, MQ-1C Gray Eagle |
| Group 5 | | >FL 18,000 | | MQ-9 Reaper, RQ-4 Global Hawk, MQ-4CTriton |

It is important to note that, for military applications, any UAV/UAS in Groups 3-5 require a certified, qualified pilot to operate the UAV/UAS. One specific, non-limiting example of a UAV for which the systems and methods of the present invention is readily usable is the Validus® Hex manufactured by Theiss UAV Solutions, LLC, a female-owned small business in North Benton, Ohio. The Validus® Hex is a commercially available Group 2 hex copter unmanned aerial Vehicle (UAV) that models some of the exemplary features of the systems and capabilities that best highlight the features and benefits of the present invention. The Validus® Hex is a heavy lift UAV designed to carry large payloads while staying below the 55 lb Gross Maximum Take-off Weight (GMTOW) necessary to remain a Group 2 UAV. This USA-made UAV has received airworthiness releases and Exception to Policy (ETP) waivers to fly on US Army and other military facilities for previous hardware delivery programs. The Validus® Hex is a good example of a preferred UAV/UAS for the present invention as it a Group 2 UAV/UAS with sufficient size and capabilities to carry sufficient sensors, sensor suites, and electronics packages to carry out the various data collection, processing, and transmission requirements of the present invention, as well as to carry the Weapons Release Systems with a sufficient number of releasable rounds/munitions (also referred to as Drop Glides for many embodiments of the present invention) to carry out one or more missions/engage one or more targets with a single unit. To this point, the Validus® Hex exhibits a takeoff weight of 25 lbs., and can thus carry a payload weight of p to about 30 lbs. This is particularly noteworthy given that the rounds/munitions of the present invention, described in greater detail below, are preferably less than 10 lbs. each, and even more preferably closer to 5 lbs. each, including body, electronics, and payload. Such lightweight construction of the UAV/UAS as well as the rounds/munitions is particularly important for consideration of deployment of the system by a warfighter-lighter weight components means that more systems may be carried and deployed by the warfighter. Additionally, being a Group 2 UAS, a certified, qualified pilot is not required, and therefore a larger number of warfighters may be employed to deploy and operate the systems without requiring extensive certification and training. Other notable features of the Validus® Hex, and many of the other applicable UAVs/UASs, include: variable flight times of at least 20-30 minutes depending on payload, altitude, and flight dynamics; rugged airframes produced from lightweight but durable materials; handheld remote control for flight and safety operations, and ground control station with touchscreen interface that allows for "click to fly" autopilot functionality as well as enabling user target identification and selection; redundant onboard sensors for the autopilot (e.g. altimeters and inertial sensors); electrical battery power for weight reduction (although gasoline or hybrid powered systems are also contemplated for various embodiments to provide increased time of flight); and geofencing safety system, connection, and navigation fail safes. In the nonlimiting, exemplary embodiment of the Validus Hex UAV, the Weapons Release System fits completely under the landing gear and along sides of the body of the Validus Hex, which means the system still folds up into a 24 inch/600 mm cube when stowed. Again, the WRS is compatible with virtually any UAV with minor modifications for the particular structure, but preferably any UAV or other vehicle to which the WRS is desired to be mounted or integrated that can lift/carry at least 15-30 lbs. and support a MAVLINK connection to its autopilot. The UAV is fully integrated with a WRS and loaded with 4 drop glides and the battery pack is preferably less than 55 lbs. takeoff weight.

A multirotor UAV can be easily employed with very little footprint and enable effectiveness in various ranges, and preferably is adapted to be folded up and carried by a user, such as being placed into a backpack or some other such form factor of easier transit over very rough terrain. Multirotor, within the scope of the present invention, may include rotor-driven UAV of any type and size, including those with 2 rotors, 4 rotors, 6 rotors, or 8 or more rotors-a rotor being defined as a motor with a propeller. A hybrid multirotor can still have many of the benefits of a multirotor for takeoff but then transition to forward flight for great range, endurance, and velocity. This velocity opens up alternate means for delivering guided and unguided projectiles. Fixed wing solutions offer maximum range and performance in exchange for needing a small runway. "Tailsitter" fixed wing aircraft enable many of the benefits of a true fixed wing but allow for vertical takeoff and landing similar to a multirotor in exchange for a small drop in efficiency as compared to the traditional fixed wing. The UAV/UAS of the present invention may be used as a delivery system for another vehicle (e.g., a smaller UAV such as a Skydio S2+) of any type to a more advantageous launch point to complete its mission. This aerial, ground, surface or subsurface vehicle could persist, loiter, or patrol nearby to provide a communications relay, fuel/power resupply, and ammunition resupply without having to return to base, and could also release or launch projectiles as coordinated by vehicles deployed that act as both a strike weapon and as a forward observer for $3^{rd}$ party sources.

Small UAS (sUAS), typically Group 1 UAS, are being utilized for a variety of Reconnaissance, Surveillance, and Target Acquisition (RSTA) applications. These SUAS have many potential advantages including their lower cost, lower flight altitudes, and ability to navigate in and around ground based obstacles. However, sUAS often have severely limited range and endurance, leading to short range applications and limited mission effectiveness. Thus, in some embodiments, a Drop Glide attached the WRS may be substituted for an SUAS in order to allow the small UAS to be air launched. Then, the SUAS can be deployed from a larger aerial asset capable of carrying the Weapons release system and at least 1 small UAS to supplement the overall mission ISR and kinetic strike requirements. Air launching the SUAS allows the range and endurance of SUAS to be utilized for mission execution rather than travel to the desired mission area, thus increasing the useful life of a single SUAS in the span of a mission. Releasing the SUAS from the drop-release mechanism and air launching will enhance the survivability given the hover capability of the larger transport UAS. Releasing small UAS from the weapons release system will augment ISR and kinetic effects which can be provided in an area larger than can be surveilled using traditional SUAS ISR techniques. One envisioned concept of operation for such an embodiment would be to secure a sUAS to a Drop Glide slot, fly to a desired mission site, launch the SUAS and allow the SUAS to perform any or all of the functions of RSTA. In most embodiments the SUAS would communicate back to the controlled or autonomous UAV/UAS, conduct ISR, and communicate back to a ground station or other air assets. The SUAS would then either be flown back to ground forces or terminated and considered expendable. This suggests that the sUAS be low cost systems.

The primary subsystem of the UAV is the Ground Control Station. The Ground Control Station is preferably a laptop computer or tablet, preferably ruggedized, that is linked to the UAV via a radio system, such as a 900 MHz radio. The Ground Control Station allows the operator to use its touch screen to quickly produce a desired mission (flight altitude, velocities and waypoints) via an installed software package (e.g., an open-source software package such as Ardupilot® may be used) loaded onto the Ground Control Station. This software package allows the warfighter to operate in the "Click-to-Fly" mode whereby the user indicates a location or point on the touchscreen display and the UAV/UAS then flies to that location without manual control of the user directing the flight. The Ground Control Station allows the user to load preplanned missions via wired or wireless means to the UAV, command takeoff and landing when desired, and perform click to fly with the map view. These features permit lower skilled users the ability to rapidly gain proficiency with the UAV, rather than requiring extensive training to learn how to fly with the handheld RC controller. This interface also facilitates multi-tasking as multiple UAVs can be commanded from a single Ground Control Station. Additionally, the Ground Control Station software has many safety features and fail safes that can be enabled for low risk tolerance environments, and can be removed if inappropriate for operational environments by the user adjusting some configurations. For example, for the operational assessments of the Drop Glides, a geofence, radio link quality, and navigation health are all being monitored by the autopilot in flight. If any of these tests fail, the configured criteria, the UAS will return to launch position and land automatically or land in place depending on the situation.

Many embodiments of the present invention utilize various vehicle state (e.g., position and orientation) sensors that may be supplemented by onboard systems of the UAV/UAS, or entire sensor suites may be added. For example, autopilot hardware, either onboard the UAV/UAS or provided by the present invention as part of the vehicle state sensor system, preferably includes and integrates inertial sensors (IMUs), altimeter sensors and pressure sensors to determine the pose and behavior of the UAV. This data is used by the Fire Control Station to compute selected target locations on the screen based on user input. To attain the sensor outputs, a MAVLINK, for example, connection between the autopilot hardware and Edge Computer provides the physical interface that brings this vehicle state data into the WRS. The autopilot receives flight commands including takeoff, land, perform auto mission, and other flight commands from the pilot via the RFD900x radio link to the Ground Control Station or from the hand controller.

Many embodiments of the present invention utilize a Mission Status Subsystem within the WRS that includes hardware and firmware necessary to monitor and enhance the performance of the Drop-Glide munition payloads. The Mission Status Subsystem preferably utilizes the umbilical link plugged into each Drop-Glide to determine if the Drop-Glide is prepared to be released. The WRS preferably generates an identification message that confirms the mounting of a Drop-Glide. The Mission Status Subsystem and Drop-Glides both preferably have a LoRa radio which enables the WRS to connect to the Drop-Glide munition after release. The integrated LoRa radio within the Drop-Glide accepts target updates from the WRS while the munition is gliding to the target. This feature also allows Drop-Glide to benefit from the cameras and computer resources on board the WRS and then integrate those target updates rapidly into the Drop-Glides guidance system in route to the target. In concert with the navigation data generated by the MIMU within the Drop-Glide, the guidance logic generates new control outputs based on the current position of the falling Drop-Glide enroute to the target position, and the time remaining until impact with the ground.

Weapons Release System

Another important element of the present invention is the novel Weapons Release System (WRS). The WRS is the hardware and software system that is attached to a UAV to transform the UAV into a Weaponized Unmanned Aerial System (UAS). One exemplary embodiment of the platform WRS consists of: a) radio data-link to transmit information from the WRS to the Fire Control Station, b) Stores Release Hardware to secure, release and communicate with the Drop-Glide munitions, c) COTS Edge Computer (companion computer) to provide on-board data processing, assist in guided Drop-Glide navigation and Drop-Glide path planning and process the safety supervisory firmware, d) Ethernet switch to enable exchange of new hardware, e) ISR hardware with multiple imaging systems, f) connection to the UAV Autopilot for vehicle state sensing, g) umbilical connectors for mission state planning of the Drop-Glides, h) Safe Operation Software which resides on the Companion (edge) Computer, and h) Fire Control Station to interface with the WRS from the Ground. The WRS is the system of components designed to securely hold the munition and lock it in place onto the UAS until ready fire or release, and then to disengage locking mechanism's and release the rounds. It is modular in design and produced to be readily mounted onto or integrated onto other UAV platforms. To that point, the WRS is designed and adapted to be compatible with hovering vehicles (e.g., multi-rotor vehicles) as well as forward flight vehicle (e.g., airplane-like vehicles). The WRS allows the UAS to be reloadable in the field. When the UAV returns home, or to another friendly site, the empty round positions may simply be reloaded by placing a new round onto release mechanism in a given round position and locked into place. The UAS is then ready to be reused to carry on the same mission, or a new mission. This versatile reloading process allows for a user to replenish used rounds/munitions/Drop Glides, check and evaluate ensure the working order of the interlocking safety features of the fuze (including the locking mechanism and tether or umbilical), the electrical signal that creates unique states when connected or disconnected (with respect to the round), and to check and evaluate ensure the working order of the signal line in order to send a unique intent to release (intent to launch) signal or message, and also allows for activation of functions of the WRS that recognize that a round/munition/Drop Glide has been mounted to the WRS and to identify the type or round.

The WRS has several subsystems which enhance the targeting capabilities, improves the ease of use and increases the safety. These subsystems include the round/munition Release Mechanism, an Edge Computer, Safety Supervisor, modular communication and datalink radio, ethernet switch, and Imaging System.

WRS—Release Mechanism

The WRS Release Mechanism securely retains the rounds onto the WRS until commanded to release by the operator. Each WRS/UAS preferably comprises a plurality of Release Mechanisms—one Release Mechanism per round position/bay/slot. Preferably, the WRS comprises at least two Release Mechanisms, allowing for at least two rounds/munitions to be attached to the UAV WRS. More preferably, the WRS comprises at least four Release Mechanisms, allowing for at least four rounds/munitions to be attached to the UAV WRS. Still more preferably, the WRS comprises at least six Release Mechanisms, allowing for at least six rounds/munitions to be attached to the UAV WRS. Yet more preferably, the WRS comprises at least eight Release Mechanisms, allowing for at least eight rounds/munitions to be attached to the UAV WRS. Even more preferably, the WRS comprises at least ten Release Mechanisms, allowing for at least ten rounds/munitions to be attached to the UAV WRS. Still yet more preferably, the WRS comprises at least twelve Release Mechanisms, allowing for at least twelve rounds/munitions to be attached to the UAV WRS. The number of Release Mechanisms and corresponding rounds/munitions that can be included in a given embodiment are limited only by the capabilities of the UAV/UAS and the particular mission being carried out. The WRS is designed and adapted to be modular and capable of being integrated with virtually any vehicle system. Merely by using alternative mounting points, or even creating new ones (e.g., via drilling) the WRS can be retrofitted in any manner to any vehicle. In some embodiments, one or more round positions may include launch mechanisms, or the rounds themselves may include launch mechanisms that are activated after the round is released from the release mechanism, whereby the launch mechanism allows the round to complete air to air missions, and where the launch mechanism may be a pneumatic or air powered launch mechanism, rocket powered, gun launched, or the like.

Each Release Mechanism includes a locking mechanism designed and adapted to lock each round into position on the WRS/UAS and to prevent the round from being released until it receives a clear and direct fire/release command. Each Release Mechanism preferably comprises at least one locking mechanism designed to hold the rounds securely on the UAS until ready to be released. More preferably, each Release Mechanism comprises at least two locking mechanisms. Still more preferably each Release Mechanism comprises at least three locking mechanisms. A moveable plunger (armature) within a solenoid securely retains the rounds/munitions onto the WRS. In the "Locked" mode a stiff spring remains engaged and holds the armature in place into an armature slot on the body of the round/munition, and ensures the armature secures the Drop Glide(s) to the WRS. When the WRS is in the "Unlocked" mode the round/munition can be released by the warfighter actuating the solenoid which pulls the armature out of the armature slot on the round/munition, thereby allowing the round/munition to be released from the WRS. The WRS and Release Mechanism preferably include a system designed and adapted to prevent release of the round unless the system is specifically and directly instructed to be unlocked. Thus, such system prevents the locking mechanism from being disengaged by any means unless the system receives a direct command to unlock and make the locking mechanism active and able to be disengaged from the round. Preferably, all components of the system include indicators that provide visual and/or audible status identification of the release mechanism. Preferably visual indicators are included on the system that are visible when the system is in flight, and even more preferably, there are additional indicators that are substantially always present and visible on the Fire Control Station (the user command unit, described below) that clearly show the user whether the release mechanism is locked or unlocked.

The WRS preferably employs at least a three-point locking interlocking design that not only holds the rounds securely on the UAS, but also prevents the rounds from moving, or at least minimizes the amount of movement, in any of the three orthogonal planes/axes (e.g., X plane—side to side/left and right, Y plane—side to side/front and back, and Z plane—up or down with respect to the UAS and the ground) while attached to the UAS. Once the UAS receives a fire/release command the locking mechanism(s) are retracted or disengaged, and the round is released to slide free or otherwise disengage from the WRS and the UAS. When loading rounds onto the WRS/UAS, a manual locking lever may be employed for the user to move the locking mechanism(s) out of their engaged position to allow the round to be attached to the WRS/UAS. The locking lever may then be released when the round is in position and the locking mechanisms then reengage to their locked positions securing the round to the WRS/UAS.

In one nonlimiting example of such an embodiment, a locking mechanism (e.g., a moveable plunger or locking pin (armature) within a solenoid securely retains the rounds/munitions onto the WRS and Release Mechanism. In the "Locked" mode a releasable locking element (nonlimiting e.g., a stiff spring) remains engaged and holds the armature in place into an armature slot on the body of the round/munition, and ensures the armature secures the round to the WRS. When the WRS is in the "Unlocked" mode the round/munition can be released by the warfighter actuating the solenoid which pulls the armature out of the armature slot on the round/munition, thereby allowing the round/munition to be released from the WRS. Many other locking mechanism designs are envisioned for use with various embodiments of the invention as well, including, but not limited to a single sided linear pin, a constricting annular grip ("camera shutter"), threaded stud, solenoid actuated locking mechanisms, gear motor actuated locking mechanisms, multi actuator systems, and the like In one exemplary embodiment, the WRS preferably comprises a plurality of guide pins or bolts extending from the WRS onto which the rounds may be slid and secured. The rounds preferably comprise guide pin/bolt chambers into which the guide pins/bolts of the WRS fit. Preferably at least two guide pins/bolts are used to secure each round. More preferably at least three guide pins/bolts are used to secure each round. Still more preferably, at least four guide pins/bolts are used to secure each round. These guide pins/bolts serve to provide biaxial stability to the round when mounted onto the WRS/UAS (generally in the X and Y planes), while the engaged locking mechanism(s) prevent Z plane movement by locking the round in place on the guide pins/bolts of the WRS and preventing the round from sliding down the guide pins/bolts. The guide pins/bolts serve an additional purpose as well, namely, to provide a stable release motion for the round when the locking mechanism(s) are disengaged and the round is released. As the round is released and slides down the guide pins/bolts, X and Y plane movement remains restricted which prevents, or at least minimizes, the amount of spin and/or wobble that might occur on the round's release. Other mounting mechanisms may be envisioned as well, and thus are included in the design of the present invention. For example, gripping mechanisms that attach to and secure the base of the round to the WRS/UAS (e.g. releasable claw, vice, pinch, grip mechanisms), magnetic mechanisms that are able to be turned on and off such that the magnet-on setting attracts a magnetic component in the base of the round to a magnetic source in the WRS/UAS (or vice versa) and which can be turned off to disengage the magnetic attraction and release the round, or any other such mechanism known to those of skill in the art, or later developed that fits the described purpose. By way of one non-limiting example, one embodiment using the Validus Hex UAV platform, includes four guide pins/bolts designed and adapted to hold the WRS onto the UAV where the guide pins/bolts extend down from the WRS and a round comprising at least four guide pin/bolt chambers that align with the WRS guide pins/bolts and allow the round to be mounted on the UAV by inserting the four guide pins/bolts of the WRS into the guide pin/bolt chambers on the round and sliding the round up to engage with the locking mechanism.

The WRS also preferably comprises electronic components adapted to perform various functions between the UAS and the rounds. The WRS preferably includes a power module that is designed and adapted to supply power from the UAS to the round to keep an internal battery in the round charged and ready to perform all powered functions during flight toward a target after deployment and disconnection from the WRS power source. Such power may be delivered via physical lines or conductors, or may be performed via inductive coupling. The WRS may be self-powered by providing a battery or battery pack dedicated to powering the WRS, but preferably, to reduce overall system weight, the WRS draws power from the UAV's power source (battery) via a power line attachment. The power needed for operating the WRS is negligible as compared to the power used by the UAV's props, and therefore it is far more efficient to draw this minimal power from the UAV power source and avoid adding the extra weight of a dedicated WRS battery. Power lines preferably extend from the UAS into the WRS, and to a connector/connection between the WRS and the round. These power lines may be hardwired power lines with releasable connectors, or, more preferably, may employ wireless power transfer components and capabilities. The WRS power lines preferably include a position encoding scheme to allow the rounds and UAS to identify the round in a particular round position/bay/slot. This provides the ability for a particular round to be released upon command, giving a greater deal of control to the user, and customizable attack plans based on target identification. The WRS also preferably provides a data transfer module designed and adapted to feed data into the rounds from the UAS while the round is still attached and without requiring broadcasting of the data via wireless means (though such capability is included via the radio components described herein). The data transfer module allows data to be entered into the internal electronics of the round and to prepare the round for its assigned mission/target. The round is first attached to the WRS, and then electrically connected to the UAV via a cable from the UAV's autopilot which connects to the WRS via any known and preferred wire connection method, such as a USB connector. In doing so, the WRS can obtain UAV position and orientation data which is used to improve the accuracy of the rounds through the Fire Control Station initiation process. Data including target data (e.g., identification, location—absolute and/or relative position, velocity data, and the like), initial conditions (e.g., initial target location and velocity if applicable, wind conditions, distance to target, nearby obstacles or threats, temperature, system orientation, angular rates, velocities, and the like), mission configuration (e.g., controller settings—e.g., smooth and conservative vs. more aggressive and underdamped), intent to fire/launch/release the round, and status data related to the UAS and/or the round itself, in both directions (CBIT and INIT data from the GEU and Fuze, and status data from the WRS to the rounds). The WRS data transfer module is preferably capable of two-way communication between the round and the UAS, and the user is in communication with both via communications link with the UAS.

The WRS preferably comprises a number of safety features to ensure that rounds are only armed and released when it is absolutely intended for them to be released. Preferably, the WRS comprises one or more electrical interlocks for safety such that when the system is locked, the power supplies to the release actuators are disabled by an open circuit, thus preventing power from being delivered to the actuators and preventing them from being activated unintentionally. Also preferably, the WRS comprises one or more software interlocks such that, when the system is locked, messages providing drop, release, or firing commands cannot be sent to the WRS or the individual round positions. Further preferably, one or more mechanical interlocks are included whereby a mechanical element, such as a strong spring as one non-limiting example, passively holds the locking mechanism (e.g., locking pin, etc.) in place in the corresponding aperture on the round, thus providing a mechanical safety preventing the round from being released. Additional actuators may also be employed to lock the round, or even to lock the locking mechanism, into place, and which must be moved to an alternate position or angle so that the locking mechanism and/or the round may be released upon an appropriate command.

WRS—Edge Computer

The Edge Computer (Companion computer) is a powerful single board computer which is able to process all data and information collected by the sensors and actuators within the WRS. The Edge computer may be comprised within the WRS, or may be physically mounted or attached to the drone, but is preferably removable. Primarily the Edge Computer a) provides targeting information to the operator and b) generates the Guidance Navigation and Control (GNC) commands for the Drop Glide rounds/munitions. While the Drop Glide rounds munitions are still attached to the WRS Release Mechanism, the Edge Computer may pass this information to the Drop Glide rounds/munitions via an umbilical connection port located at each Drop Glide position, or wirelessly via radio link. After the Drop Glide round/munition has been released as in flight on its own (i.e., not attached to the UAS), the Edge Computer transmits to and receives data from the round/munition in flight via a radio link to the Drop Glide. GNC commands may be based on any number and/or combination of sensors housed within the system, including IMU (or MIMU), cameras, RF multilateration, mm wave, or any other such sensor described herein or known within the art for being useful for guidance or guidance-related data.

The Edge Computer preferably houses the onboard computation and coordination of the weapons release system. The Edge Computer connects to authorized ground stations to accept commands via a modular radio interface to accept many COTS datalink radios that connect WRS to ground stations and other WRS. It further connects to the autopilot of the UAV it is mounted to in order to receive vehicle state data from the autopilot (e.g., velocities, positions, orientations, angular velocities), send commands to the autopilot (e.g., fly to coordinate, set speeds, update points of interest, read points of interest, initiate flight patterns, arm, takeoff, land, set flight modes), to utilize a surrogate Autopilot where the surrogate is not connected the UAV platform actuators but generates navigation data which provides an option for rapid or compartmentalized integration. The Edge Computer further connects to the weapons release circuitry in order to send the appropriate locking and releasing signals and to send the appropriate locking status data to the safety systems (such as indicator lights or buzzers) in certain embodiments. Still further, the Edge Computer connects to the in-flight drop glide datalink (e.g., LoRa) which: allows updating targets and configuration of drop glides in flight, allows for receiving status data, navigation data, guidance data, seeker data, and control data back to the WRS, Can communicate with drop glides after impact if not a kinetic effect, can even communicate with drop glides released from other WRS with authorization, can communicate with other munitions enabled with datalinks and basic interfaces, and can manage commination with multiple drop glides in flight. With specific regard to the management of multiple Drop Glides in-flight, such capability allows the system and/or a user to retask individual drop glides based on changes to the: 1) positions of targets, 2) dynamics of targets, 3) the prioritization of targets, 4) the current capability of any given drop glide arriving at a desired target, and/or 5) retasking multiple drop glides to pattern around or multiple impact a high priority target, and also allows the system or a user to reconfigure airburst behavior of Guided or Unguided rounds in-flight to increase effectiveness of the resources engaged in the mission. The connection between the WRS and the Drop Glide data link further enables providing commands for safe or dud rounds after release when new information creates a need to cancel the mission.

The Edge Computer further preferably facilitates advanced fire control features for guided rounds. Such advanced fire control features include the ability to use targets selected and approved by the user to generate optimized flight paths that allow the guided rounds to arrive on target in preferred ways such as: 1) impacting simultaneously on a single or multiple targets, 2) impacting on a sequence of targets with specific timing to shape the adversary behavior, 3) allowing the round(s) to arrive at a target from a specific direction to exploit a particular vulnerability such as an open window, a minimal protection zone of a vehicle or building, or to exploit previously damaged or compromised structure or hull. Other advanced fire control features facilitated or carried out via the Edge Computer include coordinating multiple WRS to deliver guided rounds in preferred ways as above, in larger numbers, coordinating guided rounds with unguided rounds in preferred ways as above, and generating optimized approach paths for the UAV/UAS to reduce the risk of adversary interceptors (kinetic or EW) affecting the UAV but still deliver the guided and unguided munitions effectively to targets, also known as counter-counter measures.

The Edge computer further facilitates advanced fire control features for unguided rounds. Such advanced fire control features include the ability to, based on ballistic characterization of the drop glides, the state of the WRS, and the target state and its environment (wind, air pressure, etc.): 1) generate estimated impact positions given a release, 2) generate estimated target positions based on motion of the target, 3) optimize an intercept point given each of the above, and 4) generate flight commands to autopilot to get the UAV into position to release the round and strike moving and static targets. Another advanced fire control feature for Unguided rounds includes: executing pre-made "sheaves" or impact groupings based on simple user input, which can be simply created by flying to specific points and releasing, can be released while in motion to spread the rounds out in space but keep their arrival times close, and/or can be released during linear or angular accelerations to create alternate trajectories that generate simultaneous arrival or sequential arrival in a desired way.

The Edge Computer further connects to other onboard computational resources such as additional image processing, signals intelligence (signint), jamming, radio direction finding, alternative navigation (altnav), data recorders, live AI, and ML resources, and further is preferably scalable via onboard ethernet switch. The Edge Computer preferably includes one or more vision systems which may include one or more of the following: 1) visual Camera(s), 2) stereo cameras, 3) IR camera(s), 4) Phased Array Radar(s), and/or 5) time of flight optical sensors, both static and/or scanning. The vision systems of the present invention may be rigidly mounted to the WRS or may be mounted away such as on a gimbal, and may be used singly or in various combinations, where the combinations may be tailored to: 1) finding targets and points of interest, 2) confirming targets and points of interest, 3) generating ISR data, 4) conducting BDA from other strikes, and/or 5) conducting instant BDA from drop glide strikes. These vision systems may preferably be optimized to manage signal bandwidth requirements to facilitate scaling the capability. Numerous methods for such bandwidth management may be used, one example being breaking the images in smaller segments for variable compression, resolution, and or data rates to limit throughput requirements to only image segments of interest. Another signal bandwidth management technique is combining data between image frames of a single sensor into one image to reduce throughput requirements. Yet another signal bandwidth management method involves combining data between different sensor types into one image frame to reduce throughput requirements. Still another such technique involves including automated features to manage these settings and configurations. Even another signal bandwidth management technique operates by including manual controlled feature to allow the operation to manage these settings in an easy-to-understand fashion.

The Edge Computer preferably includes local RF multilateration systems whereby arrays of RF receivers are configured to capture time difference of arrival of specific RF signal pulses, where the time difference of arrival data from at least 3 receivers, though preferably at least 4, can place the source pulse in 3D space relative to the WRS. This data can then be used to fine tune the navigation of individual or swarms of drop glides, all of which facilitates use of beacons as navigation aides as well as flocking of UAVs for tighter control of the clusters and swarms, where the beacons can be static or dynamic beacons used to support, transit, patrol, and follow behaviors with or without GPS/GNSS signals. The Edge Computer further enables and facilitates target sharing and coordination, whereby, based on targets detected by, for example, $3^{rd}$ party assets or other UAV/UAS/WRS, they can be loaded into a given swarm or cluster's target list. This can facilitate a human user deciding on flight paths for 1 or more WRS to review the designated targets. It may also facilitate the WRS automatically creating a set of flight paths for 1 or more WRS to review the designated targets. Given human user authorization, a specific drop sequence can be initiated for 1 or more WRS in coordination with their host UAV/UAS to travel to a synchronized set of drop positions to rapidly scale simultaneous and sequential arrival of fires.

Still further, the Edge Computer allows and enables tiered path optimization algorithms, which are preferably located on a WRS, a ground control station, or distributed across the network. A path optimization algorithm can create search, search and strike, strike and follow up, follow and strike or strike missions for 1 or more WRS realizing drop glides to optimize the number and type of drop glides available, the flight endurance remaining of UAVs in the air, the number and type of UAVs that could be reasonably brought into the area, and/or based on the knowledge of enemy disposition or vulnerabilities. Tiering is defined as at least: a lowest level tier of guided munitions that have been or are about to be release to complete missions, and a second lowest tier of the UAVS holding 1 or more WRS. Tiering can also include a tier above the second lowest tier that provides communications relays, computational resources, higher performance imagery and other sensors, where this tier can be facilitated by satellites, UAVs, UGVs, USVs, or manned aircraft. In concert, by coordinating movement and pose of each tier of assets, the effects on a target with simultaneous and sequential strikes can be improved. Optimization can use a variety of path planning algorithms, configured to handle heterogenous swarms and to deliver effects at the desired times, all while still requiring man in the loop to direct release of weapons.

With specific regard to path planning functions, it is important to note that the path planning algorithms make use of many combinations of data from the various sensors in order to provide the optimized path of travel for the system, and may be dynamically updated while in flight, again based on data from one or more of the sensors in various combinations. The sensor data also allows and enables the system to employ object avoidance maneuvers that allow the system to travel along the identified path while avoiding any obstacles that may arise along the path (e.g., trees, animals, vehicles, etc.). Waypoints along the determined travel path can be used as beacons in the event that the UAV/UAS must divert somewhat significantly from the path to avoid obstacles.

WRS—Safety Supervisor

The Safety Supervisor module is software and/or firmware package that resides within the Edge Computer. The Safety Supervisor monitors the mode of operation commanded by the operator which includes the Lock and Unlock modes. Safety supervisor provides software interlocks to the release system so that when the system is locked the system is unable to accept release commands regardless of their origin. In the Locked mode, the Safety Supervisor will not allow power to the arming mechanism within the Drop Glide and will not allow power to the solenoid (for example) which is required to release the Drop Glide. The inert Drop-Glides with fuzes require an "intent to launch" signal to validate the need to seek arming environments, and determine safe separation from the WRS. Hence, in the Locked mode, the Weaponized UAV is allowed to safely return to base or a rally point while the rounds/munition/ Drop Glides are still secured to the WRS. In the event of a malfunction and a Drop Glide is released, the arming mechanism will not have power and the warhead will be unable to be detonated. Modular communication and data link radio (nonlimiting e.g., Trellisware 870). The system preferably includes two such radios—one on the WRS and the other on the Fire Control Station (FCS), which is the interface unit through which a user can receive data from, transmit data and commands to, and otherwise interact with the UAS, and which is described below. The radio on the UAS sends data and video from the WRS to the Operator via the FCS and the radio on the FCS sends the operator's commands to the WRS. Again, Safety Supervisor systems are described in greater detail in U.S. patent application Ser. No. 17/975,743, which was filed on Oct. 28, 2022, which is hereby incorporated by reference. The Safety Supervisor is further described in greater detail below.

WRS—Ethernet Switch

An ethernet switch enables the WRS to accept additional hardware desired by the operator. As one would plug new technology into a switch at home/work, the Ethernet switch ensures a Modular Open System Approach (MOSA) for the WRS.

WRS—Intelligence Surveillance and Reconnaissance (ISR) Imaging System

Given the proliferation of Global Positioning System (GPS) jamming hardware, the Orbital Team devised an alternative navigation strategy using the WRS ISR hardware. Specifically in degraded or denied GPS environments, the operator can switch over to the RC hand controller and fly the Weaponized UAS to a safe rally point or back home using First Person View (FPV) mode by watching the video feed on the Fire Control Station until the UAV is in sight and the pilot can fly normally (the UAV preferably handles altitude control via onboard altimeters). The ISR imaging systems become situational awareness cameras as viewed on the Fire Control Station using the Fire Control Console App. The Fire Control Console App provides real time feedback to the Operator which allows the Operator to navigate the terrain to an area with better GPS signals or to return the Weaponized UAV to a recovery point. When in autonomous modes, the system can hover and wait for better GPS signals for a programmable length of time before initiating a failsafe sequence. The Imaging System is a visual data gathering subsystem that preferably includes multiple cameras and image data sensors necessary for target identification and target tracking. The system preferably allows for target tracking such that selectable targets are identified and tracked by the computer to determine the location, velocity, and/or heading of the target which allows the system to calculate a flight path in order to intercept the target and drop one or more rounds to address and strike the target. One embodiment, by way of nonlimiting example, of the Imaging System preferably includes a color camera, global shutter camera (stereo cameras), LWIR camera, and laser rangefinder. The individual video sensors of the Imaging System camera array can be dedicated to collecting and sending data for specific purposes—such as including a dedicated targeting camera whose data and/or feed are used to identify, select, and prioritize targets. However, it is more likely, and preferable, that data from each of the separate image sensors is fused to create a more complete and accurate picture based on the specific needs and uses of the image data, whether it be for targeting, navigation and guidance, or any other use known to those skilled in the art. These cameras also provide data necessary to improve the intercept trajectory of the munitions/rounds/Drop Glides prior to being released and while in flight.

WRS—Fire Control Station

Each Weapons Release System includes a Fire Control Station (FCS) (aka, Ground Control Station) to allow the user on the ground full control of the WRS when in the air. The Fire Control Station is preferably a ruggedized portable computer or tablet (nonlimiting e.g., Dell Extreme Rugged laptop [e.g., Dell Latitude 7330 Rugged Extreme laptop computer]) that is preferably linked to the UAV via wireless communication (e.g., 900 MHz radio), and is loaded with fire control console software and firmware suites of the present invention. The Ground Control Station allows the operator to use the laptop's touch screen to quickly produce a desired mission (flight altitude, velocities and waypoints) via an open-source software package (Mission Planner) loaded onto the Ground Control Station, and further to interface with the WRS throughout the entire mission via the Fire Control Console App. Once the UAV is powered up and the UAV begins its boot sequence, the user launches the Fire Control Console App on the laptop. This App allows the warfighter to communicate with the on-board Edge Computer and the Safety Supervisory application. Once in flight, the Fire Control Console App displays video from the imaging cameras within the ISR hardware. The Fire Control Console is capable of adjusting the camera settings in order to compensate for the brightness. The low end of the settings places the imaging system in Low-light camera mode. As it sounds, the Lock mode ensures the Drop-Glides are secured within the WRS and no power is provided to the Drop-Glide electronics and fuze until the operator desires to release (Unlock Mode) the Drop-Glides upon the operator's command. Essentially, the user can view the video feed and select a target; then, a) press the button to Unlock the WRS, b) initialize the Drop-Glide mission within the WRS, c) complete the handshake (data transfer) with the WRS and the Drop-Glide, and d) release the Drop-Glide. Steps b and c happen within the WRS without user input through communication between the Edge Computer and different subsystems. This software package allows the warfighter to operate in the "Click-to-Fly" mode. The Ground Control Station allows the user to load preplanned missions via wired or wireless means to the UAV, command takeoff and landing when desired, and perform click to fly with the map view. These features permit lower-skilled UAV operators the ability to rapidly gain proficiency with the UAV, rather than requiring extensive training to learn how to fly with handheld controller (e.g., Jeti RC controller). Additionally, the Ground Control Station software has many safety features and fail safes that are enabled for low risk tolerance environments and can be removed if inappropriate for operational environments by the user adjusting some configurations. The UAV can be configured by the user to fly using only one of the Ground Control Station or handheld controller if desired. In a particular usage example for at least one embodiment wherein the user makes the decision to change the UAS between Lock and Unlock (or Safe and Fire) modes, the UAV is first powered on and booted up, and then, once the UAV is powered up and the UAV begins its boot sequence, the user launches the fire control console on the computer or tablet. This console allows the warfighter to place the WRS in Lock and Unlock mode. As it sounds, the Lock mode ensures the Drop Glides are secured within the WRS until the operator desires to release (Unlock Mode) the Drop Glides upon their command. Upon boot up completion a visual indicator, (e.g., a green locked light, green representing that the UAS is in safe, locked mode) may begin to flash indicating the warfighter can load munitions when ready. The indication that the UAS may be placed into Unlocked/Fire mode is preferably based on at least two data points that show the UAS safely able to be armed without placing the user and friendly resources in danger. This may be confirmed by sensor data on the UAS, visual confirmation by the user, Safety Supervisor data, or a combination of one or more of these. When the UAS is in Lock mode, all of the round release/fire controls are preferably locked and inactive, but they become active and selectable when the UAS is Unlocked and placed into fire mode. Once in flight, the fire control console preferably provides video of the drop area, some basic camera setting adjustments, the Lock/Unlock Mode feature, and the release or "Drop" command for each position on the weapons rack. In summary, the user can preferably view the video feed and select a target; then, a) enter the command to Unlock the WRS, b) initialize the Drop Glide mission within the WRS, c) complete the handshake (data transfer) with the WRS and the Drop Glide, and d) release the Drop Glide. While in flight, the rounds/munitions/Drop Glides preferably continue to receive information and target data from and the user if desired.

The present invention preferably includes and employs a number of features/capabilities that combine to provide a highly accurate and safe UAS, where some of the most important key attributes of the WRS include the capabilities to:

carry, retain, and then precisely and accurately release rounds/munitions/Drop Glide(s) over a target, safely drop rounds on command, release multiple rounds simultaneously or in timed or distance staggered releases to provide precise coverage of a target or a larger area (e.g., blanket bombing via multiple rounds from one UAV/UAS or from multiple UAV/UAS), facilitate Warfighter in the Loop functionality giving user real time access to the data and control of the system and/or rounds/munitions, facilitate target selections by the operator/warfighter, facilitate target optimization by the operator/warfighter, facilitate steering/control command by the operator/warfighter of the UAS and/or rounds/munitions, process all sensor data substantially in real-time, provide real-time system data for assessments of system (UAS, Weapons Release System, and/or round/munition/Drop Glide) health and status, assert if the UAS is able to use weapons, assert if the UAS is if safe to return home or to some other location (e.g., rally point, alternative landing location for retrieval), provide mechanical, electrical, and software interfaces with the UAV, provide access the state of UAS for improved accuracy by compensating for UAV movement.

One exemplary alternative embodiment includes an alternative Weapons Release System that is essentially the same as above, but includes an optional satellite datalink. Such WRS configuration provides additional features which enable collaborative functions between WRSs. It allows for the assessment of collaborative engagements achieved through additional software features on the loaded onto its Companion Computer.

Munitions/Rounds/Drop Glides

The present invention may include one or more of numerous types of rounds/munitions/Drop Glides, classified by the type and functionality of the body and payload of the round. depending on the particular embodiment and usage scenario, including Guided rounds, Unguided rounds, Warhead Rounds, and Inert Rounds, each of which is described below. Unguided rounds/munitions/Drop Glides are a type of deployable munitions that contain essentially just the warhead and electronics to safely detonate the warhead. Unguided rounds require no active guidance or control, and may not require or include any communications architecture. One or more of such elements are likely not even included in darts so as to minimize the cost of such rounds, and simultaneously increase payload size capability. A second type of deployable munition includes guided rounds/munitions/Drop Glides that take in target information and initial conditions from the UAV and are implemented with sensor systems and control actuation systems to actively steer toward the desired target impact location. A third type of deployable may be an additional UAV or other unmanned vehicle. A smaller UAV or other unmanned system may be mounted to the release mechanism of the main UAV and deployed to provide any number of functions such as surveillance, reconnaissance, and providing target information. Such a deployed UAV can be a much faster, more maneuverable, and/or stealth-oriented UAV and can preferably get closer to the potential targets to provide additional information to the UAV and then back to the warfighter. Additionally as noted above, many embodiments of the FO Kit further include Safety Supervisor algorithms that identify home environments through safety radii and known location as well as scene recognition to safe the release mechanism so that the munitions may not be released, deployed, or otherwise dropped, and to prevent the munitions from detonation in the presence of friendlies.

Regardless of the type of round/munition/Drop Glide used (i.e., guided or unguided), the present invention is preferably adaptable for use with various sizes of such rounds/munition/Drop Glides, including most standard munition sizes presently used by the military, or those later developed, including, but not limited to, 40 mm, 55 mm, 60 mm, 81 mm, and 120 mm. The size of the round used will be based on the particular mission, the desired size of the warhead, and other mission-specific factors, as well as system-based factors such as size and weight (payload capacity) of the UAV/UAS, and spatial orientation of the rounds on the WRS (e.g., round size affects the number of rounds able to fit onto the WRS). In one exemplary, but non-limiting example, of a 60 mm round, the body of the round has a diameter of about 60 mm and a length of about 305 mm or less. The flow effectors similarly vary in size and shape depending on the particular embodiment. Unguided rounds preferably have static/stationary tailfins, whereas guided rounds may preferably include tailfins, midbody flow effectors (which are preferably larger in size and surface area and located near the center of gravity and symmetrically around the diameter of the round to provide more stabilizing force and enable increased maneuverability), as well as flow effectors on the forebody.

Guided Rounds/Munitions/Drop Glides

The Guided round/munition/Drop Glide is the hardware and software system that delivers the payload from the Weapons Release System attached to the UAV to the target using its integrated guidance system. The primary design attributes that distinguish the present invention's rounds/munitions/Drop Glides from competitive technologies are its; 1) ability to maneuver in flight to strike stationary and moving targets and correct for adverse weather conditions, 2) high payload density—more weight is allocated to warhead than to airframe which enables more rounds per sortie, and 3) very low-cost design and manufacturing process enabled by an agile manufacturing process (3D printing) which leverages the electronics from the Guided Drop-Glides. These key attributes enable the round/munition/Drop Glide to maneuver to selected targets even when "dirty air" (wind and prop wash) can blow unguided munitions off course. Many embodiments of the Guided Drop-Glides preferably have at least three discrete control surfaces, for example, Canards 1, Tail Fins, and Canards 2. In such exemplary embodiment, Canards 1 perform Pitch control, Tail Fins perform Roll control, and Canards 2 perform Yaw control which produce a highly maneuverable and precise airframe. In standard competing technologies the pitch, roll and yaw control must be performed by multi-tasking one or 2 control surfaces which is known as blended control. Blended control increases cost, and control complexity and decreases performance as compared to systems with 3 control surfaces for independent control of each pitch roll and yaw such as the present invention's Guided Drop-Glide.

One preferred embodiment of the Guided round/munition Drop Glide has a modular payload bay that can accept 55 mm diameter warheads of various types. Preferably though, the round/munition/Drop Glides are scalable within the limits and scope of the particular UAS or other vehicle on which a particular embodiment is meant to be employed. Clearly, larger diameter rounds/munitions/Drop Glides provide an increased payload capacity per round, but also decrease the number of rounds that may be carried by a particular UAS or vehicle based on its capabilities. Various missions may benefit from one or more different sizes and combinations of rounds and UAS for providing a desired result or for being adaptable to a given engagement or changing circumstances mid-mission. The system of the present invention is intended to be scalable, and interchangeable such that the user(s) can pick and choose the exact combinations of UASs, rounds, and payloads for what is required for a given mission.

The Guided Rounds are designed and adapted to interface with the WRS for secure mounting, power, data transfer/communication, and all other such features described herein. The Guided Rounds are preferably adapted to interface with the WRS in any manner described herein for the WRS and Release Mechanisms. In the example provided above, this may include a series of chambers (guide pin/bolt chambers) in and through the body of the Guided Round into which the guide pins/bolts of the WRS are inserted. The round is then slid fully into place with the guide pins/bolts inside the guide pin/bolt chambers until the lock mechanism engages and the round is secured in place. The Guided Rounds therefore are designed to have an armature slot or hole into which the armature or locking pic embodiment is inserted to prevent the round from releasing from the WRS. The Guided Rounds also preferably comprise a data connection point to interface and connect with the WRS and the UAS. As above, this data connection point may be a wire with connector to mate with a wire and connector from the WRS/UAS, or may be a wireless data link. The same holds true for a power connection; the Guided Rounds preferably comprise a power adaptor or connection to receive power from the WRS/UAS, which again may be wired or wireless. The Guided Rounds also preferably include a position encoder that identifies the round to the WRS/UAS, and encodes into the system the position/slot/bay in which the particular round is installed on the WRS/UAS.

Guided rounds may or may not include a warhead payload. The concept behind controlling the mass of the round's body (as described below)) in general, and particularly the mass:strength ratio, is that nearly all of the weight of the final, fully-assembled round can then be allocated to a payload for maximizing the effectiveness and area of effect of the round. This allows the payload to provide a forward (toward the nose) centered center of mass (as the payload bay is located preferably in the front half of the round toward the nose) which significantly assists the round in remaining oriented in the correct direction (toward the ground when dropped or released from a UAV) and eliminates the challenge of tail heavy munitions with longitudinal stability issues. The modular payload bay allows for easy and rapid installation of any applicable payload, including warheads. The rounds may be desired to have an inert payload for training and/or practice with the system. The inert rounds may be released from the UAS during training or practice, thus providing the user with real time, actual, practical experience operating the system, but without the need for specialized training locations or utilization of expensive warheads. The low-cost nature of the rounds themselves significantly increase the training and practice value of the system by allowing for large volumes of training or practice rounds to be dropped at very little expense. This allows the user to become very adept at using the system without significant cost. The rounds are also preferably resilient and may be recoverable after training/practice, thus further decreasing the training costs because many of the rounds used for training may then be checked and reused for additional training/practice, or a warhead may be inserted the round employed for actual missions in the field. Raining rounds may also be equipped with a multiple integrated laser engagement system (MILES) to allow for non-damaging training with the actual rounds. Training, both of the system and users of the system, may also be performed using completely inert object, such as toy footballs (e.g., Nerf Vortex) which roughly simulate size and form of some round embodiments.

One nonlimiting example of an embodiment of the Guided round/munition Drop Glide includes: the novel Guided round/munition Drop Glide airframe, described below, motors for moving the control surfaces, a multiple inertial measurement unit (MIMU) with at least 2, though more preferably at least 4 discrete IMUs (also described below and incorporated by reference above), altimeter, magnetometer, microcontroller, batteries and power management system, on board power regulation, LoRa Radio and antenna (described below), expansion ports for additional systems (e.g., fuze interface, optical beacons, in-munition GPS, in-munition Seeker, and the like), and interface features for the weapons rack on the WRS and the receptacle for the power and data umbilical back to the WRS. The various components and subsystems of the present invention provide the following highlights and benefits, among others that are described herein and would be apparent to a person having ordinary skill in the art, to the warfighter realized with the Guided round/munition Drop Glides:

increased accuracy and likelihood of hitting targets,
ability to hit moving targets due largely in part to the highly maneuverable airframe and capability of tracking and defeating moving targets, ability to correct flight path enroute to target, which helps the Guided round/munition/Drop Glide compensate for flight conditions such as wind gusts, Warfighter is able to identify and select target(s) in real time, Ability to engage and defeat multiple targets simultaneously due to multiple rounds releasable from a single UAS, and Affordability and Scalability for Production.

For example, in one embodiment of a 55 or 60 mm Guided round/munition/Drop Glide, the airframe preferably exhibits dimensions of about 305 mm long or less, a 60 mm body diameter or less, a 12-inch wingspan or less, and weighs 1,100 to 1,350 grams depending on the warhead used. The Guided rounds may, however, be adapted or designed to be virtually any size and with virtually any design ratios within the scope of this disclosure. Depending on the embodiment and the flight requirements for a given mission, in order to provide sufficient roll control, the Guided rounds preferably have a tail span of at least 3 inches. More preferably, the Guided rounds preferably have a tail span of at least 4 inches. Still more preferably, the Guided rounds preferably have a tail span of at least 5 inches. Yet more preferably, the Guided rounds preferably have a tail span of at least 6 inches. Still yet more preferably, the Guided rounds preferably have a tail span of at least 7 inches. Yet even more preferably, the Guided rounds preferably have a tail span of at least 8 inches. Even still more preferably, the Guided rounds preferably have a tail span of at least 9 inches. Yet still more preferably, the Guided rounds preferably have a tail span of at least 10 inches. With respect to the forebody canards, in order to sufficiently effect flow and provide maneuvering forces on the round to control pitch and/or yaw, the Guided rounds preferably have a canard span of at least 4 inches. More preferably, the Guided rounds have a canard span of at least 5 inches. Still more preferably, the Guided rounds have a canard span of at least 6 inches. Yet more preferably, the Guided rounds have a canard span of at least 7 inches. Even more preferably, the Guided rounds have a canard span of at least 8 inches. Still yet more preferably, the Guided rounds have a canard span of at least inches. Yet even more preferably, the Guided rounds have a canard span of at least 9 inches. Even still more preferably, the Guided rounds have a canard span of at least 10 inches. Yet still more preferably, the Guided rounds have a canard span of at least 11 inches. With respect to the midbody wings, in order to sufficiently provide stabilization of flight and maneuverability of the round, the Guided rounds preferably have a wing span of at least 7 inches. More preferably, the Guided rounds have a wing span of at least 8 inches. Still more preferably, the Guided rounds have a wing span of at least 9 inches. Yet more preferably, the Guided rounds have a wing span of at least 10 inches. Even more preferably, the Guided rounds have a wing span of at least 11 inches. Still yet more preferably, the Guided rounds have a wing span of at least 12 inches. Yet even more preferably, the Guided rounds have a wing span of at least 13 inches. Even still more preferably, the Guided rounds have a wing span of at least 14 inches. Yet still more preferably, the Guided rounds have a wing span of at least 15 inches. The "optimal" configuration of flow effectors, including their size and shape, may be different for different embodiments, and the "optimal" size for each may be at either end, or somewhere in the middle, of the disclosed ranges, but the ranges are provided for general principles regarding the relative size of the control surface to the amount of control provided for a given round configuration. The above ranges may be extended for larger rounds.

The Guided Drop-Glide was designed with an intent to address supply chain issues, to be readily produced in large volumes anywhere in the world, and to be disruptively low-cost. Another non-limiting example of one embodiment of a Guided Drop Glide the Drop-Glide airframe constitutes a total of 54 parts including the airframe of the munition with twenty-two (22) 3D printed parts, twenty (20) metal parts bolts/fasteners\slide-rails, four (4) batteries, three (3) wire assemblies, three (3) motors, one (1) warhead simulant and three (3) printed circuit boards. The printed board assembly has the same components and manufacturing process as the Unguided Drop-Glide boards. Thus, these circuit boards contain four Inertial measurement units (IMUs), altimeter, magnetometer, microcontroller, and power management system, on board power regulation, LoRa Radio with antenna, expansion ports for additional systems (Fuze interface, etc.), and the receptacle for the power and data umbilical back to the WRS. To address supply chain issues, the 3D printed components are fabricated using readily available and affordable ($3,000-$5,000) printers. Several electronic contract manufacturers are available to produce the key electronic assemblies and the fasteners can be acquired almost anywhere.

Novel Guided Round/Munition Drop Glide Airframe

In order to deliver on the key attributes, highlights, and benefits mentioned above, the present invention includes an innovative guided airframe for release from UAVs. The Guided rounds/munitions/Drop Glides achieve their performance while still being low cost by 1) eliminating blended control requirements common on other competing guided munitions, and 2) exploiting capabilities of additive manufacturing to manipulate the mass properties of the projectile and achieve high payload density. Blended control is when the control surfaces (e.g., canards wings, and the like) perform multiple functions such as roll control, pitch control and yaw control simultaneously. To the point of control surfaces, the Guided round/munition/Drop Glide preferably comprises at least two forebody control surfaces, at least two mid-body control surfaces, and at least two aftbody or tail control surfaces, each of which are arranged equidistant around the circumference of the round and also each of which (or more preferably coupled pairs or coupled groups of which) may be either activatable/deactivatable or static/fixed. Preferably, the control surfaces are arranged equidistant from each other around the circumference of the rounds/munitions/Drop Glides. Returning to the concept of blended control of the control surfaces, positional accuracy of the control surfaces for blended control requirements for maneuvering are significantly more stringent with smaller room for error, which increases the cost and complexity of the mechanisms required to achieve this high degree of positional accuracy and the acceptance tests to verify the control surface performance. In one preferred embodiment, the present invention's novel airframe design eliminates the blended control complexity and costs by dedicating the round/munition/Drop Glide tail fins to addressing roll control, dedicating at least two coupled canards (at least one pair) for pitch control, and dedicating at least two coupled canards (at least one pair) to yaw control. This simplified maneuvering strategy lowers the mechanism costs while delivering superior performance.

The round/munition/Drop Glide airframes are preferably produced via additive manufacturing. Additive manufacturing allows for the creation of very light weight and rigid structures that can handle the aerodynamic loads experienced by the Drop Glides. By reducing the weight of the airframe, more weight can be allotted to the warhead which is desired by all warfighters. Further, additive manufacturing allows for combining parts in places to reduce assembly time and increase repeatability and reliability of part geometry, shape and weight. These benefits may be amplified by the capability for rapidly designing and including improvements or performance adjustments as requested by the customer, further increasing the adaptability, scalability, and versatility of the present invention. As compared to traditional manufacturing which would require new tooling for these changes, the same manufacturing equipment is already prepared to make the new variants of the airframe without significant time, design, or cost. In many embodiments, such manufacturing is performed, for example, by using 3D printers to produce the lightweight airframe components which can be easily and rapidly assembled, and which enables the above benefits compared to traditional manufacturing methods requiring custom tooling, design, and implementation.

The guided Rounds also preferably comprise a plurality of flow effectors that are designed and adapted to enable in-flight maneuvering of the round after it is released from the WRS/UAS. These flow effectors may be of any active (activatable) or passive type known in the art including, but not limited to, airfoils, wings, tailfins, canards, vortex generators, synthetic jets, plasma actuators, and the like—any flow effector known in the art or later developed that can help control/effect pitch, roll, and yaw of the round in-flight. Different embodiments will benefit from different arrangements and combinations of types and locations of flow effectors on the round. Many embodiments employ flow effectors that provide lift forces to the round which serves to amplify the maneuverability of the round and provides a larger maneuvering footprint (range or radius of maximum maneuverability) from any drop or release height. The flow effectors are designed and selected to provide amplified maneuvering capability to the round so that the round may alter its flight path in order to reach a target. The flow effectors are preferably arranged equidistantly around the circumference of the body of the round. In fact, the entire round, including all flow effectors and control surfaces, is preferably designed to be symmetrical. The symmetric structure and arrangement of components allows for the round to be released and to immediately be maneuverable in any direction, and eliminates the need to achieve a particular orientation or angle prior to being effectively maneuvered. Activatable flow effectors may be controlled individually, or may be grouped together in any combination to be activated, controlled, and deactivated as a group in unison. In one preferred embodiment, at least four flow effectors are included, each equidistant around the circumference of the round, and the flow effectors on opposite sides are coupled together providing two separate groups of coupled flow effectors that are controlled in pairs. Coupling or grouping the flow effectors serves to simplify the control requirements and allows for use of lower-cost actuators, thus serving to provide guided control of the round while also decreasing the cost of each round. More importantly, coupling/grouping the flow effectors in this manner serves to eliminate control blending between pitch, roll, and yaw, thus allowing different groups of flow effectors to be activated and controlled to address different directions of movement of the round. For example, if a round is released and experiences forces that cause the round to alter its roll (spin) and yaw motions, then one coupled pair of low effectors may be adjusted to decrease and stop the rolling, while another pair may be adjusted to decrease and eliminate the yaw. The control surfaces can thus be activated and adjusted throughout the flight of the round to continually stabilize flight of the round and maintain an ideal flight path despite outside forces that act on the round in flight. The coupled flow effectors may be activated and adjusted in the same manner, or in an equal but opposite manner depending on the maneuvering required. Many embodiments may utilize roll fins designed and adapted to stabilize the round in flight and enable complex flight control modes, particularly when the roll fins are synchronized together in their activation and adjustment. Such roll fins in particular are utilized to stabilize the round in the seconds immediately following release/launch/firing of the round in response to the large amount of turbulence and dirty air the round encounters upon release. Such synchronized roll fins are one particular example of paired control surfaces.

The body and flow effectors of the Guided Rounds are all preferably constructed of highly strong and resilient, yet lightweight materials. One preferred method of constructing the round bodies and flow effectors is to use 3D printing to produce components that exhibit high strength and low mass. 3D printing filament may be selected based on the particular mission or arena in which a round is expected to be used. The rounds may even be made using traditional fused filament fabrication techniques which are not typically known for producing usable, resilient objects This is accomplished by using filament that meets or exceeds U.S. MIL-SPEC requirements. Many diverse and differing printing materials may be used including, but not limited to metal impregnated filaments, radio translucent filaments, static resistant filaments, combustible filaments, high strength filaments, high flexibility filaments (with potential for living hinges), and varying heat properties of filaments, where such filaments may be made out of plastic, potentially be recyclable, and require minimal material treatment and post processing. These manufacturing processes are readily scalable to have many types of filaments available for use with any given manufacturing machine, and also easily allow a single machine to produce virtually all of the components producible in this manner. One particularly important design element of the present invention is the use of a semi-hollow construction for additive manufacturing/3D printed components. This enables the airframes and flow effectors to be produced with an aerodynamic out mold line with supportive, strengthening patters between the exterior and interior walls, or between the two sides of a flow effector, which enables the components to be optimized for high strength with minimized weight and cost of material. Spaces between the outer walls of the printed components may be supported by interstitial patterns or structures that provide strength to the structure but also leave a significant amount of empty space to minimize the weight and mass of the component. Such additive manufacture further enables fine control over the center of gravity of the airframe which is very important when considering aerodynamic performance. This also enables controlling the moments of inertia by varying the densities for aero-mechanical performance. The interstitial support patterns or structures may take on any shape that provides strength and resiliency to the components while leaving a sufficient portion of the interior hollow to maintain low weight and mass. Such patterns may include, but are not limited to, honeycomb structures, crisscrossing wall-to-wall supports (such as forming X or diamond shapes, triangular supports, or the like. Many embodiments utilize the honeycomb structure as it has been found to provide excellent geometric fidelity providing high strength with very low relative mass. In regard to the internal volume of the components, preferably the semi-hollow structure yields an internal volume that is more than 10% hollow or empty comparing the empty volume to the volume of internal support structures while maintaining high strength and resiliency. More preferably, the internal volume is more than 20% hollow or empty while maintaining high strength and resiliency. Still more preferably, the internal volume is more than 25% hollow or empty while maintaining high strength and resiliency. Yet more preferably, the internal volume is more than 30% hollow or empty while maintaining high strength and resiliency. Still yet more preferably, the internal volume is more than 40% hollow or empty while maintaining high strength and resiliency. Even still more preferably, the internal volume is more than 50% hollow or empty while maintaining high strength and resiliency. Yet still more preferably, the internal volume is more than 60% hollow or empty while maintaining high strength and resiliency. Even yet more preferably, the internal volume is more than 70% hollow or empty while maintaining high strength and resiliency. Even still more preferably, the internal volume is more than 75% hollow or empty while maintaining high strength and resiliency.

Multiple Inertial Measurement Unit (Multi-IMU, MIMU)/Sensors/GNC

The rounds/munitions/Drop Glides of the present invention preferably feature a Multiple IMU (MIMU) system for monitoring the instantaneous orientation and movement of these rounds. Examples of such MIMU systems are provided by U.S. Pat. Nos. 10,527,427, 10,969,226, U.S. patent application Ser. No. 17/182,362 which was filed on Feb. 23, 2021, and U.S. patent application Ser. No. 18/222,973 which was filed on Jul. 17, 2023, each of which is hereby incorporated by reference in their entirety, and each of which provides explicit detail on MIMU systems employed in some embodiments of the present invention. Many embodiments of the present invention may also benefit from enhanced MIMU processing techniques that provide enhanced resolution of MIMU signal processing to enable continuous IMU measurements while avoiding saturation and data blackout periods resulting from changing conditions of the larger system. This again, allows a series of low-cost MIMUs to provide equal, if not superior data collection capabilities and accuracy to that of high grade navigational or tactical IMUs. Examples of such MIMU systems are provided by U.S. Pat. Nos. 10,527,425, 11,118,909, and 11,692,828, each of which is hereby incorporated by reference in its entirety, and each of which provides explicit detail on MIMU systems and signal processing employed in some embodiments of the present invention. Still further, many embodiments of the present invention may utilize such MIMU systems that further include improved and enhanced error, offset, and drift correction which improves the accuracy even further by minimizing or correcting for shifts in sensor readings that occur over time. Examples of such MIMU systems are provided by U.S. Pat. No. 11,585,660 (issued on Feb. 21, 2023) which is hereby incorporated by reference in its entirety providing explicit detail on the methods and systems that can be used to provide correction of sensor errors and protection of low-cost IMUs to ensure high-accuracy functioning. These MIMU systems use arrays of low cost IMUs to elevate the performance of the rounds while taking advantage of the miniaturization, ruggedization, and cost reduction advancements accomplished in the art. Through intelligent placement of the commercial IMU chips relative to each other, the IMU's inherent drift can be minimized which enhances the performance of the array beyond the benefit of averaging multiple IMUs. The present invention's MIMU is the central system for generating on board navigation data for the navigation functions to track the munition's position relative to the selected target, and serves to provide accurate navigation and guidance even in arenas where GPS is likely to be jammed, degraded, or even spoofed.

The MIMU systems preferably comprise a series of individual low-cost IMUs that comprise at least one accelerometer and/or at least one gyroscope. Combining numerous individual IMUs into one MIMU provides advantages in allowing for redundant measurement and error checking. Spatial and orientation diversity of the individual IMUs on the MIMU enables vast amounts of inertial data to be measured and cross-referenced to ensure that the actual measurements being obtained are accurate and reliable, allows anomalous data to be removed from consideration, and also allows for continuous calibration of the MIMU. Many MIMU embodiments utilize different groups of individual IMUs with varying quality to provide multiple levels of data and control. The MIMUs are designed and adapted to provide spatial and temporal diversity with respect to the individual IMU measurements—spatial diversity based on the location of the individual within the MIMU, and temporal diversity based on the ability to individual sample the individual IMUs at varying times. This serves to aid the redundancy and error checking functions, and also to allow for greater control and range of measurements because different levels of IMUs may be strategically placed and sampled to obtain tailored data for a particular moment in the flight of the round. In addition to the basic IMU sensors mention above, individual IMUs on the MIMU, or the MIMU itself (separate from the individual IMUs) may be supplemented and aided by the presence of additional sensors including, but not limited to, magnetometers pressure sensors (internal pressure and/or barometric pressure), global navigation satellite system (GNSS) sensors, and the like. The MIMUs can also be assisted by remote tracking of the round from the WRS/UAS, thereby allowing for tracking of the round's position relative to the WRS/UAS and/or a target, and updating the round's internal data with respect to position/location and required course of travel. Similarly, the MIMU system may be aided by radio frequency multilateration whereby the WRS/UAS tracks a signal from an RF emitter on the round and measures the time difference of arrival of that signal to determine where the round is located. Thus, the MIMUs can provide low-cost by highly accurate guidance and navigation alone, but can also be supplemented by additional sensors and systems for embodiments where redundancy, extreme precision, or additional considerations require more highly assured position and guidance tracking and control.

Regardless of the exact number and type of sensors included with the MIMU system, the Guided round/munition/Drop Glide guidance system is preferably seeded with a target by the WRS. This target data may be identified by the UAS sensors and systems itself, but more preferably (until autonomous systems are accepted and utilized), the target data is identified and selected by a human user interpreting the mission data on the Ground Control Station/Fire Control Station computer, and then transmitted to the UAS/WRS. The target data is then transmitted to the round from the WRS/UAS via the data connection described above, and the round may be initialized and prepared to be launched/released in order to engage the identified and seeded target. Target information may be updated while the round is in flight, where the updated target info is transmitted to the round from the WRS/UAS (either after being identified by sensor on the UAS/WRS or round, or after being communicated by a user from the Ground Control Station computer) via wireless communication between the WRS/UAS and the round. Preferably, the WRS may comprise a remote seeker which tracks the target and identifies when the initial parameters provided to the round need to be adjusted so that the round can still engage the target. The seeker may be an image data sensor or system, including, but not limited to, long-wave infrared (LWIR) heat seekers, cameras, video cameras, IR sensors, and the like. Data obtained by the seeker is supplemented and complemented by onboard navigation data from the WRS/UAS which can preferably be used to focus on a smaller region of data surrounding the target and narrowing the focus/view to that target area. This helps to maintain the focus on the target itself and avoid distraction of other surrounding objects, and helps provide a smaller range of data to be processed and fed to the round in flight, which is particularly important for the short timeframe in which the round is actually in flight. Preferably the WRS and its seeker system can track targets live in real time and send updated target data (e.g., position, heading, velocity, and the like) periodically or as needed. Preferably, the WRS and seeker are designed and adapted to provide updated target data to the round every thirty seconds. More preferably, the WRS and seeker are designed and adapted to provide updated target data to the round every twenty seconds. Still more preferably, the WRS and seeker are designed and adapted to provide updated target data to the round every ten seconds. Yet more preferably, the WRS and seeker are designed and adapted to provide updated target data to the round every five seconds. Even more preferably, the WRS and seeker are designed and adapted to provide updated target data to the round once per second. Yet still more preferably, the WRS and seeker are designed and adapted to provide updated target data to the round twice per second. Still even more preferably, the WRS and seeker are designed and adapted to provide updated target data to the round three times per second. Even yet more preferably, the WRS and seeker are designed and adapted to provide updated target data to the round five times per second. Still yet more preferably, the WRS and seeker are designed and adapted to provide updated target data to the round seven times per second. Yet even more preferably, the WRS and seeker are designed and adapted to provide updated target data to the round ten times per second. Even still more preferably, the WRS and seeker are designed and adapted to provide updated target data to the round more than ten times per second. Where the WRS and seeker are providing the target update data to the round, such updates may preferably be based on onboard (to the UAS/WRS system) kinematic models that intelligently process sensor data to track and also possibly anticipate the target position based on that sensor data.

With regard to guidance of the rounds in flight based, the system preferably identifies the locations of the UAS, the round in flight, and the target, and fuses the multitudes of sensor data in order to calculate a desired path for the round to intercept/engage the target. The system preferably considers not only the difference in position between the target and the round, but also external and surrounding conditions as well. Once the guidance system calculates the desired movements the round should take to travel the desired path, the control system of the round selects appropriate adjustments for the flow effectors and control surfaces (e.g., rotations, angular deflections, and the like) and actuators engage to carry out those desired flow effectors movements, which then, in turn, alter the flight path of the round. In many embodiments, a hierarchical control scheme may be employed whereby a high level controller receives commands for multiple control surfaces and coordinates those commands to send signals to individual controllers for each individual or combination of control surfaces to move them according to the required or desired maneuver. The high level controller effectively hands off the desired movements to each motor controller which then handle one or more of the pitch, roll, or yaw of the munition by moving its dedicated control surfaces. Preferably, the system is designed and adapted to accept gain scheduling so that the system is adapted to address wide ranges of flight speeds and conditions.

With respect to the software for guidance, navigation, and control of the Guided Rounds/Munitions/Drop Glides, the software is preferably designed and adapted to be modular and updatable such that the system can be readily and easily updated and upgraded, preferably even in the field, much like the hardware which can be easily and readily swapped, replaced, or upgraded. If circumstances or the mission change, then the system is able to be modified in the field to replace components or upgrade software to fit the changed conditions and accurately address the mission requirements. Clearly, different types of rounds may be installed onto the WRS in order to provide an optimized mix of releasable components to address the needs of the mission, and those may include any type of round/munition/Drop Glide described herein or even other unmanned vehicles which can be deployed or released and used for numerous purposes such as forward observer uses such as reconnaissance and scouting, target identification and prioritization, testing and reporting of flight conditions for updating the GNC of the rounds, and the like.

LoRa Radio for Guidance Updates

Each of the Guided rounds/munitions/Drop Glide preferably comprises a LoRa Radio included within the electronics package. This integrated LoRa radio allows the round/munition/Drop Glide to accept target updates from the WRS while the munition is in flight gliding to the target. This feature also allows the round/munition/Drop Glide to benefit from the cameras and computing resources on board the WRS and then integrate those target updates rapidly into the round's/munition's/Drop Glide's guidance system. In concert with the navigation data generated by the MIMU within the Drop Glide, the guidance logic generates new control outputs based on the current position of the falling round/munition/Drop Glide enroute to the target position, and the time remaining until impact with the ground.

Unguided Rounds/Munitions/Drop Glides

The Unguided rounds/munitions/Drop Glides are the hardware and software system that delivers the payload from the WRS to the target using its optimized airframe, but without active guidance, and in some embodiments with fewer of the activatable flow effectors present on the Guided rounds. The primary design attributes that distinguish Orbital's Unguided Drop Glide from conventional munitions dropped from UAVs in the art are: 1) ability to land close to target with minimal deviation from release position, 2) high payload density—more weight may preferably be allocated to warhead than to airframe which enables more rounds per sortie, and 3) the same very low cost design and agile additive manufacturing process as the Guided rounds/munitions/Drop Glides, which also leverages the electronics from the Guided rounds/munitions/Drop Glides. These three key attributes enable the Unguided rounds/munitions/Drop Glides to precisely and accurately complete simple and complex missions. The present invention is designed to produce a very light, robust and durable (e.g., honeycomb 3D printed airframe), which shifts the center of gravity of the Unguided Rounds towards the nose, particularly when a payload is placed into the round. Hence, when an unguided round/munition/Drop Glide is released from the WRS and exposed to winds and prop wash or airflow over and around the body of the UAV, the heavy nose will cause the round to rapidly right itself (face ground—nose first). Another important innovation of the present invention is the use of slanted fins (e.g., slanted tail fins) which when exposed to winds and prop wash or air flow around the UAV body will cause the Unguided Drop Glide to spin rather than blow further off target line, allowing the rounds to perform even in winds and prop wash.

The Unguided Drop-Glides were also designed with an intent to address supply chain issues, to be readily produced in large volumes anywhere in the world, and to be disruptively low-cost. In one embodiment, the entire current Bill of Materials of the Unguided Drop-Glides consist of 39 parts including the innovative Unguided Drop-Glide airframe with nine (9) 3D printed parts, 22 bolts/fasteners, four (4) batteries, one (1) wire assembly, one (1) warhead simulant and three (3) printed circuit boards. The circuit boards contain four Inertial measurement units (IMUs), altimeter, magnetometer, microcontroller, and power management system, on board power regulation, LoRa Radio with antenna, expansion ports for additional systems (Fuze interface, etc.), and the receptacle for the power and data umbilical back to the WRS. To address supply chain issues, the 3D printed components are fabricated using readily available and affordable ($3,000-$5,000) printers that require no tooling costs or parts, and which can be used to produce most, if not all geometries for the varying components with minimal configuration. The 3D printing additive manufacturing process further enables rapid iteration of design/3D modeling to the end state manufacturing process. Several electronic contract manufacturers are available to produce the key electronic assemblies and the fasteners can be acquired almost anywhere.

Unguided rounds may or may not include a warhead payload. The modular payload bay allows for easy and rapid installation of any applicable payload, including warheads. The rounds may be desired to have an inert payload for training and/or practice with the system. The inert rounds may be released from the UAS during training or practice, thus providing the user with real time, actual, practical experience operating the system, but without the need for specialized training locations or utilization of expensive warheads. The low cost nature of the rounds themselves significantly increase the training and practice value of the system by allowing for large volumes of training or practice rounds to be dropped at very little expense. This allows the user to become very adept at using the system without significant cost. The rounds are also preferably resilient and may be recoverable after training/practice, thus further decreasing the training costs because many of the rounds used for training may then be checked and reused for additional training/practice, or a warhead may be inserted the round employed for actual missions in the field.

The Unguided rounds/munitions/Drop Glides also preferably have a modular payload bay that can accept warheads of various types and sizes depending on the size of the round. The size of the round, and thus the warhead payload it can fit, are limited only by the capabilities of the particular UAV employed in a given embodiment. One nonlimiting example of an embodiment of the Unguided round/munition/Drop Glide includes: the novel Unguided Drop Glide airframe, a multiple inertial measurement unit (MIMU) with at least 2, though more preferably at least 4 discrete IMUs (also described below and incorporated by reference above), altimeter, magnetometer, microcontroller, batteries and power management system, on board power regulation, LoRa Radio and antenna, expansion ports for additional systems (e.g., fuze interface, etc.), and interface features for the weapons rack on the WRS and the receptacle for the power and data umbilical back to the WRS. Even though guidance is not required, or even necessarily possible, on the Unguided rounds, the above electronics are still preferably included and utilized for fuze integration and proper warhead detonation.

One nonlimiting example of the 55 mm or 60 mm Unguided round/munition/Drop Glide embodiments includes an airframe preferably exhibiting dimensions of about 305 mm long or less, a 60 mm body diameter or less, a 6 inch tail span or less, and weighs 1,100 to 1,200 grams depending on the warhead used. The Guided rounds may, however, be adapted or designed to be virtually any size and with virtually any design ratios within the scope of this disclosure. Depending on the embodiment and the flight requirements for a given mission, in order to provide sufficient spin and stabilization of flight, the Unguided rounds preferably have a tail span of at least 3 inches. More preferably, the Unguided rounds preferably have a tail span of at least 4 inches. Still more preferably, the Unguided rounds preferably have a tail span of at least 5 inches. Yet more preferably, the Unguided rounds preferably have a tail span of at least 6 inches. Still yet more preferably, the Unguided rounds preferably have a tail span of at least 7 inches. Yet even more preferably, the Unguided rounds preferably have a tail span of at least 8 inches.

Warhead Rounds/Munitions/Drop Glides

Warhead rounds/munitions/Drop Glides are essentially the same as the Guided or Unguided rounds, but have had a warhead installed and are ready for use in the field for missions. Warhead Drop Glides include all the same components as the Guided (inert) Drop Glides, or as the Unguided Drop Glides, but include a live warhead integrated into the payload and a mount point for a wired detonator for the explosive assessments. The Warhead Drop Glides include one of any variety of warhead that is adaptable or designed for the particular round in which it is employed, and may preferably include fragmentation and shape charge warheads. Many warheads are specifically designed to produce a beam effect whereby the explosion of the round emits shrapnel and explosive force at a desired proximity to a target to maximize the effectiveness of the explosion without losing lethality. The Drop Glide airframes are also designed in a manner to be able to accommodate other COTS warheads that fit into the payload space for future efforts.

There are a number of important considerations in determining the payload/warhead to be used. The mass of the warhead is important, and the present invention enables the system to provide a very effective ratio of the payload mass to the mass of the round allowing more payload to be delivered within the constraints of the mission or the system. The rounds of the present invention are designed and manufactured in such a way that the payload volume can be modular and allow a large volume of empty space within the round to place a payload/warhead. Numerus types of payloads are envisioned as being useful in various embodiments, including but not limited to high volume lethal payloads, directed energy payloads, non-lethal payloads, and radio translucent payloads, all of which may be used alone or in some combination on various rounds for a given mission.

One non-limiting example of an embodiment of the Warhead Guided or Unguided Drop Glides includes fragmentation warheads using preformed tungsten fragments with a C4 explosive fill. This allows for efficacy against soft and lightly protected targets in a large radius. The exemplary shape charge warheads include a copper shape charge liner, C4 explosive fill, and additional preformed tungsten frags to achieve dual purpose functionality. Warhead manufacturing, testing, certification, and integration into the rounds is preferably performed by entities and facilities that are Department of Defense approved and able to perform work with such dangerous elements.

The rounds/munitions/Drop Glides are highly customizable and adaptable to many particular mission needs. Not only can the size be readily and easily adjusted as needed (again, additive manufacturing allows for rapid design changes and implementation). Typically, the present invention is directed toward smaller munitions including 40 mm, 55 mm, 60 mm, 81 mm, 120 mm or other similar rounds; however, the concepts are generally scalable to virtually any size round or even larger bombs. Another key customizable feature of the rounds/munitions/Drop Glides is the ratio of the warhead mass to the total mass of the round when fully assembled. The following descriptions, ratios, and comparisons of warhead/payload to total round are generally intended to apply to bombs, munitions, rounds, or the like that are 300 lbs. or less. More preferably, the warhead:total round comparisons apply to bombs or munitions that are 250 lbs. or less. Still more preferably, the warhead:total round comparisons apply to bombs or munitions that are 200 lbs. or less. Yet more preferably, the warhead:total round comparisons apply to bombs or munitions that are 150 lbs. or less. Even more preferably, the warhead:total round comparisons apply to bombs or munitions that are 100 lbs. or less. Still yet more preferably, the warhead:total round comparisons apply to bombs or munitions that are 50 lbs. or less. Yet even more preferably, the warhead:total round comparisons apply to bombs or munitions that are 40 lbs. or less. Even still more preferably, the warhead:total round comparisons apply to bombs or munitions that are 30 lbs. or less. Yet still more preferably, the warhead:total round comparisons apply to bombs or munitions that are 20 lbs. or less. Still even more preferably, the warhead:total round comparisons apply to bombs or munitions that are 10 lbs. or less. Even yet more preferably, the warhead:total round comparisons apply to bombs or munitions that are 7 lbs. or less. Yet still more preferably, the warhead:total round comparisons apply to bombs or munitions that are 5 lbs. or less. Still yet more preferably, the warhead:total round comparisons apply to bombs or munitions that are 3 lbs. or less. Yet still more preferably, the warhead:total round comparisons apply to bombs or munitions that are 2 lbs. or less.

One important metric to assess the design rounds/munitions/Drop Glides of the present invention is to analyze the relative weights of the payload/warhead to the other components or to the overall weight or mass of the round. Preferably, the warhead or payload of a round constitutes about 50% or more of the mass of the total round. More preferably, the warhead or payload of a round constitutes about 60% or more of the mass of the total round. Still more preferably, the warhead or payload of a round constitutes about 70% or more of the mass of the total round. Yet more preferably, the warhead or payload of a round constitutes about 75% or more of the mass of the total round. Even more preferably, the warhead or payload of a round constitutes about 80% or more of the mass of the total round. Still yet more preferably, the warhead or payload of a round constitutes about 85% or more of the mass of the total round. Yet even more preferably, the warhead or payload of a round constitutes about 90% or more of the mass of the total round. Still yet more preferably, the warhead or payload of a round constitutes about 95% or more of the mass of the total round.

With respect to one exemplary embodiment of a round/munition/Drop Glide of the present invention, it may be useful to describe the desired ratios in a use case scenario using a 55 mm or 60 mm Unguided Drop Glide round or a Guided Drop Glide round that has a total mass of approximately 1100 g (unguided)-1200 g (guided), and thus for the sake of this example, one can assume an average total mass for a round to be 1150 g, including all inert and explosive components. In such a round, preferably the warhead/payload comprises at least 575 g of the total 1150 g total round mass. More preferably the warhead/payload comprises at least 690 g of the total 1150 g total round mass. Still more preferably the warhead/payload comprises at least 805 g of the total 1150 g total round mass. Yet more preferably the warhead/payload comprises at least 862 g of the total 1150 g total round mass. Even more preferably the warhead/payload comprises at least 920 g of the total 1150 g total round mass. Still yet more preferably the warhead/payload comprises at least 977 g of the total 1150 g total round mass. Yet even more preferably the warhead/payload comprises at least 1035 g of the total 1150 g total round mass. Even still preferably the warhead/payload comprises at least 1092 g of the total 1150 g total round mass.

Alternatively, the rounds may be described in terms of ratio of the mass warhead or payload to the mass of all inert components of the round/munition/Drop Glide including the airframe, flow effectors, electronic components, sensors, connectors, and the like. Preferably, the rounds exhibit a warhead/payload mass or weight to inert component mass or weight ratio of at least 1:1. More preferably, the rounds exhibit a warhead/payload mass or weight to inert component mass or weight ratio of at least 2:1. Still more preferably, the rounds exhibit a warhead/payload mass or weight to inert component mass or weight ratio of at least 3:1. Yet more preferably, the rounds exhibit a warhead/payload mass or weight to inert component mass or weight ratio of at least 4:1. Even more preferably, the rounds exhibit a warhead/payload mass or weight to inert component mass or weight ratio of at least 5:1. Still yet more preferably, the rounds exhibit a warhead/payload mass or weight to inert component mass or weight ratio of at least 6:1. Yet even more preferably, the rounds exhibit a warhead/payload mass or weight to inert component mass or weight ratio of at least 7:1. Even still more preferably, the rounds exhibit a warhead/payload mass or weight to inert component mass or weight ratio of at least 8:1. Still yet more preferably, the rounds exhibit a warhead/payload mass or weight to inert component mass or weight ratio of at least 9:1. Yet even more preferably, the rounds exhibit a warhead/payload mass or weight to inert component mass or weight ratio of at least 10:1. Even still more preferably, the rounds exhibit a warhead/payload mass or weight to inert component mass or weight ratio of at least 10.5:1.

Given the innovative and effective additive design process of the present invention, as well as the material minimization techniques used that still provide sufficiently strong, resilient airframes, the rounds may also be described with respect to the comparative internal volume of the rounds/munitions/

Drop Glides and the relative amount of said volume occupied by various components such as the warhead/payload and inert components including, flow effector actuators and actuator systems, electronic components, sensors, connectors, and the like, but clearly not including the volume of the airframe body itself, or the flow effectors external to the airframe. In such analysis, preferably the warhead/payload comprises at least 50% of the internal volume of the munition airframe. More preferably the warhead/payload comprises at least 55% of the internal volume of the munition airframe. Still more preferably the warhead/payload comprises at least 60% of the internal volume of the munition airframe. Yet more preferably the warhead/payload comprises at least 65% of the internal volume of the munition airframe. Even more preferably the warhead/payload comprises at least 70% of the internal volume of the munition airframe. Still yet more preferably the warhead/payload comprises at least 75% of the internal volume of the munition airframe. Yet even more preferably the warhead/payload comprises at least 80% of the internal volume of the munition airframe.

Another important feature of the systems and devices of the present invention is the ability to provide virtually any type of warhead possible to fit within the structure of the Drop Glide airframes, which allows for specific rounds to be tailored to specific missions or mission needs. One example is the use of fragmenting warheads. Lethality of fragmenting warheads is assessed by flux and kinetic energy at given locations from the burst location where flux is fragments per sq ft of a cylindrical or spherical surface expanding away from the center, and kinetic energy is measured in Joules and is calculated by Equation 1:

$$KE = \tfrac{1}{2} \times (\text{Mass of a given fragment}) \times (\text{velocity of the fragment}) \quad \text{Equation 1:}$$

With regard to flux, for preformed fragments, dispersion is more even and frag size is more consistent, where for cast fragmentation bodies, dispersion is more random and frag size is more varied. With respect to the kinetic energy, higher density materials have more consistent velocities as they depart the detonation, whereas lower density materials are more greatly impacted by drag and lose kinetic energy faster. By way of example, a 750 gram warhead of the present invention may include 600 grams of 2.65 mm tungsten fragments and 150 grams of C4 explosive fill, and at a distance of 15 m from the point of detonation/explosion, may exhibit a flux of 0.8 fragments per square ft. (fpsf), and a kinetic energy of 95 J per frag. A 2000 g warhead though, may comprise 1400 g of 3.3 mm tungsten fragments and 450 g of C4 explosive fill, which at the same 15 m distance yields a flux of 1.2 fpsf and kinetic energy of 115 J per frag. Although the exemplary disclosures above note that C4 explosive fill is used, many other embodiments of the explosive fill may be utilized, including, but not limited to, A-5 (RDX), Composition B (RDX), Cyclotol (RDX), PBXN-5 (HMX), IMX-101, IMX-104, PAX-48, OSX-12, and the like.

Another type of warhead that may be used with various embodiments of the present invention is the use of shape charges. Lethality of shape charges can be assessed by the size of the penetration through a test article, for example an armor simulant or model. Generally, testing the lethality of shape charges involves constructing a test article such that when the shape charge is detonated, it presents its effects toward a thick section of the test article, and then the depth of penetration from a fixed offset is measured, where that depth of penetration can be used as a measure of the effectiveness, or lethality, of the charge. In one exemplary, but non-limiting, example, a shape charge warhead is provided comprising a conical liner constructed within the warhead and made of copper. Other metals, such as Tantalum, may be used as well, though many embodiments of the present invention utilize copper for the cost effective benefits with comparable lethality. Copper liner, as used herein, is intended to be representative and nonlimiting, and to include all other metals or materials known to those skilled in the art for such purpose. The conical liner allows the shape charge to provide the desired explosion effect based on the shape and orientation of the conical liner. Some embodiments may use a slightly wider warhead body to provide additional space for explosive fill behind/above the copper liner, which allows the shape charge to be more effective in creating the desired jet (the shape and direction of the explosion or explosive effect in the form of the liner, copper or otherwise, exploding out from the warhead in the desired manner). Similarly, within the warhead, it is preferable to provide clear, empty space in front of the copper liner (the front referring to the side of the liner in which the liner will travel upon detonation) in order to allow the warhead to detonate and form the desired explosive jet most accurately. Such shape charges generally require a direct hit of the target or target region and a proximity-induced trigger to cause explosion/detonation. Rounds utilizing shape charges, therefore, need to be highly accurate, such as within inches of the desired target or detonation location. In the present invention, the MIMU package provides highly accurate measurement of the round's position, orientation, movement, and the like, and allows such a shape charge trigger to most effectively and accurately operate. Not only do the raw MIMU measurements (or processed MIMU sensor signals) provide accurate measurements of the attributes of the round that are directly measured (e.g., acceleration, angular velocity, etc.), but the MIMU signals can be further processed to obtain the rates of change of those measurements in order to provide a complete and very accurate picture of the round's state at any point during flight, and can particularly be used to determine if/when the round is in the proper location to detonate for effectiveness of the shape charge (or other such warheads as well). Shape charges are particularly useful for anti-armor purposes, such as attacking a highly armored vehicle or building.

Yet another example of a warhead type used by some embodiments of the present invention is an explosively formed penetrator, or EFP. Lethality of EFPs can be assessed by the size of the penetration through a test article, for example an armor simulant or model. Generally, testing the lethality of shape charges involves constructing a test article such that when the shape charge is detonated, it presents its effects toward a thick section of the test article, and then the depth of penetration from a fixed offset is measured, where that depth of penetration can be used as a measure of the effectiveness, or lethality, of the charge. One exemplary, but non-limiting, example of an EFP is a warhead comprising an inverted dome in front of the explosive fill, where the dome may preferably be constructed of copper, though other metals and materials known in the art are contemplated as well depending on the mission and the cost effectiveness desired. The inverted dome construction provides a warhead with a smaller aspect ratio that a similar shape charge warhead. Some embodiments may use a slightly wider warhead body to provide additional space for explosive fill behind/above the copper dome, which allows the EFP to be more effective in creating the desired explosion or explosive effect. EFPs generally require a direct hit of the target or target region and a proximity-induced trigger to cause explosion/detonation. Rounds utilizing shape charges, therefore, need to be highly accurate, such as within inches of the desired target or detonation location. In the present invention, the MIMU package provides highly accurate measurement of the round's position, orientation, movement, and the like, and allows such an EFP trigger to most effectively and accurately operate. Not only do the raw MIMU measurements (or processed MIMU sensor signals) provide accurate measurements of the attributes of the round that are directly measured (e.g., acceleration, angular velocity, etc.), but the MIMU signals can be further processed to obtain the rates of change of those measurements in order to provide a complete and very accurate picture of the round's state at any point during flight, and can particularly be used to determine if/when the round is in the proper location to detonate for effectiveness of the EFP (or other such warheads as well). EFPs are particularly useful for anti-armor purposes, such as attacking a highly armored vehicle or building.

Still another type of warhead used in various embodiments of the present invention includes thermal warheads, baric warheads, and thermobaric warheads. Thermal warheads produce the desired damaging effects by causing extremely high heat, baric warheads cause the desired damaging effects by creating an output of extremely high pressure, and thermobaric warheads (also known as vacuum bombs) create both extremely high heat and pressure, generally by utilizing oxygen in the ambient air around the explosion to cause such high heat and pressure. Each of these types of warheads tend to use explosive fills that rely on airborne oxidizer and which can increase the total yield. These types of warheads are particularly effective inside enclosed spaces, for example, in a 100-200 sq ft enclosed space, 1 kg (~30 cu in) of thermobaric payload creates 6-10 atm overpressure along with intense heat. Examples of such explosives that may be used include, but are not limited to, PBXIH-135 and PBXIH-135EB.

It is important to note that the rounds of the present invention may utilize any of the above types of warheads, and may be selected based on the particular needs of the mission. It is also important to note that the above types of warheads are not all mutually exclusive, and may be combined to create increasingly effective rounds that can be tailored for very specific or general effects, and can be readily swapped out during the loading opportunities, and that each round can be made much more cost effectively. To this point, shape charges and EFPs can be combined with fragmentic effects or thermos-, baro-, or thermobaric effects to truly customize the round's effectiveness. Further, regardless of the type of warhead/payload used, the round with said payload are preferably designed and constructed to provide the most effective impact as possible for the particular mission. To that end, preferably, the warhead/payload is designed to produce an effective kinetic energy for an individual fragment, EFP, or explosion of at least 80 joules. More preferably, the warhead/payload is designed to produce an effective kinetic energy for an individual fragment, EFP, or explosion of at least 85 joules. Still more preferably, the warhead/payload is designed to produce an effective kinetic energy for an individual fragment, EFP, or explosion of at least 90 joules. Yet more preferably, the warhead/payload is designed to produce an effective kinetic energy for an individual fragment, EFP, or explosion of at least 95 joules. Even more preferably, the warhead/payload is designed to produce an effective kinetic energy for an individual fragment, EFP, or explosion of at least 100 joules.

Inert Warhead Rounds/Munitions/Drop Glides

Inert Warhead rounds/munitions/Drop Glides are hardware and software assets that are able to be used for training and practice, and perhaps more importantly, to generate quantitative and qualitative data for users regarding the use of the system, for example by providing fuze functionality assessment of the Drop Glides. Inert Warhead Drop Glides include all the same components as the Guided (inert) Drop Glides but include a functional fuze with its detonator removed. The output of the fuze can be recorded by the onboard electronics, and used to activate external indicator lights on the munition. The fuzes used for the rounds of the present invention may be of any type known in the art, or custom designed for particular use-cases or missions. One nonlimiting example of an embodiment of an Inert Drop Glide utilizes a COTS fuze provided for other military weapons, such as is produced by KAMAN Fuzing and Precision Products. The fuze is designed to be integrated into the space between the payload and the guidance electronics. Fuzes such KAMAN's fuze allow for the Drop Glides to have similar arming environments and use procedures to that of air dropped bombs which are largely known to those who would be using the present invention in the field, and include features like intent to release, umbilical disconnect, pressure sensors/impellers, free fall detection, safe separation, point detonation, and trigger inputs. The fuze is preferably integrated to allow for the Inert Drop-Glides to have similar arming environments and use procedures to that of air dropped bombs. This includes features like intent to release, umbilical disconnect, pressure sensors/impellers, free fall detection, safe separation, point detonation, and trigger inputs. These articles will allow for assessment of fuze functionality to be completed. A key differentiator of the Drop-Glides from many other improvised dropped munitions and loitering munitions is that each Drop-Glide contains a full capability fuze to protect the warhead from detonating in any undesired scenarios. The Fuzes of these Drop-Glides will include an intent to release functionality along with arming environments and safe separation. These fuzes come with options to trigger on impact or with a proximity trigger. The electronics interface with the fuze in the Inert Warhead Drop-Glide (with Fuze).

Preferably, the fuze requires multiples conditions, events, measurements, environments, or other such conditions precedent prior to the warhead or payload being able to be armed and ready to detonate or explode. Preferably, at least two such conditions precedent must be met prior to the warhead or payload being able to be armed. More preferably, at least three such conditions precedent must be met prior to the warhead or payload being able to be armed. Still more preferably, at least four such conditions precedent must be met prior to the warhead or payload being able to be armed. Yet more preferably, at least five such conditions precedent must be met prior to the warhead or payload being able to be armed. Even more preferably, at least six such conditions precedent must be met prior to the warhead or payload being able to be armed.

Autonomous Target Identification and Tracking

A key feature in many embodiments of the present invention utilizing Forward Observer Kit with On-board GNC Module is the ability to autonomously identify and track targets. The warfighter is ultimately responsible for selecting targets and initiating strikes on the targets (though it is foreseeable, and adaptable with the present system, for autonomous target selection and strike initiation by the system if such autonomous operation were ever proven to be safe and effective, and adopted by relevant decision makers), but in order for the warfighter to effectively select the targets, the FO Kit can preferably track the targets positions and velocity in space using at least one camera or image sensor, though preferably one or more arrays of cameras or image sensors. Types of cameras or image sensors for target sensing, detection, and tracking that may be useful for purposes of the present invention, either alone or in conjunction with one or more other types may include, but not limited to, Long-Wave Infrared (LWIR) and Short-Wave Infrared (SWIR) for use in low light (night) and all-weather scenarios (although the UAV may be limited by the weather as much as the cameras). By including multiple types of cameras, the images used for tracking will be multispectral, which increases the reliability and accuracy of the image tracking algorithms, allowing for multiple modes of identification and separation of targets. The most effective set up in "good" lighting and weather conditions is to use multiple visual cameras rigidly spaced on opposite sides of the UAV and use stereo camera analysis to create depth images of the battlefield. This is important for feature and motion tracking within the video images. The images are processed using the onboard processing system that preferably comprises at least one NVIDIA Jetson module, or other similar processing component preferably with AI and/or data fusion and processing capabilities. The FO Kit preferably utilizes computer vision image processing algorithms and tracking filters to maintain tracks of multiple targets. Such algorithms preferably include functionality and capability including feature extraction and filters such as particle and different types of Kalman filters, as well as Artificial Intelligence based approaches. Artificial Intelligence and machine learning algorithms may preferably be used in the processing components of the system, and may be particularly useful for target identification and tracking, object or obstacle recognition, scene recognition, and the like. This allows the FO Kit to identify the type of target and maintain tracks for each one. The video may preferably be streamed back to the warfighter through video communication components and methods described herein, as well as digital data packets that contains information such as target type and IDs for selection. When transmitting video, especially over radio, there are three major performance parameters that must be analyzed as tradeoffs due to the size of video and image data: resolution, range, and latency. The system preferably optimizes the data transmission according to the conditions and circumstances at the time by balancing these three parameters to obtain the best data quality and transmission fidelity possible. UAV-to-Munition Guidance communication likely will not require video transmission and thus, will not have the same requirements, tradeoffs, and overall analysis. Any image or video sensor of the present invention may benefit from robust image stabilization techniques, such as those presented in U.S. Pat. No. 10,735,654 (issued on Aug. 4, 2020), U.S. Pat. No. 10,979,643 (issued Apr. 13, 2021), U.S. Pat. No. 11,509,828 (issued on Nov. 22, 2022), and U.S. patent application Ser. No. 17/968,890 (filed on Oct. 19, 2022), each of which is incorporated by reference in its entirety.

War-Fighter-In-The-Loop (WFIL) Communication

The UAV is designed to preferably locate, identify, and track targets autonomously, however, no action will be taken on these targets until a warfighter determines the correct target and sends the command to the UAV. As mentioned previously, the FO Kit can preferably transmit video as well as target information to the fire control system and the warfighter. For shorter range communication (<10 km), Ultra-Wideband Radio may be used for both WFIL and UAV-to-Munition communication. Ultra-Wideband Radio is discussed in greater detail below. Other types of communication equipment and systems known in the art or later developed may alternatively be used long range effectiveness. The video data being transmitted to the warfighter are generally likely to be large in size, especially at high resolution so that the warfighter can clearly see the image details and ascertain points and objects in the data, so the videos may preferably be transmitted via analog transmission which improves transmittal speed but does not allow for processing information to be sent. In such embodiments, digital information packets will preferably be sent on a different line to the ground station. The ground station will combine the image/video data with the digital packets to display the video for the warfighter with target information to allow the warfighter to make decisions based upon the video data. Target selection information is then preferably sent back to the FO Kit in order to guide the round. In order to meet the requirements of the three scenarios discussed above, the target selection can be delayed or updated by the warfighter while the munition is in flight. The selected target data is then processed from the real-time tracking data and forwarded to the munition. This communication procedure is described in the following section.

UAV-to-Munition Guidance Communication

In order to complete the mission, the forward observer must communicate with the munition in flight. Although numerous forms of communication can be employed for the FO Kit to communicate with the munition in flight, the Ultra-Wideband Radio is one preferred system for such communication between the munition and the FO Kit. The FO Kit can calculate impact location based on time remaining in flight (from munition position and velocity) and the target position and motion. The impact location can then be transmitted to the munition which then calculates the control required to reach the impact point. The munition transmits basic information to the FO Kit while in flight such as an ID. This allows the FO Kit to estimate the munition location and velocity in order to estimate the time remaining in flight required to hit a moving target. This communication method must be able to transmit small packets of digital information very quickly in order to update the munition guidance system in flight in real-time.

Ultra-Wideband (UWB) Communication

Ultra-wideband (UWB) is a radio technology based on the IEEE 802.15.4a and 802.15.4z standards that can enable very accurate timing of the Time of Flight of the radio signal, leading to centimeter accuracy distance and location measurement. In addition to this capability, UWB offers data communication while using extremely little energy. By combining accurate location and communication, UWB also offers a secure communication over wireless secure transactions. UWB leverages Time of Flight (ToF), which is a method for measuring the distance between two radios by multiplying the Time of Flight of the signal by the speed of light. From this basic principle, UWB technology can be configured to do ranging using Time Difference of Arrival (TDoA). The TDoA method is very similar to GPS. Multiple reference points, called anchors, are preferably deployed on the UAV and are time synchronized. The munition will give off a beacon signal, and when an anchor receives the beacon signal it will timestamp it. The timestamps from multiple anchors are then sent back to the UAV computer system which will run a multilateration algorithm based on Time Difference of Arrival of the beacons signals to geolocate the munition. If the four anchors on the UAV were each to use its own free-running clock source, then the anchor clocks would drift out of synchronization very quickly to the point where the system would fail. Even using temperature-controlled crystal oscillators (TCXOs) with a very tight frequency tolerance (for example, 1 ppm) the time-bases in different anchors will rapidly drift apart; for example, a 1 ppm error results in a 1 ns error over a 1 millisecond interval. This is outside the limit required for accurate location. Thus, the wired synchronization scheme uses a common clock that is distributed to all anchor nodes and used to drive each anchor node's on-board system clock. Also, the UWB modules have a SYNC input pin that is used to reset the on-chip system clock's counter value to zero. This ensures that the anchors have the same initial starting-time. A SYNC control signal is distributed to all the anchor nodes so that they all have their system clocks reset by the same event in time.

Multilateration is a mathematical technique for determining a stationary or moving object's position based on measurement of the times of arrival (TOAs) from its transmitter. Multiple synchronized receivers listen to the munition's beacon to determine the distance from each receiver. If the 3D coordinates of the munition's position are sought and m is the number of signals received with TOA, it's required that m≥4. Then, the fundamental set of m measurement equations is:

$$\text{TOAs} = \text{TOFs}(d \text{ unknown variables embedded in } m \text{ expressions}) + \text{TOT}(\text{one unknown variable replicated } m \text{ times}) \quad \text{Equation 2:}$$

The unknown TOT (time of transmission) introduces analytic and physical complexity but there are algebraic solutions to the multilateration problem. The anchors on the UAV are synchronized so their timestamps accurately measure the ToA of the transmission from the munition. However, the time of the transmission is unknown. Hence, each anchor knows the time of arrival (TOA) which is the sum of the time of flight plus the time of transmission (TOT). Measurements for a pair of anchors are subtracted to obtain the difference of the true ranges from the anchors to the munition. This subtraction generates the locus of all possible positions (LOP) of the munition as a hyperboloid of revolution. Three anchors (two sets) generate an intersection of two hyperboloids (as shown in FIG. 6) of anchors on which the munition is located. More anchor pairs help improve the accuracy of the unique 3D location. Several algorithms have been used to solve the problem. For example, the Bancroft algorithm allows obtaining a direct solution of munition's position without requiring a priori knowledge of the munition's location. Multiple anchors generate redundant observations in the system of equations such that a least squares method can be used for improving the accuracy of the solution.

Multi-Munition Coordination

Ultimately, the combination of two-way WFIL between the UAV and the warfighter with the UAV-to-Munition communication, results in a more accurate and effective long-range weapon, and this can be further utilized to coordinate the offensive of multiple munitions in flight simultaneously. The FO Kit is capable of identifying and tracking multiple targets and is designed to communicate with multiple munitions simultaneously through a module that specifically receives identifying information from the munition, and the FO Kit can determine the "unguided" flight path or where the munition would impact with no intervention. By receiving sets of targets from the warfighter, the UAV can direct the munitions to hit the targets in a specified order, or an order determined through optimization of cost functions to determine which munition to send to which target based on prioritization, time of impact, or some other success parameter. The warfighter will continue to receive video throughout the mission and thus can assess the damage of each munition and determine if the next one, already in flight, should be directed to the same target or move on to the next target. This is an enhancement of capabilities, especially for LRPF that have to travel long distances and have long times of arrival, the munitions can be fired rapidly before the previous has even reached the target. Alternatively, the munitions can be fired simultaneously in order to prevent enemy knowledge and action before arrival of multiple munitions. The FO Kit will be outfitted with high precision, high bandwidth radio receivers in order to receive and accurately timestamp messages from multiple munitions while allowing the computational assets aboard the FO Kit to calculate the coordination and send the guidance information back to the munitions with specific instructions for each one separately. This coordination of multiple LRPF munitions greatly increases the effectiveness and lethality of the systems.

GPS-Denied and Degraded Navigation Aiding

The cameras and sensors within the FO Kit allow for navigation aiding to be passed to the UAV. The UAV tracks its position and orientation using its own sensors and methods and will be implemented with GPS for the most accurate estimates when GPS is available. However, the UAV will likely be in or near enemy territory, meaning the GPS receivers may be jammed or spoofed. The FO Kit will receive and share pose information with the UAV. The FO Kit aids in the estimate of the pose by providing information from its own sensors and optical flow from its cameras. Optical flow is a computer vision method that uses the change in sequential images to determine motion (velocity and rotation) of the camera by tracking features extracted from the image. This can be dense, meaning every pixel is tracked, or sparse meaning only specific features are tracked for motion estimates. Sparse optical flow is preferably implemented in many embodiments in order to maintain real time estimation due to the restrictive computing power and time needed to process images using dense optical flow. The inertial sensors within the FO Kit improve the motion estimates, specifically the velocity estimates, of the optical flow algorithms. This velocity data can be integrated to calculate the position, which accumulates less error over time than dead-reckoning accelerometer data. These measurements are agnostic outside communication so the FO Kit, in combination with the UAV itself, will compare the estimated velocity and position to the output of the GPS in order to identify attempted GPS spoofing. By identifying large discrepancies between GPS outputs and optical measurements, adversarial navigation environments, such as spoofing or jamming, are identified. An example of optical flow from post processing video from a UAV mounted camera is shown in FIG. 6.

Navigation or pose estimation throughout flight is key to the FO Kit functionality as a forward observer. The position of the target must be known in a global reference frame, rather than just a relative frame, so that the information can be communicated and interpreted by the warfighter, fire-control system, and munition. By knowing its own position and the relative target position from measurements, the global position can be calculated. In the case of GPS denial, the navigation to return to home can be primarily obtained through optical flow until the UAV is out of range of the jammers or it is able to enable and utilize scene recognition and identify a safe environment to land. The FO Kit enables improved navigation in GPS-denied or degraded environments while also improving estimates when GPS is available.

Many embodiments of the present invention utilize advanced IMU capabilities to provide, at least, highly accurate guidance and navigation, even in GPS denied or degraded environments. Such IMU systems are preferably comprised of low-cost IMUs that are arranged and combined in various configurations in order to provide the same, or even better, accuracy and reliability as high-cost tactical or navigational grade IMUs. Examples of such IMU systems are provided by U.S. Pat. Nos. 10,527,427, 10,969,226, and U.S. patent application Ser. No. 17/182,362 which was filed on Feb. 23, 2021, each of which is hereby incorporated by reference in their entirety, and each of which provides explicit detail on IMU systems employed in some embodiments of the present invention. Many embodiments of the present invention may also benefit from enhanced IMU processing techniques that provide enhanced resolution of IMU signal processing to enable continuous IMU measurements while avoiding saturation and data blackout periods resulting from changing conditions of the larger system. This again, allows a series of low-cost IMUs to provide equal, if not superior data collection capabilities and accuracy to that of high grade navigational or tactical IMUs. Examples of such IMU systems are provided by U.S. Pat. Nos. 10,527,425, 11,118,909, and 11,692,828, each of which is hereby incorporated by reference in its entirety, and each of which provides explicit detail on IMU systems and signal processing employed in some embodiments of the present invention. Still further, many embodiments of the present invention may utilize such IMU systems that further include improved and enhanced error, offset, and drift correction which improves the accuracy even further by minimizing or correcting for shifts in sensor readings that occur over time. Examples of such IMU systems are provided by U.S. Pat. No. 11,575,660, and which is hereby incorporated by reference in its entirety providing explicit detail on the methods and systems that can be used to provide correction of sensor errors and protection of low-cost IMUs to ensure high-accuracy functioning. Many embodiments of the present invention further include a recalibration module adapted to address sensor error, offset, or bias shift caused by the randomness of bias shifts accrued during operation of the system and sensors, which is also explained in detail in U.S. patent application Ser. No. 16/993,336. Preferably, the GNC capabilities of the present invention are performed, at least in part, by an IMU system comprising multiple IMUs operating in conjunction with each other to result in high bandwidth and full coverage of the angular rate and linear acceleration, where the multiple IMUs comprise a) several sensor types and ranges, b) arrayed and arranged to reduce bias, noise, and temperature drift, and to allow multiple small IMUs, strategically packaged together, to enable the resultant system to meet virtually all performance levels of performance standards while fitting into a small, low power, low cost package.

Safety Supervisor

Many embodiments of the present invention are directed to systems and methods of ensuring weapons safety inside a safety zone wherein it is absolutely undesirable for weapons to be able to be fired, launched, detonated, or otherwise engaged or employed. The safety zone is generally defined as a particular radius around the location (home position) from where the vehicle or projectile is launched, takes off, is fired, or is otherwise deployed, and includes the three-dimensional, cylindrical volume above and below the home position. Various sensors can be used alone or in combination to establish and define the safety zone, and to determine the vehicle's or projectile's position relative to the safety zone. Imaging sensors, such as the numerous cameras and visual sensors of the UAV as described herein, may identify unique landmarks and identifying characteristics that can be used to define the home location or boundaries around such home location. Thus, when the system detects that it is within the safety zone by identifying such landmarks, it disables all weapons systems such that they cannot be engaged or made ready under any circumstances. This helps to prevents any accidental weapons discharge near the home position, but more importantly, prevents malicious attacks from enemies who may seek to hijack the vehicle or projectile and return it to its home location to discharge the weapons. Thus, the sensors of the system are utilized to define the safety zone, and to determine the system's location such that it disables or disallows engagement of weapons systems when in the safety zone, and allows for weapons systems to be armed/fuzed/made ready when outside the safety zone.

The above is extended to create an autonomous or unmanned system safety supervisor for systems armed with lethal, less than lethal, and electronic warfare systems. In the past, a human being was the last step to pull the trigger or release the weapon systems, but now placing these weapons on the unmanned system puts a radio link in the loop of the deployment of weapons. This invention creates a safety supervisor that protects the system from 3 types of dangerous failure modes; 1) A confused or misinformed friendly fire incident, 2) a hijacked system from being tasked to attack the system's rightful controller 3) insider threat sabotage on friendly personnel or assets. To solve this problem the low cost high performance IMU technologies are combined with low cost sensors to create safety zones and safety focused features in the landscape that can force unmanned systems to return to a safe state when certain conditions are met. This safety supervisor is in addition to the independent safety systems that must be in each weapon or weapon system attached to the unmanned system. This approach of having a safety supervisor for all armed unmanned systems (aerial, ground, and underwater) for lethal, less than lethal, and electronic warfare payloads will provide an effective path forward for moving more users out of reach of the adversary in a safe manner.

To improve the quality of the safety zone generation and detection, an array of small low power sensors is preferably used in addition to any of the advanced and enhanced performance IMUs as described above and incorporated by reference for alternative GNC. Particular sensors of interest are visual video cameras, Infrared Video cameras (particularly Long wave infrared video cameras), mm Wave Radars (for example those operable in the 60 GHZ, 77 Ghz, or 24 Ghz Bands), pressure sensors, and an RF Beacon interface. Any one or more, or combinations of, these sensors are preferably arrayed on the unmanned platform to observe the environment around and below the system. During the takeoff phase, the selected sensors would establish baseline data that would establish the home position around which the primary safety zone is constructed. This could include images, heat signatures, topographic data, and other multi or hyper spectral combinations of the above. These arrays of sensors are preferably registered to each other increasing the data quality so that specific regions for each sensor input can be correlated to the appropriate regions on another sensor. To increase the throughput and the quality of the sensor data products, IMU data may be used in the transformation of the video and radar data streams into an earth fixed reference frame. The IMUs provide excellent high resolution detail of the dynamics of the system but can drift over the longer mission times (but can be recalibrated is disclosed in the subject matter incorporated by reference herein). The video and radar sensors do not drift but do not have as fine of time resolution. In combination these sensors and IMUs produce better navigation data.

For the video cameras and/or Infrared video sensors the system can create optical flow paths to create breadcrumbs of where the system has gone (for example, as shown in FIG. 6). This process can be performed with traditional CPUs or can be accelerated with machine learning methods, including neural networks implemented on TPUs, VPUs and/or GPUs. These can aid in the generation of waypoints through perceiving the scene. There are 4 classes of environmental detection and tracking that may facilitate this safety zone: 1) detecting and marking the home safety zone, 2) detecting and marking the path traveled, 3) detecting and marking specific high contrast/high fidelity landmarks along the path, and 4) general scene detection such as horizon detection.

Radar sensors utilized as a radar altimeter provides one useful input, but implementing a beam steering method allows the system to rapidly scan the landscape to make distance and velocity measurements of an array of points. These depth and velocity measurements can be combined with the video data to increase detection and reliability. In combination with the IMU data and camera date the system can build a topographic map of the landscape below for better defining safety zones, safety paths, and safety features, and can also be useful for target identification and tracking. The radar provides effective uses even in poor weather conditions (darkness, rain, fog). For underwater applications sonar is substituted for radar as a navigation and detection tool for creating safety zones. In utilizing the Steerable beamforming radar described above for measuring velocities and distances, the same hardware set can be used to create a high bandwidth datalink that can provide distances traveled and Angle of Arrival of the RF signal for use as a safety or navigation feature. By placing a beacon (which is a beamforming radar or sonar itself) at the takeoff point, this provides an additional safety feature as the system can measure distance and orientation to home. By placing beacons (dropping them from the unmanned vehicle or system for instance) along the path, they can provide safety features and navigation aides to return home safe, acting as breadcrumbs indicating the path already safely traversed. These beacons can also be used as a template for subsequent UAVs to travel the same path or operate in the same area. The beacons can also be used as communication hubs or waypoints to relay safety data if the flight control data link is compromised or degraded. Beacons may be rounds or munitions themselves (i.e., a round or munition with specific location and radio components to provide the beacon signal as described), or may be a dedicated beacon that is carried by the UAV/UAS purposefully for the goal of placing the beacon in a desired location. Using the sensors and communication components of the system, the UAV/UAS can then locate the beacon signal and determine the distance between the UAV/UAS and the beacon, and when multiple beacons are deployed, the UAV/UAS is then able to determine its location based on the location of those beacons.

Another unique aspect of the safety supervisor technology is that it can accomplish an additional objective with the hardware required for the system safety supervisor described above, that being navigation in GPS denied and degraded environments. Just as the system safety supervisor needs to 1) detect and mark its home, 2) detect and mark its path of travel, 3) detect and mark high contrast points along the path, and 4) generally perceive and track its environment in order to safely supervise the weapon systems, the unmanned system needs to navigate in the GPS denied environment. In essence by solving either the safety supervisor or navigation problem the present invention obtains a solution to both. By tracking the landscape with multi and hyperspectral low cost sensors, the system can navigate in degraded GPS and degraded weather environments. The beacons can be used as markers along the path and as triangulation tools to navigate in heavy fog. It also provides a secure redundant communication network. This beneficial effect can be further augmented by enabling multiple unmanned systems to share safety supervisor or navigation data. That is, one unmanned system can map out the environment and lay beacons for any number of collaborating unmanned or manned systems, and additional UAVs may provide similar, overlapping, or redundant and confirmatory information. Having multiple captures of the environment increases resilience to poor weather and lighting conditions can be achieved.

Another beneficial aspect of the present invention is the development of improved cyber security of each piece of the communication system through the use of embedded HSMs (hardware security monitors) and/or TPMs (trusted platform modules) to ensure that only authorized systems are able to decipher or communicate on the network built by collaborating unmanned systems and the beacons that they deploy. In some embodiments that utilize static beacons, for example, on the ground and beacons attached to collaborating unamended aerial and ground vehicles, the overall resilience of the navigation and safety supervision data is improved. In one implementation a specific unit can define hardware based security keys through direct handshakes so that no unmanned systems or beacons can enter the local network without the hardware handshake at the beginning. This extends zero trust cyber security principles into the embedded hardware of this new safety supervisor and navigation technology. Additionally, a dual purpose mmWave transceiver may be utilized. This ability to use a mmWave transceiver as both a ranging and detection tool (in either FMCW or ToF mode) as well as a communication link maximizes the benefit of its inclusion in the safety supervisor and/or navigation system. The mm Wave frequencies enable the use of small antenna arrays to steer the receive and transmit functions of the transceiver which provides 3 benefits; it extends the range of the system for ranging and communication, it prevents unauthorized parties from detecting the signal, and it provides angle of arrival data to improve safety supervision and navigation.

Another important aspect of the present invention is a dual-function usage of radios/sensors, particularly radar or sonar, depending on the embodiment. Such sensors/radios, in the scope of the present invention, may preferably be used not only for acquiring data regarding the surroundings and environment of the vehicle or projectile, but also for communication between the vehicle or system and the home position, or at least one or more beacons, waypoints, or communication stations along the path from the home position to the vehicle's or system's current location. Any such beacons, waypoints, or communication stations that are dropped can be used as "breadcrumbs" by which the system can chart a return path to the home position in stages, following the beacons and without requiring long-range signals, which can be more easily located, intercepted, spoofed, etc. Thus, in the example of radar, not only can the radar systems be used for altitude (generally measured as height above sea level), ground height (or height above ground, is a measurement of the current system location and the height above the local terrain as opposed to sea level), velocity, terrain measurement (terrain mapping as well, providing an image to a user as well as data for mapping the area of operation as well as paths to and from such area), and the like, but such radios can also be used to communicate with the beacons that are dropped for location, guidance, and navigation purposes. In many embodiments, such functions and measurement may also be supplemented by image data or data from IMUs, or may be measured entirely by such sensors and systems, if applicable. Proper encryption and security measures can be employed between each radar antenna or point, and each point can only be activated when pinged for communication from another point thus preventing the use of broad, sweeping transmissions that can easily be detected, intercepted, and located. This chain of secure communication hubs allows for the vehicle or projectile to be in substantially constant secure communication with the home base. It also creates a network of communication points that may be accessed by subsequent vehicles or projectiles that may be desired to travel to the same destination for varying purposes.

Swarming/Clusters

Another concept enabled by the UAV/UAS and processing elements of the present invention is the ability to provide UAV/UAS swarms or clusters of vehicles that can be used for various functions including reconnaissance, attack, defense, communication, and the like. Swarming/clustering allows the unit to allocate and preserve high value assets (e.g., more expensive and highly technologically appointed UAV/UAS, manned vehicles such as fighter jets or bombers) by providing an affordable mass of weaponized UAV/UAS swarms or clusters. The low cost manufacturing methods disclosed herein create rapidly configurable hardware and software builds to address emerging threats. Swarms of Low-Cost Weaponized UAVs deliver disproportionate cost impacts to the adversary whereby a mass of cost-effective UAV/UAS may be deployed giving the enemy a significantly large number of targets to be addressed, which provides the potential to overwhelm such enemies without providing any meaningful opportunity for the enemy to reply effectively to the threat. An enemy will have a very difficult time trying to attack any individual UAV/UAS, particularly while being faced with attacks from any number of additional UAV/UAS. These swarms or clusters may each be used for different purposes, for example, one cluster may be dedicated to attacking enemy fortified positions, another may be dedicated to scouting and reconnaissance of the surrounding area for emerging threats or escaping targets, another may be dedicated to providing communication between the clusters and with the remote user. Each individual cluster may have different UAV/UAS dedicated to different functions. The system may also employ a high-level coordination UAV/UAS or UAV/UAS cluster that provides a local hierarchical control for any number of other clusters used as described. Additionally, the present invention's use of COTS hardware reduces concerns regarding supply chain fragility in delivering the materials and components required to build such systems. Ultimately, under warfighter remote direction, this UAV/UAS swarm will be able to harass and destroy key adversary assets with dozens of precision strikes that can defeat many targets including armor, Air defenses, RADARS, and infrastructure, all while simultaneously confusing and overwhelming the adversary, thus decreasing its ability to mount a return attack.

In one exemplary formation of UAV/UAS swarms or clusters (depicted in FIG. 10), 6 Attack clusters and 1 Reserve Cluster brings 28 UAVs to the AO along with, for example, a combination of 72 Unguided Drop Glide munitions, 36 Rocket Glide Munitions, and 20 Guided Glide munitions. The reserve cluster can be used to bridge poor communication links with improved line of sight and/or adopt munition delivery UAVs (MD-UAVS) from clusters with disabled/destroyed command and control UAVs (CC-UAVs). As an example of the cost of the systems described herein, at one point during development of the invention the cost of this formation is $216 k for 108 unguided munitions, $60 k for 20 Guided Glide Munitions, $540 k for 18 MD-UAVs, $400 k for 10 CC-UAVs, Totaling $1.2 M delivers 128 munitions on target at range or just $10,000 per strike even if all UAVs are lost. Only $276 k in munitions is expended if UAVs are recovered. At a high level of generality, the UAV/UAS behavior can be described as executing preprogrammed Rules of Navigation based on the interaction of sensor inputs and warfighter inputs. The present invention serves to reduce warfighter burden by using high-performance on-board computing to analyze imagery and navigation data and provide actionable information for warfighter review. For example, high resolution scene flow can be continuously computed onboard each CC and MD UAV and any detections that meet certain criteria will be pushed for review by the warfighter, saving communications bandwidth and warfighter burden.

UAV/UAS swarming/clustering enables the system (or user) to use clusters of vehicles to allow one user to command multiple vehicles. Such user would be operating the vehicles via the Ground Control Station and can send commands to one of the UAV/UAS designated as a CC-UAV and which then coordinates the activity of the other UAVs, or can control multiple UAVs individually via the user interface. In this way the user could select a very large number of targets with a wide variety of arrival behaviors to be completed in synchronization or sequence. This may preferably include multiple (e.g., several dozen rounds from multiple UAV) total rounds arriving on targets coordinated by a single user. The clusters of vehicles preferably use onboard sensors to perceive other agents in the cluster for the purposes of flocking and formation control in order to build targeting data and hold specific formations for simple and complex release patterns. These sensors can be the same sensors that are used for the targeting and guidance of the guided munitions or a separate set dedicated to flock control, but still specifically configured to facilitate multi-tier swarming. That is, the system enables clusters of vehicles releasing swarms of projectiles in various levels of coordination, commanded by as few as one user. The data from the sensors used for targeting enables the system to autonomously track targets while letting the user (e.g. warfighter) select targets and command weapons releases.

UAV/UAS with clustering capability and adaptations can complete defensive missions where they loiter or patrol a specific area looking for unauthorized aerial, ground, surface, or subsurface vehicles or other targets. The UAV/UAS clusters (or individuals within a cluster) are adapted to autonomously create detailed reports on detections for a human user to review. That human user can then authorize defensive actions against unauthorized vehicles and targets. Enhanced aerial vehicles that can reach speeds enabling them to monitor, follow, and strike unauthorized aircraft, manned or unmanned, may then be dispatched from the cluster or another cluster to follow the target. With the appropriate targeting sensors to perform multispectral scene flow and other enhanced vision methods, the vehicles can deliver kinetic and non-kinetic effects to those air, ground, surface, and subsurface targets. Clusters can use the same targeting sensors to coordinate their formations to defend against or attack vehicles with higher capability than any individual agent in the cluster. By way of one non-limiting example, 6 UAVs could set up in an array to cover the likely ingress point of an enemy attack. Even if adversary vehicle arrives with superior speed for instance, they would have to pass by at least one agent of the cluster, allowing that agent to better sense and interdict that target. Heterogeneous clusters mean that there is more than one type of vehicle in the cluster. One such configuration would include command and control (CC or CC-UAV) vehicles, and munition delivery vehicles (MD or MD-UAV). This allows for speciation of payloads to increase capability. Command and control vehicles preferably have high performance communications systems for longer ranges and higher bandwidth, while munition deliver vehicles preferably have maximum payload for projectiles, and route their long range communications through the command and control vehicles. By putting multiple clusters together, users can create highly capable, robust swarms of vehicles that can address complex defensive and offensive tasks such as escort, perimeter defense, infrastructure attacks, and low signature ingress direct attacks.

These concepts may also be applied between varying types of vehicles. For example, a UAV/UAS as described herein may communicate with other autonomous ground or water vehicles as well as air vehicles. The UAV/UAS of the present invention can take off and land on such ground or water vehicles, provide GNC commands to such vehicles to navigate to a particular area or location, or the like.

Not only may UAV/UAS be swarmed, but the system is also adapted to provide swarming or clustering of the rounds/munitions/Drop Glides with respect to their release and/or target engagement (impact or explosions). Swarming rounds to coordinate specific landing patterns and timing allows the system to perform a highly coordinated attack on one or more targets in a specific timing and/or pattern. For example, in concert with launch vehicle or on their own, 2 to 6 rounds may be released from one or more UAV/UAS, and the system is adapted to coordinate their release timing and flight paths (for Guided rounds) in order to further coordinate their landing positions and arrival times for increased effectiveness.

Hierarchical control/Modular Open System Approach

The logic device(s) of the various embodiments of the present invention include either or both analog and digital circuits. Preferably, the logic device(s) is a digital circuit. The logic devices include but are not limited to computers, microprocessors, control circuits, field programmable gate arrays, programmable logic chips, analog computers, microcontrollers, and the like. Preferably, the missile or aircraft of the present invention comprises one or more logic devices that are partially or fully utilized for controlling the airflow over the aerodynamic surface(s) of the missile or aircraft. The one or more logic devices comprise a hierarchical control structure. This control structure comprises a separate local, closed loop control system for each flow control zone and a global control system to coordinate the action of the local control systems.

This hierarchical control structure comprises hierarchical algorithm architectures embedded within the one or more logic devices which are categorized in several ways. Preferably, the control system including all elements of the system controlling the airflow zones possess an input/output structure. That is, specific inputs to the control system exist which can affect the output of the control system, which is some measurable behavior(s) (i.e., control command). In addition, preferably the control system has memory, or dependence upon previous conditions and inputs. The memory of the control system preferably is described by the system state a parameter(s) that describes or captures the physical characteristics of the system. For instance, for controlling the position of or the flow around the aircraft or missile, the input to the control system could be a quality of the airflow, i.e., pressure, velocity, etc. across an aerodynamic surface, the output would then be a level of actuator effort (in our case the active flow control device or activatable flow effector).

The algorithms may be categorized in terms of the type of information used to formulate the control directives. Under this system of classification, the control architectures are cascade algorithms or output feedback algorithms. In cascade algorithms, the system output is used directly to compute an error signal (the difference between the desired and measured/observed behaviors) that is the basis of the controller's action. Conversely, output feedback algorithms compute a feedback signal based upon the system output which is in turn used to compute an error signal and hence the control action. In many cases, cascade algorithms are state feedback algorithms where the control input is based upon the state (either directly measured or obtained via an observer) of the system.

Another classification is based upon the constancy of the controller parameters. Under this taxonomy, the controller may be described as a fixed controller or as an adaptive controller. It should be noted that this distinction is not necessarily clear-cut. For instance, gain scheduling controllers will change the controller parameters according to a fixed schedule, that is, in one region of a system's operational envelope, one set of controller parameters will be used. If the system then moves into another region of the operational envelope, a new set of parameters will be obtained from a look up table, or schedule, and substituted. In this scenario, the parameters are changed open loop, there is no feedback loop modulating the controller parameters. Despite the fact that the controller parameters change, a gain scheduling controller is still classified as a fixed gain controller because the changes are performed open loop. The defining characteristic of adaptive controllers is that a second, outer feedback loop is used to control the variations of the controller parameters. A subclassification of adaptive controllers is the predictive controller that uses some adaptive model to predict the future behavior at some fixed time ahead, known as the control horizon, and determines the appropriate control action based upon the predicted future behavior.

The control algorithm may also be characterized in terms of the mathematical structure of the control law. If the control input is a linear combination of the error and its derivatives (or of the state variables or measured variables) the controller is said to be a linear controller and the coefficients used to construct this linear combination are known as the controller gains. Otherwise, the controller is said to be a nonlinear controller.

The manner in which the control input is computed also gives rise to a taxonomy. For many complex systems, multiple inputs exist. For example, to control the virtual aerodynamic shape of an aerodynamic surface (such as a wing), it may be necessary to have a large number of individual activatable flow effectors. If all of the different inputs are computed en masse in an individual process, the controller is said to be a centralized controller. If each of the individual inputs or distinct groups of inputs are determined via independent processes, the controller is known as a distributed or decentralized controller. Note that this nomenclature refers to the architecture of the control system, not the process or system itself, it is possible to design a centralized controller for a distributed system such as a large number of actuators distributed over the surface of an aerodynamic surface. A centralized control algorithm is typically much easier to design and implement than a distributed one, unfortunately, these algorithms are sometimes executed on a single processor and hence there is a limit to the number of inputs that may be effectively controlled in order to control the missile or aircraft in real-time. Another disadvantage of centralized control systems is the difficulty of running control lines for distributed actuators (flow effectors) and/or sensors back to a single control system. Distributed algorithms, on the other hand, may be executed on multiple processors simultaneously and hence can be scaled to accommodate large numbers of inputs. It must be clarified, also, that this nomenclature refers to the algorithm itself, not the hardware upon which it is executed. With a distributed controller, it is possible to execute several independent processes on an individual processor simultaneously and hence, a one to one correlation between processes and processors is not a requirement for a distributed control system.

Finally, within a control system, a classification is required to describe its hierarchy. If a control system regulates the behavior of only a portion of the system, it is called a local controller. The local controller manages the airflow control zone(s) or the individual flow effectors. Conversely, if the control system is responsible for controlling the entire system, it is a global controller. Itis possible to have a distributed global control system. In this case, a set of distributed, local controllers may comprise the global controller for the entire system. Often, local controllers may be combined with a global controller to form a hierarchical control system. In this case, an outer control loop may be constructed to coordinate the behaviors of local controllers. This outer most loop is commonly referred to as the global controller within the context of a hierarchical control system. Itis not necessary that the global controller be a classical feedback system, it may be an expert system, a fuzzy logic system or a simple rule base. In addition, nontraditional approaches may also be used such as artificial neural networks may be used as a global controller. If a closed loop feedback controller is used as a global controller, any local feedback loops present are known as minor feedback loops. It is also possible that the hierarchical control system possesses more than two layers, minor feedback loops can themselves have minor feedback loops and a local controller may coordinate even more localized controllers. For example, an airplane may have a global control system that controls two wings, each of the wings may have a local controller that in turn coordinates the behavior of multiple flow effectors on the surface of the wing, each of which are regulated by its own local controller.

The Weapons Release System also uses a Modular Open Systems Approach in its hardware and software design. In doing so, the advanced features of the WRS can be used to upgrade the capabilities of the platform UAV/UAS for which the WRS is attached. By way of example, a data cable from the WRS can be connected to the autopilot of the platform UAS in order to impart enhanced collision avoidance, autonomous take-off and landing, navigation in a GPS denied or degraded environment. For military applications, a Commercial off the shelf autopilot is likely to be used on the platform UAS such as a Blue Cube H7 Autopilot made in the US. The Blue Cube H7 autopilots are robust and reliable, which is necessary for formation flying and capable of receiving data from the WRS via a built-in data port.

Additive Manufacturing Process

As noted throughout, additive manufacturing is preferably used to produce the rounds/munitions/Drop Glides in a uniquely low-cost manner that is relatively portable, is very flexible and adaptable for rapid design changes, and which has been shown in the inventors' development process to produce unexpectedly strong, resilient components that are more than capable of providing structure and strength to withstand the rigors of flight while securely enclosing all the required electronics and explosive components, and further while requiring significantly lower capital expense in production. The 3D printed round airframes are so unexpectedly adapted to not only surviving flight, but also to withstanding the forces placed on the round for maneuvering, which is clear that those skilled in the art were unaware of such capability at the time the present invention was developed because no known munitions are yet being produced with such methods. The internal structure and design of the additively manufactured airframes and flow effectors has yielded a highly resilient airframe capable of performing as well, or better, than traditional heavy, metal munitions, while providing a massive cost reduction in production. The airframes of the present invention are so different from traditional munitions used for such applications that the effectiveness of the rounds is also truly unexpected given the difference between the present airframes and traditional munitions. The additive 3D printing as a primary manufacturing method enables a stronger digital engineering approach which allow rapid adaptability and implementation of design changes. 3D printing for aerodynamic properties, mass distribution, complex contours, high efficiency internal structures, specifically placed EMI shielding, tightly integrated antennae for communications and sensing, and living hinges, are all easily and rapidly implementable, and do not require the engineering lead times and retooling of manufacturing equipment to change the manufacturing process like traditional munition manufacturing requires. The additive manufacturing processes of the present invention further enable features such as: 3D printing for warhead enhancement, 3D printing for alignment between development and manufacturing fabrication methods, 3D printing for ease of scaling from merely a few units (e.g. 5-10 rounds) to thousands of rounds or more, 3D printing for less reliance on repetitive labor, 3D printing to minimize the time from concept to hardware, 3D printing with low cost engineering materials with enhanced strength, density, conductivity, shielding, thermal conductivity, thermal insulation, thermal envelope, energetic & reactive mass and geometries while still unexpectedly providing the same or better effectiveness than traditional metal-bodied munitions, 3D printing for agile hardware development allowing user needs to be tested with actual hardware at an unexpected and unprecedented rate, 3D printing for adapting new sensors, payloads, powerplants and supplies, interconnects, aero mechanical and aero controls concepts (effectively all components can rapidly be rearranged or added to within a quickly adapted airframe design, including 3Dd printing to accommodate new parts that are necessitated by parts shortages), 3D scanning for more accurate modeling and simulation of new concepts as printed, 3D scanning for component acceptance on arrival, 3D scanning for component acceptance after fabrication, 3D scanning for subassembly acceptance, 3D scanning for assembly acceptance, 3D scanning for full detail, multi stage records of every manufactured product for issue tracking and remediation identified at any point in the life cycle. Some other unexpected benefits realized through the development and testing processes include that the mass properties of components, subassemblies, and assemblies as printed allow for more accurate modeling and simulation, for more accurate production control, and Further that the mass properties for full detail, multi stage records of every manufactured product enable highly trackable and manageable issue tracking and remediation identified at any point in the life cycle. The additive manufacturing process also allows for material characterization of all incoming materials for better modeling and simulation as well as for better fabrication yield.

Many iterations of the rounds may be contemplated utilizing many combinations of sensors, processors, flow effectors, actuators, and the like to create virtually innumerable combinations for different types of munitions. Some embodiments may utilize only IMU sensors and thus provide ultra-low cost guided projectiles. Other embodiments may include IMU sensors and one or more cameras for low cost guided projectiles. Still another embodiment may include image sensors for visual imaging, LWIR imaging, and/or low light imaging (e.g., high pixel resolution Bayer format) individually or in combination. Another embodiment may include IMU sensors in concert with 10s to 100s of μs scale RF multilateration (via ultra-wideband transceivers or similar), on a single RF channel for minimal spectrum requirement or on tandem channels for maximum performance. Such combinations enable remote seeker concept where release or launch vehicle tracks the projectile and target and sends those updates at a single point or continuously after release or launch. Another embodiment may include IMU sensors along with 10s to 100s of μs scale RF multilateration (via ultra-wideband transceivers or similar) plus one or more cameras for maximum performance and range. Again, this enables remote seeker concept at extended ranges and with more dynamic targets, but the camera also adds where the release or launch vehicle tracks the projectile and target and sends those updates at a single point or continuously after release or launch.

Now referring to the figures and drawings, FIG. 1 depicts one embodiment of a guided munition of the present invention. The depicted munition 100 comprises a nose cone in which at least one sensor suite is mounted (as depicted a visual sensor system 105), a canard control actuation system 110 (internal) for controlling pitch and yaw of the munition in flight via the coupled canards 115, a warhead 130 (internal), a fixed wing 125 component comprising large fixed wings preferably aft of the center of gravity/center of mass for providing stability forces and enable maneuvering based on actuation of the other modules, internal electronics components such as communications and power components (not shown), and a roll control tailfin 135 component configured to either minimize or cause intentional roll. This particular embodiment also depicts an armature slot 140 into which a locking pin or other such mechanism (not shown) is inserted when the round is mounted to the WRS to keep the round locked into position until ready to be released. Each of these components are designed to be modular and can be assembled in any desired configuration in order to achieve a desired effect.

FIGS. 2A-B depict two exemplary control surface modules of the present invention for a guided munition. FIG. 2A depicts a canard control actuation system (CAS) 200 comprising 2 coupled pairs of canards 205 where the canards 205 on opposite sides of the munition are coupled and controlled together. Each pair of canards 205 is independently controlled based on commands and signals received from the UAV system (not shown) based on sensor (not shown) recordings and signals, and are activated by an actuator to move and provide disturbances in the flow over the canards 205 and thus control pitch and yaw of the munition to steer the munition in the desired direction to follow a calculated flight path to a target. The actuation system in the depicted embodiment comprises a lead screw 220 and lead nut 215 as well as a motor 210, where the system translates rotational motion of the motor into linear motion of the lead nut along the lead screw, and again into rotational movement of the canards on a shaft. The lead screw design may be preferable for accuracy as well as prevention of back drive, though other systems known in the art may be utilized as well. FIG. 2B depicts one embodiment of a roll control fin 255 actuator 250 mechanism which comprises a motor 275, bulk head 260 and a slot nut 265 attached to each other via a series of guide rods 270, where the slot nut 265 travels linearly on the guide rods 270 and translates such linear motion into rotational motion of the roll control fins 255 in order to minimize (or increase, if desired) the roll of the munition in flight. The two modular systems depicted are able to be placed virtually anywhere in an assembled munition depending on the desired type of travel and control required for the munition in a given mission—the munition is truly intended to be modular such that the various components may be assembled in any fashion to achieve specific capabilities or results.

Figure 3A:
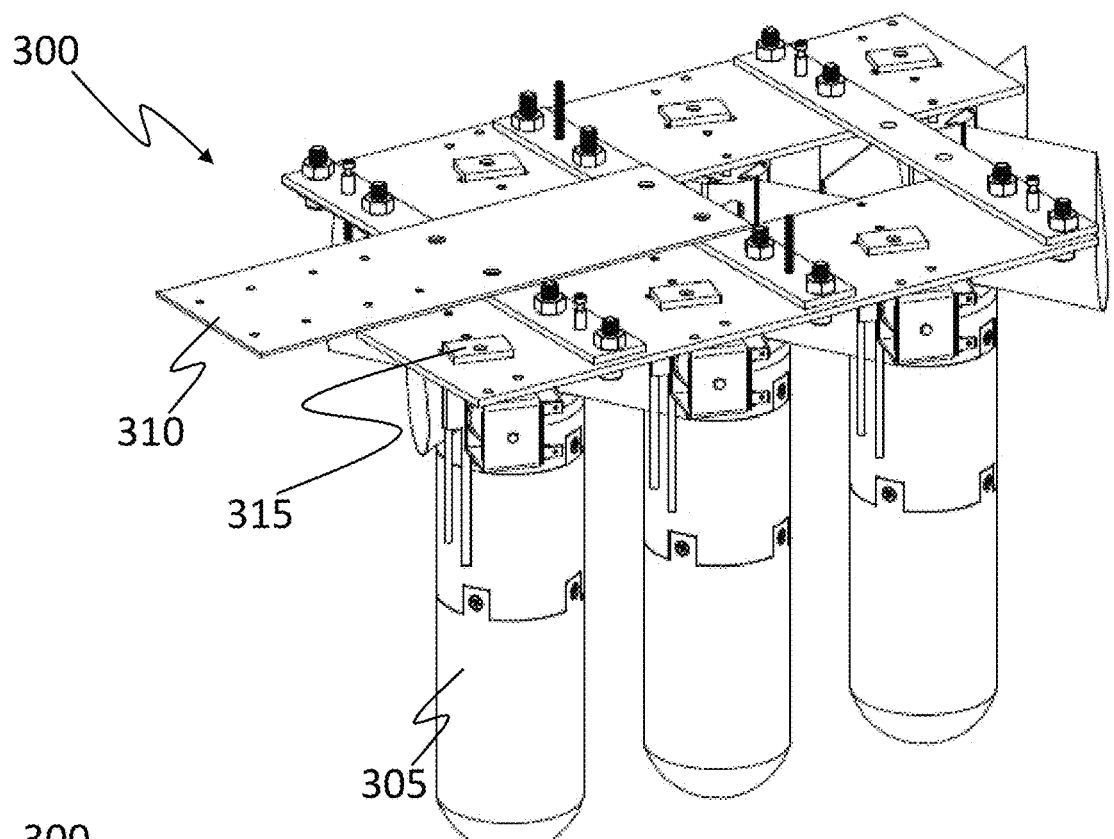
Figure 3B:
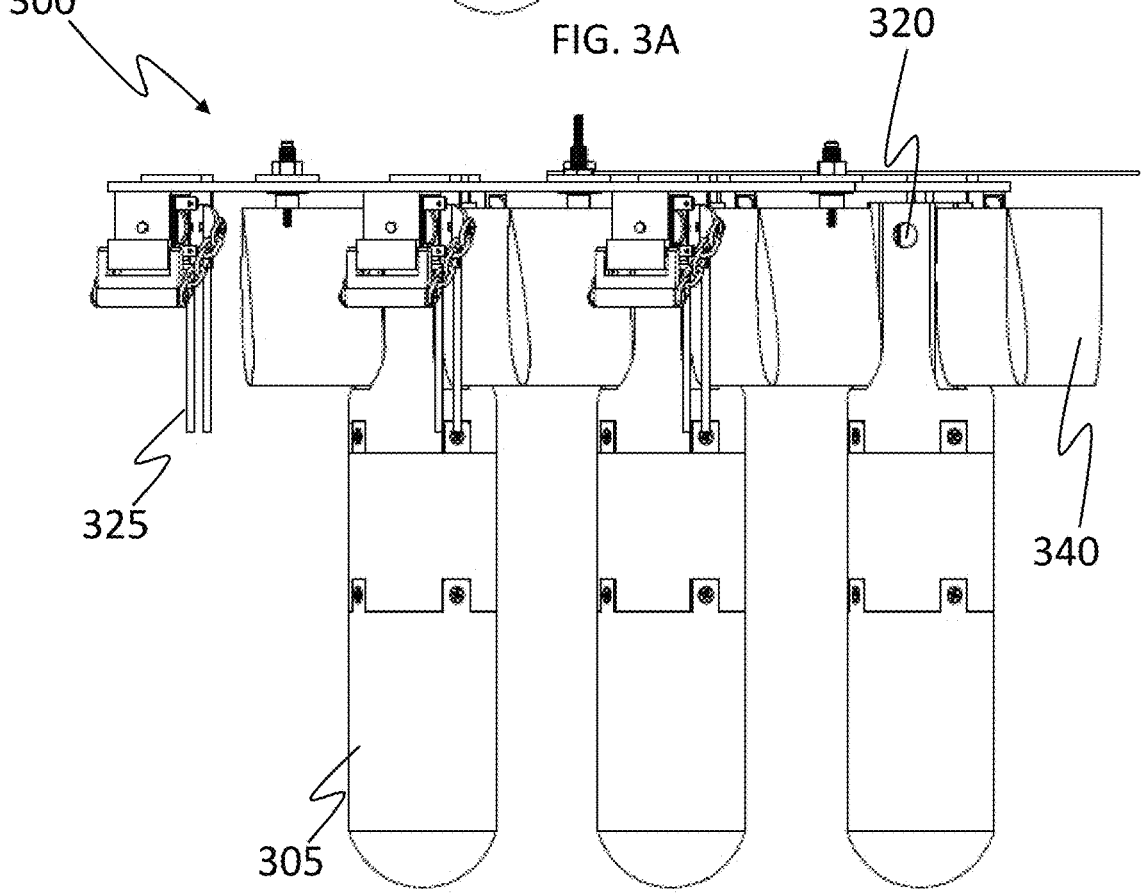
Figure 3C:
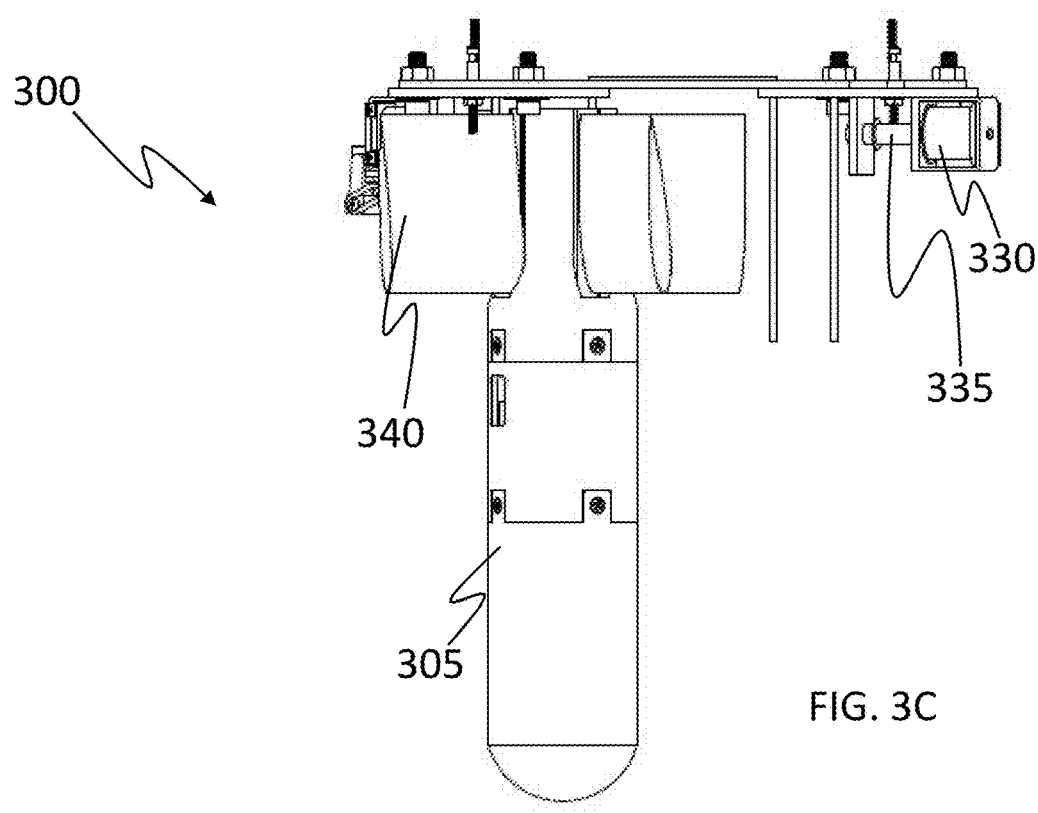
Figure 3D:
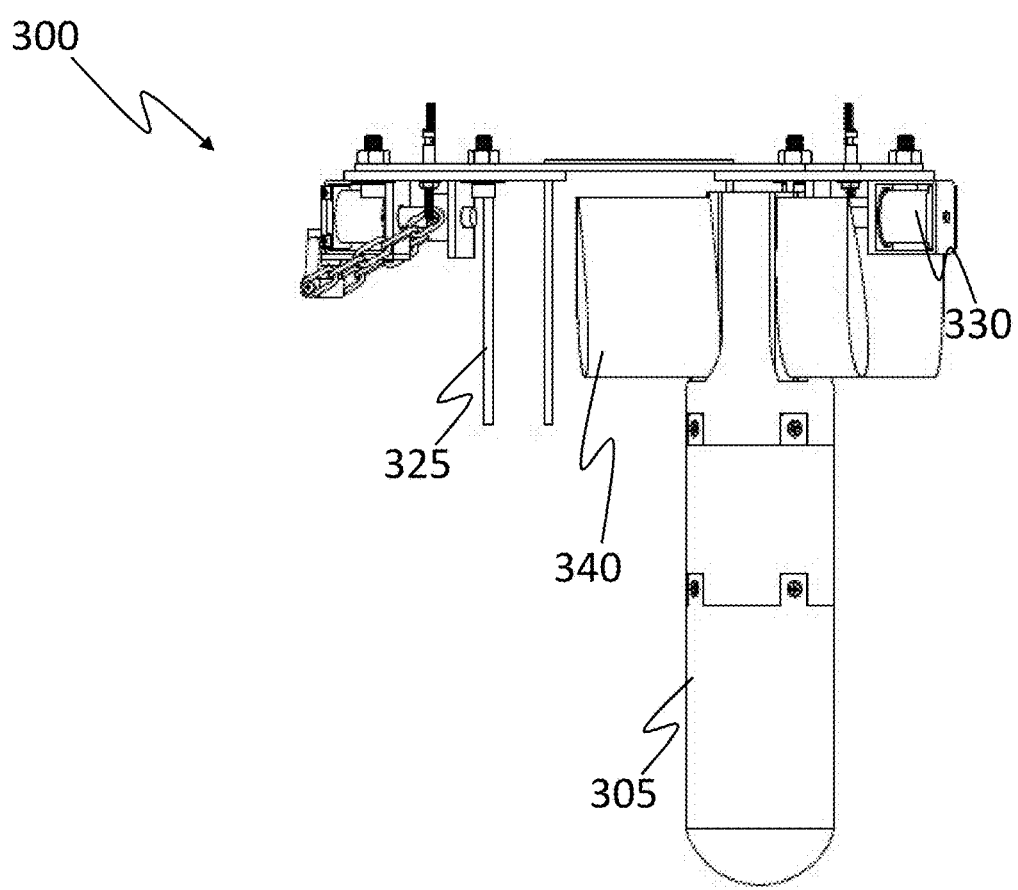

FIGS. 3A-3D depict different views and combinations of the release system/mechanism (WRS) of the present invention. The release mechanism 300 is designed to be platform agnostic in that it may be attached, combined, or otherwise retrofitted and mounted to virtually any vehicle system, and particularly unmanned systems for air, ground, or underwater operation. The release system 300 is further preferably configured to have any number of potential releasable or deployable elements attached securely thereto transportation and delivery without the risk of premature or unintended release. Examples of releasable or deployable elements include, but are not limited to weapons, other unmanned systems or vehicles, sensor and monitoring systems, packages, and the like. Deployable weapons may include munitions, mortars, missiles, grenades, rockets, mines, countermeasures (e.g., chaff, obfuscation, jamming, and blocking elements), and the like. The embodiments depicted in FIGS. 3A-3D portray one or more unguided rounds 305 attached to the WRS 300. Other deployable or releasable unmanned systems may include other smaller unmanned vehicles or systems that operate in the same or other medium as the releasing system (e.g., a delivery UAV may deploy other UAV, or UGV that drop to the ground and then traverse, or UUV which drop into the water and then operate). Merely one, non-limiting, example of such a system is where a delivery UAV is equipped with one or more munitions and one or more smaller UAV, such as a Skydio S2+ UAV which can be deployed from the delivery UAV and travel closer to the target for additional surveillance, reconnaissance and imaging capabilities, and which can transmit such data back to the delivery UAV and/or to the warfighter for processing and decision making regarding navigation and positioning, target identification and tracking, and deployment of the munitions. The release system 300 of the present invention is also feasible for use with non-weapons-based systems, such as for autonomous package or food delivery. FIG. 3A depicts an isometric view of the release system 300 with three munitions 305 attached. Also depicted are the agnostic mounting plates 310 which can be adjusted and used to mount to virtually any existing vehicle or system with only minor modifications, as well as a bracket 315 which provides support the actuator pin (335). FIG. 3B depicts a side view of the same embodiment of FIG. 3A, where the guide rods 325 onto which the deployable elements (rounds) 305 are mounted to prevent rotation of the deployable elements while mounted, are visible. A locking pin mechanism 335 is further utilized to lock the deployable element 305 to the release mechanism 300 securely, thus preventing the deployable 305 from being released and sliding off of the guide rods 325. The locking pin mechanism 335 operates by inserting a locking pin 335 into a lock pin receiving point 320 on the deployable, where the locking pin 335 is unable to be retracted (thus exiting the receiving point) unless the proper commands have been received and an actuator 330 such as a solenoid is commanded to move the locking pin 335 and release the deployable 305 element. The munitions shown in FIG. 3B further depict a tail fin kit 340 on each munition comprised of coupled roll-control fins. FIG. 3C presents a "front" view of two deployable positions on the release system 300, where one position is occupied by a munition 305, and the other is empty, thus showing the guide rods 325 and locking pin mechanism 335. FIG. 3D presents the opposite, or "back" view of the same embodiment depicted in FIG. 3C, but presents the same elements from the opposite side.

Figure 4:
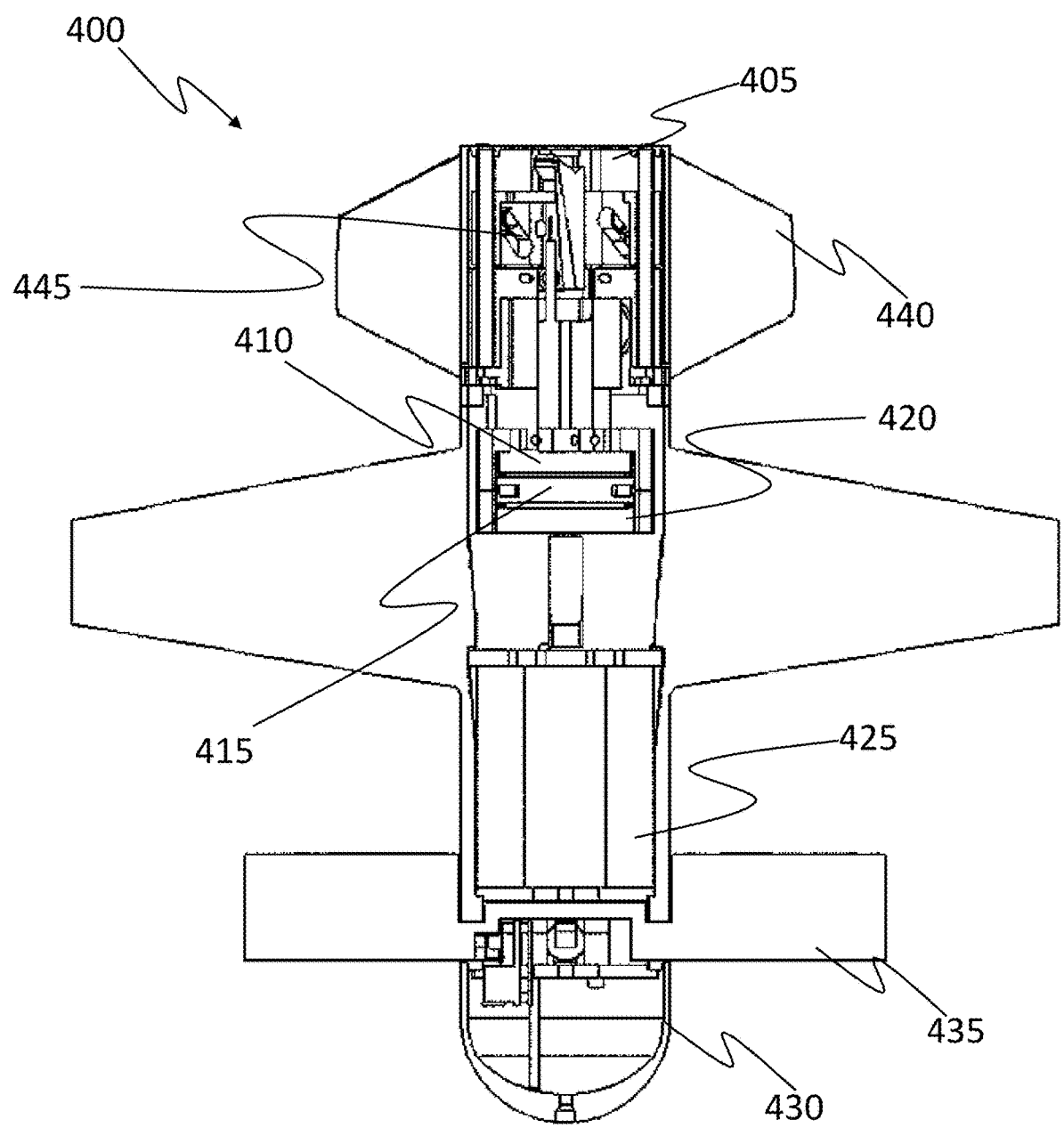

FIG. 4 is an image depicting one embodiment of a Guided round/munition/Drop Glide with several key features pointed out. The Guided Drop-Glide 400 preferably includes vehicle state sensors 410 which monitor the movement of the Drop-Glides 400 in real-time and provide Navigation data to the integrated flight controller 415 for the Drop-Glide. These vehicle state sensors 410 (which in many embodiments comprise MIMU sensors as described herein) close the loop with computed positions at the highest level of the controller 415, and with measured body accelerations and angular rates at the low levels of the motor control. Guidance electronics 405 with target updating and interface embedded software are also preferably included and are adapted to receive data from the WRS (not shown) of the UAV/UAS (not shown) while mounted and in flight but prior to being released from the WRS, and to provide live target data to the flight controller of the Drop-Glides 400 while the UAV/UAS is in flight. Also depicted are the communications electronics (radio) 420 for communication with the UAV/UAS and/or a remote user in some embodiments. The Guided rounds 400 include a steerable airframe 430 with maneuvering canards 435 (e.g., paired pitch canards and paired yaw canards) and roll arresting tail fins 440 commanded by integrated motors and drivers 445, which are interfaced with the Drop-Glide flight controller 415. The flight controller 415 preferably combines inputs from the Drop-Glide state sensors 410, guidance electronics, and flight configuration to generate commands for the active canards 435 and tail fins 440 to intercept the selected target. The flight controller 415 ultimately integrates the Guidance, Navigation, and Control functions of the guided Drop-Glide 400. The Drop Glide 400 further preferably comprises a warhead/payload 425 that is armable according to, preferably, a plurality of arming/fuzing conditions being met, otherwise the round 400 remains inert and unable to be detonated.

FIG. 5 is an example of one embodiment of a UAV/UAS with an external FO Kit 500 and On-Board GNC Module for Forward Observer Functionality shown on a multi-rotor UAV. The FO Kit contains components such as stereo visual cameras 510 and infrared cameras 505 (e.g., LWIR or SWIR) for multi-spectral imaging and targeting in all environments. Also shown are radio transceivers 520 for Warfighter-In-The-Loop and UAV-to-Munition communication. Increased spatial distancing helps to geolocate the munition for guidance to selected target. Cameras also aid in navigation both in GPS-friendly or GPS-denied environments for spoofing and jamming detection. The system also includes a suite of onboard sensors, power systems, processors and other electrical components 525 to carry out the functions described herein. The FO Kit turns an autonomous UAV into an inexpensive forward observer to improve the accuracy and lethality of long-range weaponry while allowing humans to maintain safe distances from enemy targets. Other embodiments, perhaps more preferred than the presently depicted boom-mounted sensors 515, involves centrally-mounted sensor suites/units that may be located nearer, or attached to, the body of the UAV, as opposed to being mounted on the booms extended away from the body as depicted.

FIG. 6 is a depiction of multilateration using multiple UWB receivers 600, 605 to locate a beacon (or munition) (610) in space. This will be used for communication between the munition and the FO Kit or the UAV/UAS itself with integrated FO technology, that is outfitted with multiple receivers.

FIG. 7 is an exemplary screenshot of UAV mounted camera video post-processed to perform optical flow motion estimation to estimate velocity and integrated position throughout flight. This optical flow aids GPS navigation and acts as a primary measurement for GPS-denied navigation to prevent drift of inertial sensor estimates. The vectors show movement of specific features from one frame to the next. Vector sizes depict the magnitude of motion and specific patterns determine the type of motion (rotation vs translation).

FIG. 8 is an example of one embodiment of the present invention in a test conducted in June 2022, where the optical flow data was processed in real time to provide a flight path for the released munition. The sensor module used in testing was a gun-hardened sensor module that was live-fire tested in 40 mm grenades launched from an M320 reaching peaks of 15,000-20,000 Gs in September 2021, and is one example of the types of sensors or sensor modules that may be utilized with the present invention. These sensor modules are preferably less than about 5 cubic inches in volume, more preferably less than about 4 cubic inches in volume, more preferably less than about 3 cubic inches in volume, more preferably less than about 2 cubic inches in volume, and most preferably about 1 cubic inch in volume or less, and can be implemented in any gun launched munition for inertial data collection.

FIG. 9 is a depiction of the flight stages of a vehicle or projectile in the context of the present invention, and specifically in relation to the safety zone generated for preventing arming and fuzing of the weapons until it is deemed safe to do so. Effectively, the system breaks a mission into 5 separate stages including 1) takeoff from base 905; 2) unarmed travel within a safety zone 910; 3) armed ("armable") travel 915; 4) unarmed travel from the engagement zone back to the safety zone 910; and 5) landing at the base 905 or a separate location to be retrieved later if possible. The takeoff stage involves the launching or other such deployment of the vehicle or projectile 900, and can be presumed as taking place in a location desired to be kept safe from the weapons of the vehicle or projectile, i.e., the safety zone 910. Takeoff leads to the early stages of flight, which take place within the safety zone 910—the imaginary cylindrical (for example) area surrounding the launch point. During this stage, the system disables all fuzing and arming capabilities of the weapons system. Once the vehicle or projectile exits the safety zone, the arming and fuzing become available, and the system can do so at any point pursuant to any arming conditions that are defined or pertinent to the instant mission. One embodiment of the arming process 920 is described. As the vehicle returns back toward the launch point, or another identified point of safe landing, it reenters the original safety zone 910, or enters a new safety zone, and fuzing/arming capabilities are disabled once again, and ultimately the vehicle 900 lands at the designated landing site.

FIG. 10 is a picture depicting UAV/UAS swarms or clusters, which may include, for example, 6 Attack clusters and 1 Reserve Cluster bringing, for example, 28 UAVs to the area of operations along with, for example, a combination of 72 Unguided Drop Glide munitions, 36 Rocket Glide Munitions, and 20 Guided Glide munitions. The reserve cluster can be used to bridge poor communication links with improved line of sight and/or adopt MD-UAVS from clusters with disabled/destroyed CC-UAVs. As an example of the cost of the systems described herein, at one point during development of the invention the cost of this formation is $216 k for 108 unguided munitions, $60 k for 20 Guided Glide Munitions, $540 k for 18 MD-UAVs, $400 k for 10 CC-UAVs, Totaling $1.2 M delivers 128 munitions on target at range or just $10,000 per strike even if all UAVs are lost. Only $276 k in munitions is expended if UAVs are recovered.

FIG. 11 is a depiction of an exemplary use case scenario for UAV swarms engaging with enemies on an island 1100 where the weaponized UAV swarm provides a disproportionate impact on the adversary due to the fact that 1) it costs very little in comparison to many other approaches, 2) it is difficult to detect when making a high speed NOE ingress, 3) it is difficult to defeat with low cost weapons, 4) its resilience requires the adversary to devote significant resources and time to denying the swarms their objectives, and 5) the Swarm is capable of destroying dozens of vehicles, air defenses, and infrastructure to disintegrate and confuse the enemy. Individual clusters 1105, 110, 115, 1120, 1125, 1130, 1135 can each be assigned a particular location or arena 1140, 1145, 1150, 1160 to cover. Such location may be designed according to military grid structures for securely identifying locations in a particular region or area without risk of giving away locations to the enemy if communications are intercepted. In short, such grids designate an "arbitrary" location (e.g., a particular landmark, coordinate, or any other identifiable point) as a home or zero point, and then the remainder of the arena of operations is mapped according to a predefined grid marking system and/or scale, and then all locations are identified in relation to locations on that grid, which cannot be deciphered by the enemy unless the enemy learns the home or zero point. Each individual cluster 1105, 110, 115, 1120, 1125, 1130, 1135 operates in a specified zone, and the individual clusters can communicate with each other to share information that is relevant to the entire mission or to other specific individual clusters. A command and control (C&C) (not shown) vehicle preferably provides central control of each individual cluster. The enemy has difficulty addressing such a large mass of assets and the clusters of UAVs can engage and destroy a vast number of individual enemy targets.

FIG. 12 is an organization chart depicting High level UAV behavior, including: executing preprogrammed Rules of Navigation 1200 based on the interaction of sensor inputs and warfighter inputs, performing ISR tasks autonomously 1205 whereby the system detects potential targets based on predefined criteria and detects navigation points, and executing strike missions 1210 whereby the warfighter approves and selects certain targets and the system is then armed and/or instructed to pursue and engage those targets. This serves reduce warfighter burden by using high-performance on-board computing to analyze imagery and navigation data and provide actionable information for warfighter review. For example, high resolution scene flow can be continuously computed onboard each CC and MD UAV and any detections that meet certain criteria will be pushed for review by the warfighter, saving comms bandwidth and warfighter burden.

FIGS. 13A-B depict screenshots from one embodiment of a Fire Control Station interface 1300 giving a user control over the Lock 1315/Unlock 1310 modes, and over the firing/release 1370 of the rounds/munitions when unlocked. The user interface 1300 provides interactive buttons for unlocking the UAS 1310, 1355, and for locking the UAS 1315, 1360, and when a mode is selected, an indicator 1305, 1350 changes in order to notify the user the state in which the system currently operates. For example, the indicator 1305 may be colored green when locked to indicate that the system is safe and the rounds are unable to be released and/or detonated, while conversely the indicator may be colored red to indicate that the system is in engagement mode and the rounds are armed or able to be armed and released. Any combination of indicator types may be used, including different colors, patterns, and the like. The interface 1300 additionally depicts the operation buttons for the rounds, including one for checking the status 1365, 1320 of the rounds, and individual drop buttons 1325, 1370 which provide the user direct control of the individual rounds or munitions mounted on the WRS of the UAV/UAS.

FIG. 14 is an image depicting one embodiment of the Weapons Release System 1400 of the present invention. Several key elements are depicted, including a datalink radio 1405, Edge Computer 1410, ethernet switch 1415, ISR hardware 1420, and the storage release hardware 1425 designed to mechanically hold the rounds on the IRS until ready to be deployed. With respect to the datalink radio 1405, the WRS is designed to accept multiple communication and data link radios. One exemplary, but non-limiting, example is the Trellisware 870. Many embodiments of the WRS 1400 actually require two (2) radios; the first is connected to the WRS 1400 and a second radio is connected to the Fire Control Station (FCS). The radio on the UAS sends data and video from the WRS 1400 to the human operator via the FCS and the radio on the FCS sends the operator's commands to the WRS 1400. Regarding the Edge Computer 1410, in many embodiments the Edge Computer 1410 is located within the WRS 1400. In some embodiments, a Jetson single board computer is used for this application which is able to process all data and information collected by the sensors and actuators within the WRS 1400. Primarily the Edge Computer 1410; a) provides targeting information to the operator, and b) dynamically generates target data and initial conditions for each Drop-Glide (not shown). The Edge Computer 1410, in many embodiments, passes this information to the Drop-Glide (not shown) via an umbilical connection port located at each Drop-Glide position and after release via a radio link to the Drop-Glide while in flight. The Edge Computer 1410 hosts the Safety Supervisor firmware which ensures the weaponized UAS will properly release the Drop-Glides as well as issue an "intent to release" which will aid in the arming of the fuzes within the Drop-Glides. The WRS Ethernet Switch 1415 enables communication between the Edge Computer 1410 and the data-link radio 1405. The Ethernet Switch 1415 also allows the WRS 1400 to accept additional hardware desired by the operator. As one would plug new technology into a switch at home/work, the Ethernet switch 1415 ensures a Modular Open System Approach (MOSA) for the WRS 1400. The WRS 1400 Intelligence Surveillance and Reconnaissance (ISR) 1420 hardware is an imaging system that preferably includes multiple cameras necessary for target identification and target tracking. This camera array may preferably include on or more of the following depending on the embodiment: a color camera (EO), global shutter camera (stereo cameras), LWIR (IR) camera, laser rangefinder (laser altimeter), and the like. These cameras also provide data necessary to improve the targeting and initial conditions of the Drop-Glide prior to being released and while in flight. This ISR hardware 1420 can also be used for situational awareness to confirm that the user is over a target area, view vehicles and people in motion, and allow the warfighter to stay in the loop for the release of weapons. The storage release hardware (Release Mechanism) 1425, securely retains the rounds onto the WRS 1400 until commanded to release by the operator. In one embodiment, four (4) solenoids secure and release their respective Drop-Glides using the solenoids armature (moveable plunger), though other release mechanisms may be employed, as described herein, in various embodiments. For the exemplary embodiment, in the "Locked" mode a stiff spring ensures the armature reliably secures the Drop-Glide(s) onto the WRS 1400. When the WRS 1400 is in the "Unlocked" mode, power is provided to the solenoids so that the Drop-Glide can be released by the warfighter actuating the solenoid. Upon actuation, the armature is retracted from the recess in the side of the Drop-Glide allowing it to be released. Different embodiments may include positions for at least two munitions, four munitions, at least six munitions, at least 8 munitions, or more, depending on the capabilities of the UAS/UAV utilized.

An alternative WRS may be employed in many embodiments, where such WRS will also be mounted to the same type of COTS UAV/UAS airframe, and where the features and hardware components within the alternative WRS are the same as the system described and depicted above, but with one key difference in hardware being that the satellite datalink attached to either the Fire Control Station or the Ground Control Station will also facilitate interfacing with Multi-Domain Operation assets. Additionally, the firmware included on the Ground Control Station for the alternative WRS is able to facilitate multi-tasking as multiple UAVs/UASs can be commanded from a single Ground Control Station. In this version, Mission Planner supports limited "swarming," or formation-flying with multiple UAVs. In some embodiments, this more sophisticated swarming/multiple-UAV control is available in QGroundControl and APM Planner 2.0, which are both built on a multiple-vehicle architecture. But Mission Planner accomplishes this in a limited way by simply opening multiple serial port MAV-Link connections simultaneously and passing GPS position information from the WRS/UAV flying in any mode, from manual to auto to the other ("followers," flying in Guided mode). The GPS position of the WRS/UAV leader is preferably adjusted by a set offset and then sent to the followers as a series of dynamic waypoints. In this fashion the followers will follow the leader at set X, Y and Z offset distances. These collaborative features will be located on the Ground Control Station laptop software in Mission Planner.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed:

1. A guided round or munition comprising:
   an airframe comprising a forebody, a midbody, and an aftbody;
   a sensor suite adapted to measure vehicle state data of the round or munition in flight;
   at least two pairs of mechanically and electrically coupled control surfaces located on the forebody of the airframe and disposed equidistant from each other around the circumference of the airframe, at least one of the at least two pairs dedicated to controlling pitch of the round or munition in flight, and at least one of the at least two pairs dedicated to controlling yaw of the round or munition in flight, each pair comprising an actuator adapted to activate or adjust its pair of control surfaces;
   at least two midbody wings;
   at least four aftbody tailfins dedicated to controlling roll of the airframe in flight;
   at least one radio adapted to provide two-way communication between the round or munition and a host vehicle and/or between the round or munition and a remote user, the radio adapted to receive at least in part target information from the host vehicle or from the remote user;
   a warhead or payload; and
   a flight controller adapted to:
   1) receive the measured vehicle state data and the target information,
   2) either:
      a. receive a flight path from the host vehicle or the remote user, or
      b. determine a flight path to intercept a target based on the vehicle state data and the target information, and
   3) determine adjustments for at least one of the at least two pairs of mechanically and electrically coupled control surfaces and/or at least one of the at least four tailfins, the adjustments adapted to keep the round or munition on the flight path in order to engage the target.

2. The round or munition of claim 1, wherein the host vehicle is an unmanned aerial vehicle (UAV).

3. The round or munition of claim 2, wherein the sensor suite comprises at least one multiple inertial measurement unit (MIMU).

4. The round or munition of claim 3, wherein the UAV comprises a weapons release system (WRS) adapted to hold and connect the round or munition during flight of the UAV and prior to release or launch of the round or munition, to provide power and target information to the round or munition prior to release of the round or munition, and to receive a command from a remote user instructing the UAV to release one or more rounds or munitions.

5. The round or munition of claim 4, further comprising a fuzing system requiring at least three conditions precedent to be met prior to the warhead or payload becoming armed and able to be detonated.

6. The round or munition of claim 5, wherein the round or munition is a 40 mm, 55 mm, 60 mm, 81 mm, or 120 mm round or munition.

7. The round or munition of claim 6, wherein the round or munition has a total mass of 1200 g or less.

8. The round or munition of claim 7, wherein the warhead or payload constitutes about 75% or more of the mass of the total round.

9. The round or munition of claim 8, wherein the warhead or payload is a fragmentation warhead exhibiting a kinetic energy of at least 80 Joules for a majority of the fragments.

10. The round or munition of claim 9, wherein the round or munition is adapted to be modular such that its components, including the warhead or payload, can be readily swapped, replaced, or changed rapidly in the field.

11. A guided round or munition comprising:
- an airframe comprising a forebody, a midbody, and an aftbody;
- a sensor suite adapted to measure vehicle state data of the round or munition in flight;
- at least two pairs of mechanically and electrically coupled control surfaces located on the forebody of the airframe and disposed equidistant from each other around the circumference of the airframe, at least one of the at least two pairs dedicated to controlling pitch of the round or munition in flight, and at least one of the at least two pairs dedicated to controlling yaw of the round or munition in flight, each pair comprising an actuator adapted to activate or adjust its pair of control surfaces;
- at least two midbody wings;
- at least four aftbody tailfins dedicated to controlling roll of the airframe in flight;
- at least one radio adapted to provide two-way communication between the round or munition and a host vehicle and/or between the round or munition and a remote user, the radio adapted to receive at least in part target information from the host vehicle or from the remote user;
- a warhead or payload; and
- a flight controller adapted to receive data and commands from the host vehicle or from the remote user and to adjust the flow effectors based on the received data and commands, wherein the round or munition exhibits a ratio of warhead/payload mass to inert component mass of at least 3:1.

12. The round or munition of claim 11, wherein the host vehicle is an unmanned aerial vehicle (UAV).

13. The round or munition of claim 12, wherein the sensor suite comprises at least one multiple inertial measurement unit (MIMU).

14. The round or munition of claim 13, wherein the UAV comprises a weapons release system (WRS) adapted to hold and connect the round or munition during flight of the UAV and prior to release or launch of the round or munition, to provide power and target information to the round or munition prior to release of the round or munition, and to receive a command from a remote user instructing the UAV to release one or more rounds or munitions.

15. The round or munition of claim 14, further comprising a fuzing system requiring at least three conditions precedent to be met prior to the warhead or payload becoming armed and able to be detonated.

16. The round or munition of claim 15, wherein the round or munition is a 40 mm, 55 mm, 60 mm, 81 mm, or 120 mm round or munition.

17. The round or munition of claim 16, wherein the round or munition has a total mass of 1200 g or less.

18. The round or munition of claim 17, wherein the flight controller is further adapted to:
1) receive the measured vehicle state data and the target information,
2) either:
   a. receive a flight path from the host vehicle or the remote user, or
   b. determine a flight path to intercept a target based on the vehicle state data and the target information, and
3) determine adjustments for at least one of the at least two pairs of mechanically and electrically coupled control surfaces and/or at least one of the at least four tailfins, the adjustments adapted to keep the round or munition on the flight path in order to engage the target.

19. The round or munition of claim 18, The round or munition of claim 8, wherein the warhead or payload is a fragmentation warhead exhibiting a kinetic energy of at least 80 Joules for a majority of the fragments.

20. The round or munition of claim 19, wherein the round or munition is adapted to be modular such that its components, including the warhead or payload, can be readily swapped, replaced, or changed rapidly in the field.

* * * * *